US012620806B2

(12) United States Patent　　　　(10) Patent No.:　US 12,620,806 B2
Marinakis et al.　　　　　　　　　　(45) Date of Patent:　　　May 5, 2026

(54) METHOD AND COMPUTER SYSTEM FOR GENERATING A DECISION LOGIC FOR A CONTROLLER

(71) Applicant: Hitachi Energy Ltd, Zürich (CH)

(72) Inventors: Adamantios Marinakis, Fislisbach (CH); Yaman Cansin Evrenosoglu, Flurlingen (CH); Ioannis Lymperopoulos, Dietikon (CH); Sandro Schoenborn, Basel (CH); Pawel Dawidowski, Malopolskie (PL); Jan Poland, Nussbaumen (CH)

(73) Assignee: HITACHI ENERGY LTD, Zürich (CH)

( * ) Notice: Subject to any disclaimer, the term of this patent is extended or adjusted under 35 U.S.C. 154(b) by 588 days.

(21) Appl. No.: 18/022,124

(22) PCT Filed: Aug. 18, 2021

(86) PCT No.: PCT/EP2021/072979
§ 371 (c)(1),
(2) Date: Feb. 17, 2023

(87) PCT Pub. No.: WO2022/038206
PCT Pub. Date: Feb. 24, 2022

(65) Prior Publication Data
US 2023/0378753 A1　　Nov. 23, 2023

(30) Foreign Application Priority Data
Aug. 19, 2020　(EP) ..................................... 20191649

(51) Int. Cl.
*H02J 3/00*　　　(2006.01)
*G05B 19/042*　(2006.01)
*H02J 3/0012*　(2026.01)

(52) U.S. Cl.
CPC ........ *H02J 3/0012* (2020.01); *G05B 19/0428* (2013.01); *G05B 2219/2639* (2013.01)

(58) Field of Classification Search
CPC .............. H02J 3/0012; G05B 19/0428; G05B 2219/2639; G06F 2113/04; G06F 30/27; Y04S 40/20; H02H 7/26; Y02E 60/00
See application file for complete search history.

(56) References Cited

U.S. PATENT DOCUMENTS

| | | | |
|---|---|---|---|
| 11,256,240 B2 * | 2/2022 | Byrne | .............. G05B 19/41865 |
| 2008/0077368 A1 * | 3/2008 | Nasle | .................... G05B 17/02 |
| | | | 703/4 |

(Continued)

FOREIGN PATENT DOCUMENTS

| | | |
|---|---|---|
| CN | 110163540 A | 8/2019 |
| CN | 110417351 A | 11/2019 |

(Continued)

OTHER PUBLICATIONS

Fernando Castaño, et al. "Self-tuning method for increased obstacle detection reliability based on internet of things LiDAR sensor models." Sensors 18.5 (2018): 1508. (Year: 2018).*

(Continued)

*Primary Examiner* — Zhipeng Wang
(74) *Attorney, Agent, or Firm* — PROCOPIO, CORY, HARGREAVES & SAVITCH LLP

(57) ABSTRACT
To generate a decision logic for a controller of an Industrial Automation Control System, IACS, an iterative process is performed in which a decision logic candidate for the decision logic is generated, and a performance of the decision logic candidate in response to scenarios is computed.

20 Claims, 18 Drawing Sheets

(56)                References Cited

U.S. PATENT DOCUMENTS

| 2016/0258361 | A1 |    | 9/2016 | Tiwari et al. |
|---|---|---|---|---|
| 2017/0364043 | A1 | * | 12/2017 | Ganti ..................... G05B 17/02 |
| 2019/0129367 | A1 | * | 5/2019 | Baone .................. G06F 30/367 |
| 2020/0380618 | A1 | * | 12/2020 | Wang ...................... G06F 30/18 |
| 2021/0399546 | A1 | * | 12/2021 | Menon ...................... H02J 3/00 |
| 2022/0057790 | A1 | * | 2/2022 | Marinakis ............ G06Q 10/063 |

FOREIGN PATENT DOCUMENTS

| CN | 111555368 | A | 8/2020 |
|---|---|---|---|
| JP | 2012050289 | A | 3/2012 |
| JP | 2016104984 | A | 6/2016 |
| JP | 2019528494 | A | 10/2019 |

OTHER PUBLICATIONS

Li et al., "From AlphaGo to Power System AI", IEEE Power & Energy Magazine, DOI 10.1109/MPE.2017.2779554, Feb. 21, 2018, 1540-7977/18, 2018IEEE, pp. 76-84.

* cited by examiner

METHOD AND COMPUTER SYSTEM FOR GENERATING A DECISION LOGIC FOR A CONTROLLER

CROSS-REFERENCE TO RELATED APPLICATIONS

The present application is a national stage entry of International Patent Application No. PCT/EP2021/072979, filed on Aug. 18, 2021, which claims priority to European Patent Application No. 20191649.1, filed on Aug. 19, 2020, which are both hereby incorporated herein by reference as if set forth in full.

FIELD OF THE INVENTION

The present disclosure relates to methods and devices for generating a decision logic of a controller of an industrial automation control system (IACS), in particular a power transmission, power distribution or generation system. More specifically, the present disclosure relates to computer-implemented techniques for generating such a decision logic.

BACKGROUND OF THE INVENTION

Modern industrial automation control systems (IACS), such as power generation systems, power distribution systems, power transmission systems, power grids, or substations, and modern industrial systems include a vast number of components. The decision logic of protection devices such as protection relays of such systems decides which one of various actions is to be taken under which circumstances.

For illustration, in real-time operation of an electric power utility, transmission and distribution system equipment, including transformers, overhead lines, underground cables, series/shunt elements etc. are protected by means of a measurement system (voltages, currents), digital relay, and a circuit breaker. The control logic which is deployed in a digital relay utilizes the measured signals, identifies whether there is a severe fault which should be cleared to avoid damage to system equipment and finally sends a signal to the circuit breaker to open. Fast identification and clearance of faults are essential for the reliability and the security of the overall system.

The decision logic (i.e. protection logic) for each relay as well as the coordination scheme between multiple relays are designed and tested under anticipated grid scenarios. Conventionally, this is done by human expert engineers. During the design phase, engineers perform simulations of faults and other disturbances such as switching events in a grid to evaluate and refine the performance of the protection control-logic. The performance metrics are usually set by the prevailing practices for a given grid. Once deployed, the protection logic remains unchanged, until errors in its performance are observed.

Due to proliferation of converter-interfaced generation which introduces more stochasticity to the electricity supply temporally and spatially replacing the conventional generators, and e-mobility which introduces more stochasticity to demand, designing of protection systems are increasingly challenging as the grid operates closer to its limit. In addition, due to the lack of short circuit current capacities and different nature of short circuit currents (e.g. delayed zero crossings, distorted signals etc.) provided by converter-interfaced generators as well as the multi-directional currents due to changing spatial patterns of generation, it is desirable for the protection systems to adjust to changing environments.

As a result, the development of protection logic becomes an increasingly complex task. Furthermore, this task will need to be performed increasingly often as the suitability of the protection system will require to be reevaluated more frequently due to changes in grid infrastructure as well as generation/demand patterns.

A conventional practice for protection logic design is such that, for each specific design case, an expert engineer selects among a plurality of protection functions (such as overcurrent, directional, distance, differential protection) or a combination of them and determines the settings (i.e. function parameters) associated with the selected function(s). The objective is to come up with a set of protection functions and logic between them such that the security (i.e. the success rate of activating the protection system when necessary) and dependability (i.e. the success rate of not activating the protection system if not necessary) of the protection system are maximized while being able to respond to any fault as fast as possible.

The expert engineer achieves this by anticipating potential events (e.g. faults and non-faults, such as inrush conditions, switching operations etc.) which are relevant to the protection design task at hand and performs numeric simulation (e.g. simulation of electromagnetic transients, post-fault steady-state short circuit analysis) of each of the selected events in order to identify the resulting signals which will be observed by the protection relays, based on which the protection function(s) will operate on the field. This allows one to define and test the protection functions, logic and settings for all anticipated events in order to ensure the correct decision. Typically, this is performed by following a set of engineering practices fine-tuned by the human engineer.

If the set of commonly used protection functions does not allow for an acceptable protection system performance, new protection functions need to be thought of. This is, in general, a difficult heuristic task.

CN 110 417 351 A discloses a photovoltaic system DC side arc fault detection system and a detection method. The detection method comprises the steps of collecting an alternating current signal at the DC side of the photovoltaic system, and extracting signal characteristics in a frequency domain; pre judging the signal; training a Generative Adversarial Network (GAN) model; and judging a DC fault arc and sending alarm information. In order to reduce the false detection rate and improve the robustness of the detection system, the GAN is introduced into the judgment of the fault arc.

SUMMARY

There is a need to provide improved techniques for generating a decision logic that is executed by a controller of an industrial automation control system, IACS, in particular a power distribution system, a power transmission system, or a power generation system. There is in particular a need for improved techniques for a computer-implemented, fully or semi-automatic generation of a decision logic.

According to embodiments, methods and system are provided that allow machine learning to be harnessed for generating a decision logic (e.g., a decision logic of a protection relay, without being limited thereto).

Embodiments allow the development of power system operational planning, control and protection to be performed automatically. The techniques are applicable to individual controllers or to the generation of a coordinated control logic which accounts for the interactions between the various decision logics.

A computing system can autonomously create a decision logic that enhances, and optionally maximizes a performance subject to the specifications, including performing system simulations. Scenarios that can occur when the decision logic is used in field operation may be simulated, with at least some of the scenarios being computer-generated. Adversarial logics can be deployed for improving the decision logic and for generating The disclosed techniques allow the decision logic behavior to be tested under a wide variety of scenarios within the system specifications, even such scenarios that occur infrequently during operation. This allows a decision logic to be generated that performs well in field operation, while the process of automatically generating the decision logic also provides information on a robustness of its operation.

A computer-implemented method of generating a decision logic for a controller of an Industrial Automation Control System (IACS) according to an embodiment comprises: an iterative process including plural iterations that respectively include automatically generating a decision logic candidate for the decision logic and computing a performance of the decision logic candidate in response to scenarios, wherein computing the performance comprises performing system simulations; and selecting and outputting at least one of the decision logic candidates based on the computed performances.

The controller may be a controller for power system protection or power system control.

The performance may be computed in accordance with a performance metric or several performance metrics.

The method may further comprise automatically selecting or automatically creating at least part of the scenarios.

A scenario-creating logic may be executed to create at least part of the scenarios.

The scenario-creating logic may be a machine learning model.

The scenario-creating logic may learn with an objective of causing at least one of the decision logic candidates to underperform in accordance with a performance-metric or several performance metrics.

The scenario-creating logic may iteratively learn while parameters of at least one of the decision logic candidates are updated and/or decision logic candidates having different machine learning model architectures are challenged by scenarios in system simulations.

The scenario-creating logic may be an adversarial logic to a decision logic generator that automatically modifies a decision logic candidate in response to a performance assessment of simulation results to generate another decision logic candidate.

The scenario-creating logic and the decision logic generator may be a generative adversarial network (GAN).

The scenario-creating logic may be constrained to only generate scenarios that are within a system specification of the IACS.

The method may further comprise storing one or several scenarios that cause a decision logic candidate having a first machine learning model architecture to underperform.

For any decision logic candidate, the scenario or the batch of scenarios that causes the decision logic candidate to show the worst performance from among the batches of scenarios used for performing system simulations with the respective decision logic candidate, may be stored.

The method may further comprise retrieving the stored scenarios or batches of scenarios and determining a performance of at least one further decision logic candidate having a second machine learning model architecture different from the first machine learning model architecture in response to the retrieved scenarios.

The stored scenarios or batches of scenarios may be recurrently retrieved, e.g., when a decision logic architecture has changed.

The method may further comprise automatically selecting or automatically creating at least part of the scenarios.

Only a part of the scenarios may be automatically created.

Another part of the scenarios may be retrieved from a scenario data repository. The scenario data repository may include scenarios specified by an expert and/or historical scenarios.

Alternatively or additionally, another part of the scenarios may be retrieved from a challenging scenarios repository in a database, which stores scenarios that have previously been determined to cause at least one of the decision logic candidates to underperform (e.g., not to fulfill a performance quality criterion).

A scenario-providing module may automatically output a batch of active scenarios for which simulations are performed.

The scenario-providing module may automatically determine which scenarios are to be included in the batch of active scenarios and may provide the batch of active scenarios to a simulation engine.

The scenario-providing module may dynamically adjust the batch of active scenarios.

The scenario-providing module may dynamically adjust the batch of active scenarios in response to the computed performance for previously tested decision logic candidates.

The scenario-providing module may continually adjust the batch of active scenarios as new decision logic candidates are iteratively generated.

The scenario-providing module may continually adjust the batch of active scenarios in the process of generating the decision logic.

The scenario-providing module may include scenarios from a scenario data repository into the set of active scenarios.

The scenarios in the scenario data repository may include user-defined scenarios and/or historical scenarios.

The scenario-providing module may adjust the batch of active scenarios in such a manner that, in the batch of active scenarios, a fraction of scenarios taken from a scenario data repository decreases, optionally monotonously, in the iterative process of generating the decision logic.

The fraction of scenarios taken from the scenario data repository may decrease as a function of a number of iterations of an iterative process performed to generate the decision logic.

The scenario-providing module may adjust the batch of active scenarios in such a manner that, in the batch of active scenarios, a fraction of scenarios generated by the scenario-creating logic increases, optionally monotonously, in the iterative process of generating the decision logic.

The fraction of scenarios generated by the scenario-creating logic may increase as a function of a number of iterations of an iterative process performed to generate the decision logic.

The scenario-providing module may adjust the batch of active scenarios in such a manner that, in the batch of active scenarios, scenarios from the challenging scenarios repository are intermittently re-introduced into the batch of active scenarios. Re-introducing scenarios from the challenging scenarios repository into the batch of active scenarios may be triggered by a change in machine learning model architecture of the decision logic candidates.

The scenario-creating logic may output a scenario parameter set defining a scenario.

The scenario parameter set may be an ordered parameter set, e.g., an M-tuple, with M an integer greater than one.

The scenario-creating logic may map an input containing at least a description of a decision logic candidate to the scenario parameter set.

The scenario-creating logic may learn based on scenarios previously used in the system simulations and the decision logic performance computed therefor.

Learning of the scenario-creating logic may be done so as to attain convergence towards a scenario-creating logic that successfully challenges the decision logic candidate it receives as an input.

The scenario-creating logic may map an input that is independent of the decision logic candidates to the scenario parameter set. The input may be static or variable, e.g., stochastic.

The scenario-creating logic may be continually updated in the process of generating the decision logic.

Generating the decision logic candidates may comprise training one or several machine learning models.

The generated several decision logic candidates may comprise machine learning models having two or more different machine learning model architectures.

A complexity (e.g., a number of nodes and/or layers) of a machine learning models may be increased as new decision logic candidates are being generated in the process of generating the decision logic.

A progressive neural architecture search may be performed.

The two or more different machine learning model architectures may comprise artificial neural network architectures differing from each other in a number of nodes and/or a number of layers, without being limited thereto.

Generating the decision logic candidates may comprise selecting a machine learning model architecture; training a decision logic candidate having the machine learning model architecture until a first termination criterion is fulfilled, and storing performance information for the trained decision logic candidate; if a second termination criterion is not fulfilled, repeating the training and storing steps for a different decision logic candidate having a different machine learning model architecture; if a second termination criterion is fulfilled, selecting and outputting one of the trained decision logic candidates based on the stored performance information.

A decision logic generator may generate the several decision logic candidates, including training the one or several machine learning models.

The decision logic generator may generate decision logic candidates for a single controller of the IACS.

The decision logic generator may generate decision logic candidates for distributed control executed by plural controllers of the IACS.

A learning rate for the decision logic generator may be adjusted while the decision logic generator learns with the aim to generate decision logic candidates that perform better in the system simulations.

The learning rate for the decision logic generator may be adjusted dynamically based on the computed performance or a rate in change of the computed performance.

The learning rate for the decision logic generator may be adjusted dynamically in a non-monotonous manner.

The learning rate may govern a rate of change of parameters adjusted by the decision logic generator in dependence on the computed performance.

The learning rate may govern a rate of change of weights of an artificial neural network (ANN) in response to a feedback signal.

The learning rate may govern a rate of change of weights of an ANN in response to a feedback signal that depends on the performance determined for the decision logic candidate previously generated by the decision logic generator.

The learning rate may govern a rate of change of weights of an ANN in response to a feedback signal that depends on an output of the candidate decision logic previously generated by the decision logic generator and a correct output known in supervised learning.

The decision logic generator may receive an input that depends on the computed performance and may dynamically adjust the learning rate based on the input.

The decision logic generator may update weights of an artificial neural network using a gradient technique.

The gradient technique may be a gradient descent technique.

The gradient descent technique may be a stochastic gradient descent technique.

The decision logic generator may execute a nested search having an inner loop in which a decision logic candidate is trained without changing a machine learning model architecture, and an optional outer loop in which the architecture is changed.

The decision logic generator may identify parameters of a machine learning model that is a decision logic candidate based on trial-and-error search, model-based search, supervised learning, or reinforcement learning.

The decision logic generator may identify hyperparameters that define an architecture of a machine learning model that is a decision logic candidate based on trial-and-error search, model-based search, supervised learning, or reinforcement learning.

The decision logic generator may comprise an architecture supervisor operative to select a modified machine learning model architecture in response to a first termination criterion.

The first termination criterion may depend on a change in performance computed when training decision logic candidates having a fixed machine learning model architecture.

The first termination criterion may depend on a threshold comparison of a change, between iterations of the training, in the performance computed when training decision logic candidates having a fixed machine learning model architecture.

Alternatively or additionally, the first termination criterion may depend on whether the performance computed when training decision logic candidates meets a performance quality criterion, e.g., a performance threshold criterion.

Alternatively or additionally, the first termination criterion may depend on whether generated several decision logic candidates have machine learning model architectures that fulfill a first coverage criterion. The first coverage criterion may involve a threshold comparison and may indicate that, e.g., a threshold percentage of a set of machine learning model architectures available for automatic testing has been reached. The first coverage criterion may be set responsive to a user input, may be fixed, or may be dynamically adjusted based on the computed performance.

Alternatively or additionally, the first termination criterion may depend on whether the scenarios fulfill a second coverage criterion. The second coverage criterion may involve a second threshold comparison and may indicate that, e.g., the scenarios used in the simulations cover an area that is at least a second threshold percentage of the scenario parameter space that is within the system specifications. The second coverage criterion may be set responsive to a user input, may be fixed, or may be dynamically adjusted based on the computed performance.

The architecture supervisor may select a new machine learning model architecture from a set of pre-defined machine learning model architectures.

The architecture supervisor may select a new machine learning model architecture by transfer learning, using results of a process of generating another decision logic that performs a similar or identical function as the decision logic to be generated.

The architecture supervisor may select a new machine learning model architecture different from a machine learning model architecture for which training has previously been performed.

The architecture supervisor may perform a search in a hyperparameter space to select the new machine learning model architecture.

The hyperparameter space may include hyperparameters defining a number of layers and/or a number of nodes of an ANN that forms the new machine learning model architecture.

The architecture supervisor may select a machine learning model architecture that is identical to a machine learning model architecture that has previously been trained, and the method may comprise performing system simulations and evaluating a performance based on scenarios that have meanwhile been determined to cause other machine learning model architectures to underperform.

The performance may be computed in accordance with a performance metric or several performance metrics.

The method may further comprises receiving, via an interface, an input specifying the performance metric or the several performance metrics.

The method may comprise automatically modifying the performance metric or several performance metrics.

Computing the performance may comprise combining computed values of at least one performance metric determined for a decision logic candidate for a batch of scenarios including several scenarios.

Combining the computed values may comprise weighting the computed values based on a frequency of occurrence of the scenarios in the set during field operation of the IACS.

The performance metric(s) may be identical to a control objective of the decision logic.

The performance metric(s) may include at least one metric that is distinct from, optionally independent from, a control objective of the decision logic.

The method may comprise dynamically changing the performance metric(s) during the method of generating the decision logic.

The performance metric(s) may be any one or any combination of: operation cost, energy not served, electricity price, system stability, available power transfer capacity, selectivity and dependability, controller stability, without being limited thereto.

The input may define one or several key performance indicators, KPIs

The one or several KPIs include one or several of: minimizing cost of electricity, increasing grid power transfer limits, ensuring grid stability, maximizing protection objectives of security and dependability, keeping voltages and currents within limits, maximizing economic benefit.

The performance metric may be based on computed deviations between actions taken by the decision logic in the system simulations and actions known to be correct.

The deviations can be computed in accordance with a norm.

The actions known to be correct may be defined by an expert input (e.g., in supervised learning) or may be derived from historical data.

Performing the system simulations may comprise simulating a behavior of primary and/or secondary devices of a power system.

The power system may be a power generation system, a power transmission system, or a power distribution system.

Performing the system simulations may comprise one or several of: power flow simulations, short-circuit calculations, electromagnetic transient calculations, optimal power flow computation, unit commitment analysis.

The system simulations may be or may comprise any one or any combination of: optimal power flow (OPF) analysis, simulating disturbance(s), executing a short-circuit analysis, executing an electricity market clearing simulation, without being limited thereto.

Disturbance(s) can be simulated in the time and/or frequency domain.

The disturbance(s) may be simulated to assess a stability of the decision logic and/or of the system including the decision logic.

The short circuit analysis may comprise computing signals used by protection relays.

Executing an electricity market clearing simulation may comprise providing nodal electricity prices.

The scenario-creating logic and/or the decision logic generator may be fully data-driven.

The scenario-providing module and/or the decision logic generator may be only partly data-driven.

The scenario-providing module may be operative to generate scenarios by a system simulation, wherein the system simulation may be parameterized with system simulation parameters and values of the system simulation parameters may be determined such that they cause the decision logic candidate(s) to underperform.

Alternatively or additionally, decision logic candidates, such as decision agents, may be model-based having a parameterization with decision logic parameters, wherein values of the decision logic parameters are determined to improve performance of the decision logic candidate(s).

The method may be performed by one or several integrated circuits that execute a decision logic generator that generates the several different decision logic candidates and outputs a decision logic candidate of the several different decision logic candidates, a scenario-providing module that outputs a batch of active scenarios; and a simulation engine coupled to the decision logic generator and the scenario-providing module and operative to perform the system simulation for scenarios included in the batch of active scenarios.

The one or several integrated circuit(s) may further be operative to execute a performance assessor operative to compute the performance of the several different decision logic candidates for the scenarios included in the batch of active scenarios.

The one or several integrated circuit(s) may further be operative to execute a coordinator that is operative to coordinate operation of the decision logic generator and of the scenario-providing module.

The coordinator may be operative to coordinate operation of the decision logic generator and of the scenario-providing module responsive to an output of a performance assessor that computed the performance.

The coordinator may be operative to control adversarial machine learning models of the decision logic generator and the scenario-creating module.

The coordinator may control training of the adversarial machine learning models.

The coordinator may control when training of the decision logic generator and/or the scenario-creating logic terminates.

The coordinator may prevent termination of training of the decision logic generator and/or the scenario-creating module, depending on a number of the decision logic candidates for which the performance has been evaluated.

The coordinator may prevent termination of training of the decision logic generator and/or the scenario-creating logic depending on a threshold comparison of the number of the decision logic candidates for which the performance has been evaluated. Training may be continued if the number of decision logic candidates for which the performance has been evaluated is less than a threshold. Alternatively or additionally, training may be continued if the decision logic candidates for which the performance has been evaluated do not adequately cover at least a set of different regions in a parameter space or hyperparameter space.

Alternatively or additionally, the coordinator may prevent termination of training of the decision logic generator and/or the scenario-creating module, depending on the scenarios that have already been generated by the scenario-creating module.

The coordinator may prevent termination of training of the decision logic generator and/or the scenario-creating logic depending on a threshold comparison of the number of the scenarios for which system simulations have been performed. Training may be continued if the number of scenarios for which system simulations have been performed is less than a threshold. Alternatively or additionally, training may be continued if the scenarios for which system simulations have been performed does not adequately cover at least a set of different regions in a scenario space.

The coordinator may be operative to terminate the process of generating the decision logic.

The coordinator may be operative to terminate the process of generating the decision logic when an equilibrium is reached.

Alternatively or additionally, the coordinator may be operative to terminate the process of generating the decision logic when no equilibrium is reached based on, e.g., a time-out criterion and/or an iteration threshold criterion on a number of iterations performed in machine learning.

In order to ensure that the generation of the decision logic does not stall prematurely, the coordinator may be operative to perform any one or any combination of: controlling a learning rate of the decision logic generator; continually updating a merging strategy of a scenario-providing module; decelerating, accelerating and/or freezing the generation of new decision logic candidates or of new scenarios; selectively changing a performance metric; re-directing the training process of the decision logic generator or of the scenario-creating logic to prevent stalling.

In order to terminate the process of generating the decision logic, the coordinator may be operative to determine whether any one or any combination of the following conditions is met: the determined performance meets a performance threshold; the determined performance does no improve or a rate of improvement of the determined performance is below a rate threshold; a parameter and/or hyperparameter space defining possible decision logic candidates is sufficiently explored; a parameter space defining possible scenarios is sufficiently explored.

The coordinator may be operative to cause a learning rate of the decision logic generator to be reduced, optionally to freeze a decision logic candidate, if the decision logic candidate is determined to have a good performance (e.g., if the determined performance meets a performance threshold criterion). The coordinator may allow a scenario-providing module to continue outputting new active batches of scenarios for which simulations are performed, in order to continue testing the decision logic candidate that is determined to have a good performance. Alternatively or additionally, the coordinator may control the scenario-providing module to adjust, in particular to increase, a fraction of machine-generated scenarios created by a scenario-creating logic in the active batch of scenario.

Alternatively or additionally, the coordinator may be operative to cause a learning rate of the decision logic generator to increase if the performance determined for a batch of scenarios causes a decision logic candidate to underperform (e.g., if the determined performance does not meet a second performance threshold criterion).

Alternatively or additionally, the coordinator may be operative to cause a learning rate of a scenario-creating logic to be decreased, optionally to freeze the current scenario-creating logic, if the performance determined for a batch of scenarios causes a decision logic candidate to underperform (e.g., if the determined performance does not meet a second performance threshold criterion). The learning rate of the scenario-creating logic may be kept frozen and/or reduced until continued learning of the decision-generating logic results in a decision logic candidate that shows a good performance (e.g., that has a performance that meets a performance threshold criterion) against the scenarios created by the scenario-creating logic.

Alternatively or additionally, the coordinator may be operative to cause scenarios that have previously been identified to cause a decision logic candidate to underperform to be re-introduced, in particular recurrently, into the batch of active scenarios. The coordinator may be operative to trigger such a re-introduction of previously identified challenging scenarios depending on a similarity metric of decision logic candidates. Scenarios found to be challenging for a first decision logic candidate may be re-introduced into the batch of active scenarios for performing system simulations for a second decision logic candidate, provided that the similarity metric shows the first decision logic candidate and the second decision logic candidate to be sufficiently different (e.g., if the similarity metric has a value that exceeds a logic metric threshold).

Alternatively or additionally, the coordinator may be operative to balance exploration (e.g., of scenario a space and/or a parameter and/or hyperparameter space available for the decision logic candidates) and exploitation of available resources (e.g., computing time, hardware resources).

Alternatively or additionally, the coordinator may monitor a rate of improvement of the decision logic generator and of the scenario-creating logic. The coordinator may cause a learning rate of the decision logic generator or of the scenario-creating logic to be decreased, optionally by freezing the decision logic generator or scenario-creating logic, based on a comparison of a rate of improvement of the decision logic generator and of the scenario-creating logic. The coordinator may cause the learning rate for the decision logic generator to be decreased if the scenario-creating logic shows a lower rate of improvement. The coordinator may cause the learning rate for the scenario-creating logic to be decreased if the scenario-creating logic shows a lower rate of improvement.

Results of the generation process may be stored in a storage.

Each entry in the storage may include information on scenario(s) for which system simulations were performed, information on the decision logic candidate (including information on its parameters and, where applicable, on its architecture) for which the system simulations were performed, and the corresponding value of the performance metric.

An architecture of the decision logic generator (e.g., a number of layers and/or nodes of an ANN) may be defined by information stored in the storage for a process of generating another decision logic for another controller. To generate the decision logic, parameters for the decision logic generator having the architecture defined by the information stored in the database may be determined while keeping the architecture fixed.

Alternatively or additionally, an architecture of the scenario-creating logic (e.g., a number of layers and/or nodes of an ANN) may be defined by information stored in the storage for a process of generating another decision logic for another controller. To generate the decision logic, parameters for the scenario-creating logic having the architecture defined by the information stored in the database may be determined while keeping the architecture fixed.

The method may comprise using transfer learning, including determining an architecture of the decision logic candidates based on the architectures stored in the database for a process of generating another decision logic for another controller.

Transfer learning may be used selectively if the controller and the other controller have a similar or identical function (such as overcurrent protection) and are used in a similar or identical system topology.

The method may further comprise deploying the generated decision logic to a controller of an IACS, in particular of an electric power system.

The controller may be a controller for electric power system operation.

The controller may be a controller for electric power system control.

The controller may be a protection relay.

The method may comprise executing the selected decision logic by the controller.

The decision logic may be a protection logic.

The decision logic may be a distance protection logic.

The method may further comprise automatically modifying the decision logic in response to a monitored field behavior of the selected decision logic executed by the controller.

A computing system for generating a decision logic for a controller of an Industrial Automation Control System, IACS, in particular for a controller for power system protection or power system control, comprises one or several integrated circuits operative to perform an iterative process including plural iterations that respectively include automatically generating a decision logic candidate for the decision logic and computing a performance of the decision logic candidate in response to scenarios, wherein computing the performance comprises performing system simulations, and select at least one of the decision logic candidates based on a result of the computed performance; and an output interface operative to output the selected at least one decision logic.

The computing system may be operative to generate the decision logic for a controller for power system protection or power system control.

The computing system may be operative to compute the performance in accordance with a performance metric or several performance metrics.

The computing system may be operative to automatically select or automatically create at least part of the scenarios.

The computing system may be operative to execute scenario-creating logic to create at least part of the scenarios.

The scenario-creating logic may be a machine learning model.

The scenario-creating logic may learn with an objective of causing at least one of the decision logic candidates to underperform in accordance with a performance-metric or several performance metrics.

The scenario-creating logic may iteratively learn while parameters of at least one of the decision logic candidates are updated and/or decision logic candidates having different machine learning model architectures are challenged by scenarios in system simulations.

The scenario-creating logic may be an adversarial logic to a decision logic generator that automatically modifies a decision logic candidate in response to a performance assessment of simulation results to generate another decision logic candidate.

The scenario-creating logic and the decision logic generator may be a generative adversarial network (GAN).

The scenario-creating logic may be constrained to only generate scenarios that are within a system specification of the IACS.

The computing system may be operative to cause one or several scenarios to be stored that cause a decision logic candidate having a first machine learning model architecture to underperform.

The computing system may be operative such that, for any decision logic candidate, the scenario or the batch of scenarios that causes the decision logic candidate to show worst performance from among the batches of scenarios used for performing system simulations with the respective decision logic candidate, may be stored.

The computing system may be operative to retrieve the stored scenarios or batches of scenarios and determine a performance of at least one further decision logic candidate having a second machine learning model architecture different from the first machine learning model architecture in response to the retrieved scenarios.

The computing system may be operative to recurrently retrieve the stored scenarios or batches of scenarios, e.g., when a decision logic architecture has changed.

The computing system may be operative such that only a part of the scenarios is automatically created.

The computing system may be operative to retrieve another part of the scenarios from a scenario data repository. The scenario data repository may include scenarios specified by an expert and/or historical scenarios.

Alternatively or additionally, the computing system may be operative to retrieve another part of the scenarios from a challenging scenarios repository in a database, which stores scenarios that have previously been determined to cause at least one of the decision logic candidates to underperform (e.g., not to fulfill a performance quality criterion).

The computing system may be operative to execute a scenario-providing module operative to automatically output a batch of active scenarios for which simulations are performed.

The scenario-providing module may be operative to automatically determine which scenarios are to be included in the batch of active scenarios and may provide the batch of active scenarios to a simulation engine.

The scenario-providing module may be operative to dynamically adjust the batch of active scenarios.

The scenario-providing module may be operative to dynamically adjust the batch of active scenarios in response to the computed performance for previously tested decision logic candidates.

The scenario-providing module may be operative to continually adjust the batch of active scenarios as new decision logic candidates are iteratively generated.

The scenario-providing module may be operative to continually adjust the batch of active scenarios in the process of generating the decision logic.

The scenario-providing module may include scenarios from a scenario data repository into the set of active scenarios.

The scenarios in the scenario data repository may include user-defined scenarios and/or historical scenarios.

The scenario-providing module may be operative to adjust the batch of active scenarios in such a manner that, in the batch of active scenarios, a fraction of scenarios taken from a scenario data repository decreases, optionally monotonously, in the iterative process of generating the decision logic.

The computing system may be operative such that the fraction of scenarios taken from the scenario data repository may decrease as a function of a number of iterations of an iterative process performed to generate the decision logic.

The scenario-providing module may be operative to adjust the batch of active scenarios in such a manner that, in the batch of active scenarios, a fraction of scenarios generated by the scenario-creating logic increases, optionally monotonously, in the iterative process of generating the decision logic.

The computing system may be operative such that the fraction of scenarios generated by the scenario-creating logic may increase as a function of a number of iterations of an iterative process performed to generate the decision logic.

The scenario-providing module may be operative to adjust the batch of active scenarios in such a manner that, in the batch of active scenarios, scenarios from the challenging scenarios repository are intermittently re-introduced into the batch of active scenarios. Re-introducing scenarios from the challenging scenarios repository into the batch of active scenarios may be triggered by a change in machine learning model architecture of the decision logic candidates.

The scenario-creating logic may be operative to output a scenario parameter set defining a scenario.

The scenario parameter set may be an ordered parameter set, e.g., an M-tuple, with M an integer greater than one.

The scenario-creating logic may be operative to map an input containing at least a description of a decision logic candidate to the scenario parameter set.

The scenario-creating logic may be operative to learn based on scenarios previously used in the system simulations and the decision logic performance computed therefor.

The computing system may be operative such that learning of the scenario-creating logic is implemented so as to attain convergence towards a scenario-creating logic that successfully challenges the decision logic candidate it receives as an input.

The scenario-creating logic may be operative to map an input that is independent of the decision logic candidates to the scenario parameter set. The input may be static or variable, e.g., stochastic.

The scenario-creating logic may be operative to be continually updated in the process of generating the decision logic.

Generating the decision logic candidates may comprise training one or several machine learning models.

The generated several decision logic candidates may comprise machine learning models having two or more different machine learning model architectures.

The computing system may be operative such that a complexity (e.g., a number of nodes and/or layers) of a machine learning models is increased as new decision logic candidates are being generated in the process of generating the decision logic.

The computing system may be operative to perform a progressive neural architecture search to increase the complexity of the machine learning models that work as the decision logic candidates.

The two or more different machine learning model architectures may comprise artificial neural network architectures differing from each other in a number of nodes and/or a number of layers, without being limited thereto.

The computing system may be operative such that generating the decision logic candidates may comprise selecting a machine learning model architecture; training a decision logic candidate having the machine learning model architecture until a first termination criterion is fulfilled, and storing performance information for the trained decision logic candidate; if a second termination criterion is not fulfilled, repeating the training and storing steps for a different decision logic candidate having a different machine learning model architecture; if a second termination criterion is fulfilled, selecting and outputting one of the trained decision logic candidates based on the stored performance information.

The computing system may be operative to execute a decision logic generator operative to generate the several decision logic candidates, including training the one or several machine learning models.

The decision logic generator may be operative to generate decision logic candidates for a single controller of the IACS.

The decision logic generator may be operative to generate decision logic candidates for distributed control executed by plural controllers of the IACS.

The computing system may be operative to adjust a learning rate for the decision logic generator while the decision logic generator learns with the aim to generate decision logic candidates that perform better in the system simulations.

The computing system may be operative to adjust the learning rate for the decision logic generator dynamically based on the computed performance or a rate in change of the computed performance.

The computing system may be operative to adjust the learning rate for the decision logic generator dynamically in a non-monotonous manner.

The computing system may be operative such that the learning rate governs a rate of change of parameters adjusted by the decision logic generator in dependence on the computed performance.

The computing system may be operative such that the learning rate governs a rate of change of weights of an artificial neural network (ANN) in response to a feedback signal.

The computing system may be operative such that the learning rate governs a rate of change of weights of an ANN in response to a feedback signal that depends on the performance determined for the decision logic candidate previously generated by the decision logic generator.

The computing system may be operative such that the learning rate governs a rate of change of weights of an ANN in response to a feedback signal that depends on an output of the candidate decision logic previously generated by the decision logic generator and a correct output known in supervised learning.

The decision logic generator may be operative to receive an input that depends on the computed performance and may dynamically adjust the learning rate based on the input.

The decision logic generator may be operative to update weights of an artificial neural network using a gradient technique.

The gradient technique may be a gradient descent technique.

The gradient descent technique may be a stochastic gradient descent technique.

The decision logic generator may be operative to execute a nested search having an inner loop in which a decision logic candidate is trained without changing a machine learning model architecture, and an optional outer loop in which the architecture is changed.

The decision logic generator may be operative to identify parameters of a machine learning model that is a decision logic candidate based on trial-and-error search, model-based search, supervised learning, or reinforcement learning.

The decision logic generator may be operative to identify hyperparameters that define an architecture of a machine learning model that is a decision logic candidate based on trial-and-error search, model-based search, supervised learning, or reinforcement learning.

The decision logic generator may comprise an architecture supervisor operative to select a modified machine learning model architecture in response to a first termination criterion.

The first termination criterion may depend on a change in performance computed when training decision logic candidates having a fixed machine learning model architecture.

The first termination criterion may depend on a threshold comparison of a change, between iterations of the training, in the performance computed when training decision logic candidates having a fixed machine learning model architecture.

Alternatively or additionally, the first termination criterion may depend on whether the performance computed when training decision logic candidates meets a performance quality criterion, e.g., a performance threshold criterion.

Alternatively or additionally, the first termination criterion may depend on whether generated several decision logic candidates have machine learning model architectures that fulfill a first coverage criterion. The first coverage criterion may involve a threshold comparison and may indicate that, e.g., a threshold percentage of a set of machine learning model architectures available for automatic testing has been reached. The first coverage criterion may be set responsive to a user input, may be fixed, or may be dynamically adjusted based on the computed performance.

Alternatively or additionally, the first termination criterion may depend on whether the scenarios fulfill a second coverage criterion. The second coverage criterion may involve a second threshold comparison and may indicate that, e.g., the scenarios used in the simulations cover an area that is at least a second threshold percentage of the scenario parameter space that is within the system specifications. The second coverage criterion may be set responsive to a user input, may be fixed, or may be dynamically adjusted based on the computed performance.

The architecture supervisor may be operative to select a new machine learning model architecture from a set of pre-defined machine learning model architectures.

The architecture supervisor may be operative to select a new machine learning model architecture by transfer learning, using results of a process of generating another decision logic that performs a similar or identical function as the decision logic to be generated.

The architecture supervisor may be operative to select a new machine learning model architecture different from a machine learning model architecture for which training has previously been performed.

The architecture supervisor may be operative to perform a search in a hyperparameter space to select the new machine learning model architecture.

The hyperparameter space may include hyperparameters defining a number of layers and/or a number of nodes of an ANN that forms the new machine learning model architecture.

The architecture supervisor may be operative to select a machine learning model architecture that is identical to a machine learning model architecture that has previously been trained, and to perform system simulations and evaluate a performance based on scenarios that have meanwhile been determined to cause other machine learning model architectures to underperform.

The computing system may be operative to compute the performance in accordance with a performance metric or several performance metrics.

The computing system may be operative to receive, via an interface, an input specifying the performance metric or the several performance metrics.

The computing system may be operative to automatically modify the performance metric or several performance metrics.

The computing system may be operative to compute the performance by combining computed values of at least one performance metric determined for a decision logic candidate for a batch of scenarios including several scenarios.

Combining the computed values may comprise weighting the computed values based on a frequency of occurrence of the scenarios in the set during field operation of the IACS.

The performance metric(s) may be identical to a control objective of the decision logic.

The performance metric(s) may include at least one metric that is distinct from, optionally independent from, a control objective of the decision logic.

The computing system may be operative to dynamically change the performance metric(s) during generation of the decision logic.

The performance metric(s) may be any one or any combination of: operation cost, energy not served, electricity price, system stability, available power transfer capacity, selectivity and dependability, controller stability, without being limited thereto.

The input may define one or several key performance indicators, KPIs

The one or several KPIs include one or several of: minimizing cost of electricity, increasing grid power transfer limits, ensuring grid stability, maximizing protection objectives of security and dependability, keeping voltages and currents within limits, maximizing economic benefit.

The performance metric may be based on computed deviations between actions taken by the decision logic in the system simulations and actions known to be correct.

The computing system may be operative to compute the deviations in accordance with a norm.

The computing system may be operative to receive user input defining the actions known to be correct by an expert input (e.g., in supervised learning).

The computing system may be operative to derive the actions known to be correct from historical data.

The computing system may be operative to simulate a behavior of primary and/or secondary devices of a power system in the system simulations.

The power system may be a power generation system, a power transmission system, or a power distribution system.

The computing system may be operative such that performing the system simulations may comprise one or several of: power flow simulations, short-circuit calculations, electromagnetic transient calculations, optimal power flow computation, unit commitment analysis.

The system simulations may be or may comprise any one or any combination of: optimal power flow (OPF) analysis, simulating disturbance(s), executing a short-circuit analysis, executing an electricity market clearing simulation, without being limited thereto.

Disturbance(s) can be simulated in the time and/or frequency domain.

The disturbance(s) may be simulated to assess a stability of the decision logic and/or of the system including the decision logic.

The short circuit analysis may comprise computing signals used by protection relays.

Executing an electricity market clearing simulation may comprise providing nodal electricity prices.

The computing system may be operative such that the scenario-creating logic and/or the decision logic generator may be fully data-driven.

The computing system may be operative such that scenario-providing module and/or the decision logic generator may be only partly data-driven.

The computing system may be operative such that scenario-providing module may be operative to generate scenarios by a system simulation, wherein the system simulation may be parameterized with system simulation parameters and values of the system simulation parameters may be determined such that they cause the decision logic candidate(s) to underperform.

Alternatively or additionally, the computing system may be operative such that decision logic candidates, such as decision agents, may be model-based having a parameterization with decision logic parameters, wherein values of the decision logic parameters are determined to improve performance of the decision logic candidate(s).

The computing system may execute a decision logic generator that generates the several different decision logic candidates and outputs a decision logic candidate of the several different decision logic candidates, a scenario-providing module that outputs a batch of active scenarios; and a simulation engine coupled to the decision logic generator and the scenario-providing module and operative to perform the system simulation for scenarios included in the batch of active scenarios.

The one or several integrated circuit(s) may further be operative to execute a performance assessor operative to compute the performance of the several different decision logic candidates for the scenarios included in the batch of active scenarios.

The one or several integrated circuit(s) may further be operative to execute a coordinator that is operative to coordinate operation of the decision logic generator and of the scenario-providing module.

The coordinator may be operative to coordinate operation of the decision logic generator and of the scenario-providing module responsive to an output of a performance assessor that computed the performance.

The coordinator may be operative to control adversarial machine learning models of the decision logic generator and the scenario-creating module.

The coordinator may be operative to control training of the adversarial machine learning models.

The coordinator may be operative to control when training of the decision logic generator and/or the scenario-creating logic terminates.

The coordinator may be operative to prevent termination of training of the decision logic generator and/or the scenario-creating module, depending on a number of the decision logic candidates for which the performance has been evaluated.

The coordinator may be operative to prevent termination of training of the decision logic generator and/or the scenario-creating logic depending on a threshold comparison of the number of the decision logic candidates for which the performance has been evaluated. Training may be continued if the number of decision logic candidates for which the performance has been evaluated is less than a threshold. Alternatively or additionally, training may be continued if the decision logic candidates for which the performance has been evaluated do not adequately cover at least a set of different regions in a parameter space or hyperparameter space.

Alternatively or additionally, the coordinator may be operative to prevent termination of training of the decision logic generator and/or the scenario-creating module, depending on the scenarios that have already been generated by the scenario-creating module.

The coordinator may be operative to prevent termination of training of the decision logic generator and/or the scenario-creating logic depending on a threshold comparison of the number of the scenarios for which system simulations have been performed. Training may be continued if the number of scenarios for which system simulations have been performed is less than a threshold. Alternatively or additionally, training may be continued if the scenarios for which system simulations have been performed does not adequately cover at least a set of different regions in a scenario space.

The coordinator may be operative to terminate the process of generating the decision logic.

The coordinator may be operative to terminate the process of generating the decision logic when an equilibrium is reached.

Alternatively or additionally, the coordinator may be operative to terminate the process of generating the decision logic when no equilibrium is reached based on, e.g., a time-out criterion and/or an iteration threshold criterion on a number of iterations performed in machine learning.

In order to ensure that the generation of the decision logic does not stall prematurely, the coordinator may be operative to perform any one or any combination of: controlling a learning rate of the decision logic generator; continually updating a merging strategy of a scenario-providing module; decelerating, accelerating and/or freezing the generation of new decision logic candidates or of new scenarios; selectively changing a performance metric; re-directing the training process of the decision logic generator or of the scenario-creating logic to prevent stalling.

In order to terminate the process of generating the decision logic, the coordinator may be operative to determine whether any one or any combination of the following conditions is met: the determined performance meets a performance threshold; the determined performance does no improve or a rate of improvement of the determined performance is below a rate threshold; a parameter and/or hyperparameter space defining possible decision logic candidates is sufficiently explored; a parameter space defining possible scenarios is sufficiently explored.

The coordinator may be operative to cause a learning rate of the decision logic generator to be reduced, optionally to freeze a decision logic candidate, if the decision logic candidate is determined to have a good performance (e.g., if the determined performance meets a performance threshold criterion). The coordinator may allow a scenario-providing module to continue outputting new active batches of scenarios for which simulations are performed, in order to continue testing the decision logic candidate that is determined to have a good performance. Alternatively or additionally, the coordinator may control the scenario-providing module to adjust, in particular to increase, a fraction of machine-generated scenarios created by a scenario-creating logic in the active batch of scenario.

Alternatively or additionally, the coordinator may be operative to cause a learning rate of the decision logic generator to increase if the performance determined for a batch of scenarios causes a decision logic candidate to underperform (e.g., if the determined performance does not meet a second performance threshold criterion).

Alternatively or additionally, the coordinator may be operative to cause a learning rate of a scenario-creating logic to be decreased, optionally to freeze the current scenario-creating logic, if the performance determined for a batch of scenarios causes a decision logic candidate to underperform (e.g., if the determined performance does not meet a second performance threshold criterion). The learning rate of the scenario-creating logic may be kept frozen and/or reduced until continued learning of the decision-generating logic results in a decision logic candidate that shows a good performance (e.g., that has a performance that meets a performance threshold criterion) against the scenarios created by the scenario-creating logic.

Alternatively or additionally, the coordinator may be operative to cause scenarios that have previously been identified to cause a decision logic candidate to underperform to be re-introduced, in particular recurrently, into the batch of active scenarios. The coordinator may be operative to trigger such a re-introduction of previously identified challenging scenarios depending on a similarity metric of decision logic candidates. Scenarios found to be challenging for a first decision logic candidate may be re-introduced into the batch of active scenarios for performing system simulations for a second decision logic candidate, provided that the similarity metric shows the first decision logic candidate and the second decision logic candidate to be sufficiently different (e.g., if the similarity metric has a value that exceeds a logic metric threshold).

Alternatively or additionally, the coordinator may be operative to balance exploration (e.g., of scenario a space and/or a parameter and/or hyperparameter space available for the decision logic candidates) and exploitation of available resources (e.g., computing time, hardware resources).

Alternatively or additionally, the coordinator may be operative to monitor a rate of improvement of the decision logic generator and of the scenario-creating logic. The coordinator may cause a learning rate of the decision logic generator or of the scenario-creating logic to be decreased, optionally by freezing the decision logic generator or scenario-creating logic, based on a comparison of a rate of improvement of the decision logic generator and of the scenario-creating logic. The coordinator may be operative to cause the learning rate for the decision logic generator to be decreased if the scenario-creating logic shows a lower rate of improvement. The coordinator may cause the learning rate for the scenario-creating logic to be decreased if the scenario-creating logic shows a lower rate of improvement.

The computing system may be operative to store results of the generation process in a storage.

The computing system may be operative such that each entry in the storage may include information on scenario(s) for which system simulations were performed, information on the decision logic candidate (including information on its parameters and, where applicable, on its architecture) for which the system simulations were performed, and the corresponding value of the performance metric.

An architecture of the decision logic generator (e.g., a number of layers and/or nodes of an ANN) may be defined by information stored in the storage for a process of generating another decision logic for another controller. To generate the decision logic, parameters for the decision logic generator having the architecture defined by the information stored in the database may be determined while keeping the architecture fixed.

Alternatively or additionally, an architecture of the scenario-creating logic (e.g., a number of layers and/or nodes of an ANN) may be defined by information stored in the storage for a process of generating another decision logic for another controller. To generate the decision logic, parameters for the scenario-creating logic having the architecture defined by the information stored in the database may be determined while keeping the architecture fixed.

The computing system may be operative to use transfer learning, including determining an architecture of the decision logic candidates based on the architectures stored in the database for a process of generating another decision logic for another controller.

The computing system may be operative to use transfer learning selectively if the controller and the other controller have a similar or identical function (such as overcurrent protection) and are used in a similar or identical system topology.

The computing system may be operative to deploy the generated decision logic to a controller of an IACS, in particular of an electric power system.

The controller may be a controller for electric power system operation.

The controller may be a controller for electric power system control.

The controller may be a protection relay.

The method may comprise executing the selected decision logic by the controller.

The decision logic may be a protection logic.

The decision logic may be a distance protection logic.

The method may further comprise automatically modifying the decision logic in response to a monitored field behavior of the selected decision logic executed by the controller.

According to another embodiment, a controller operative to execute the generated decision logic is provided.

According to another embodiment, a power system comprising the controller operative to execute the generated decision logic is provided.

A computer-implemented method of generating a decision logic for a controller of an Industrial Automation Control System (IACS) according to another embodiment comprises: executing a Generative Adversarial Network, GAN, that generates (i) decision logic candidates and (ii) scenarios for the decision logic candidates; and selecting and outputting one of the decision logic candidates based on a performance of the decision logic candidates in system simulations for the generated scenarios.

The GAN may provide two logics, a scenario-creating logic and a decision logic generator, that are adversaries to each other. The scenario-creating logic and decision logic generator may learn with the objective of outperforming the other, adversarial logic.

The scenario-creating logic may create at least a fraction of the scenarios for which system simulations are performed.

The decision logic generator may determine parameters or, optionally both an architecture and parameters of the decision logic candidates in the process of generating the decision logic.

The controller may be a controller of a power operation system or of a power protection system.

The performance may be determined for the decision logic candidates in system simulations that simulate system behavior of the system in the generated scenarios, but also in other scenarios that are retrieved from a scenario data repository. The scenario data repository may include scenarios specified by an expert and/or historical scenarios.

A batch of active scenarios for which simulations are performed may be automatically determined and output to a simulation engine.

The batch of active scenarios may be dynamically adjusted.

The batch of active scenarios may be adjusted in response to the computed performance for previously tested decision logic candidates.

The batch of active scenarios may be continually adjusted as new decision logic candidates are iteratively generated.

The batch of active scenarios may be dynamically adjusted in such a manner that, in the batch of active scenarios, a fraction of scenarios taken from a scenario data repository decreases, optionally monotonously.

The fraction of scenarios taken from the scenario data repository may decrease as a function of a number of iterations of an iterative process performed to generate the decision logic.

The batch of active scenarios may be dynamically adjusted in such a manner that, in the batch of active scenarios, a fraction of scenarios generated by the GAN increases, optionally monotonously, in the iterative process of generating the decision logic.

The fraction of scenarios generated by the GAN may increase as a function of a number of iterations of an iterative process performed to generate the decision logic.

The batch of active scenarios may be dynamically adjusted in such a manner that, in the batch of active scenarios, scenarios from a challenging scenarios repository are intermittently re-introduced into the batch of active scenarios. Re-introducing scenarios from the challenging scenarios repository into the batch of active scenarios may be triggered by a change in machine learning model architecture of the decision logic candidate.

The GAN may include a scenario-creating logic that may output a scenario parameter set defining a scenario.

The scenario parameter set may be an ordered parameter set, e.g., an M-tuple, with M an integer greater than one.

The scenario-creating logic may map an input containing at least a description of a decision logic candidate to the scenario parameter set.

The scenario-creating logic may learn based on scenarios previously used in the system simulations and the decision logic performance computed therefor.

Learning of the scenario-creating logic may be done so as to attain convergence towards a scenario-creating logic that successfully challenges the decision logic candidate it receives as an input.

The scenario-creating logic may map an input that is independent of the decision logic candidates to the scenario parameter set. The input may be static or variable, e.g., stochastic.

The scenario-creating logic may be continually updated in the process of generating the decision logic.

The decision logic generator may generate the several decision logic candidates which may have two or more different architectures.

A complexity (e.g., a number of nodes and/or layers) of a machine learning models may be increased as new decision logic candidates are being generated in the process of generating the decision logic.

A progressive neural architecture search may be performed to generate decision logic candidates with increasing complexity.

The two or more different machine learning model architectures may comprise artificial neural network architectures differing from each other in a number of nodes and/or a number of layers, without being limited thereto.

Generating the decision logic candidates may comprise selecting a machine learning model architecture; training a decision logic candidate having the machine learning model architecture until a first termination criterion is fulfilled, and storing performance information for the trained decision logic candidate; if a second termination criterion is not fulfilled, repeating the training and storing steps for a different decision logic candidate having a different machine learning model architecture; if a second termination criterion is fulfilled, selecting and outputting one of the trained decision logic candidates based on the stored performance information.

The decision logic generator may generate decision logic candidates for a single controller of the IACS.

The decision logic generator may generate decision logic candidates for distributed control executed by plural controllers of the IACS.

A learning rate for the decision logic generator may be adjusted while the decision logic generator learns with the aim to generate decision logic candidates that perform better in the system simulations.

The learning rate for the decision logic generator may be adjusted dynamically based on the computed performance or a rate in change of the computed performance.

The learning rate for the decision logic generator may be adjusted dynamically in a non-monotonous manner.

The learning rate may govern a rate of change of parameters adjusted by the decision logic generator in dependence on the computed performance.

The learning rate may govern a rate of change of weights of an ANN in response to a feedback signal.

The learning rate may govern a rate of change of weights of an ANN in response to a feedback signal that depends on the performance determined for the decision logic candidate previously generated by the decision logic generator.

The learning rate may govern a rate of change of weights of an ANN in response to a feedback signal that depends on an output of the candidate decision logic previously generated by the decision logic generator and a correct output known in supervised learning.

The decision logic generator may receive an input that depends on the computed performance and may dynamically adjust the learning rate based on the input.

The decision logic generator may update weights of an artificial neural network using a gradient technique.

The gradient technique may be a gradient descent technique.

The gradient descent technique may be a stochastic gradient descent technique.

The decision logic generator may execute a nested search having an inner loop in which a decision logic candidate is trained without changing a machine learning model architecture, and an optional outer loop in which the architecture is changed.

The decision logic generator may identify parameters of a machine learning model that is a decision logic candidate based on trial-and-error search, model-based search, supervised learning, or reinforcement learning.

The decision logic generator may identify hyperparameters that define an architecture of a machine learning model that is a decision logic candidate based on trial-and-error search, model-based search, supervised learning, or reinforcement learning.

The decision logic generator may be operative to select a modified machine learning model architecture in response to a first termination criterion.

The first termination criterion may depend on a change in performance computed when training decision logic candidates having a fixed machine learning model architecture.

The first termination criterion may depend on a threshold comparison of a change, between iterations of the training, in the performance computed when training decision logic candidates having a fixed machine learning model architecture.

Alternatively or additionally, the first termination criterion may depend on whether the performance computed when training decision logic candidates meets a performance quality criterion, e.g., a performance threshold criterion.

Alternatively or additionally, the first termination criterion may depend on whether generated several decision logic candidates have machine learning model architectures that fulfill a first coverage criterion. The first coverage criterion may involve a threshold comparison and may indicate that, e.g., a threshold percentage of a set of machine learning model architectures available for automatic testing has been reached. The first coverage criterion may be set responsive to a user input, may be fixed, or may be dynamically adjusted based on the computed performance.

Alternatively or additionally, the first termination criterion may depend on whether the scenarios fulfill a second coverage criterion. The second coverage criterion may involve a second threshold comparison and may indicate that, e.g., the scenarios used in the simulations cover an area that is at least a second threshold percentage of the scenario parameter space that is within the system specifications. The second coverage criterion may be set responsive to a user input, may be fixed, or may be dynamically adjusted based on the computed performance.

The decision logic generator may select a new machine learning model architecture from a set of pre-defined machine learning model architectures.

The decision logic generator may select a new machine learning model architecture by transfer learning, using results of a process of generating another decision logic that performs a similar or identical function as the decision logic to be generated.

The decision logic generator may select a new machine learning model architecture different from a machine learning model architecture for which training has previously been performed.

The decision logic generator may perform a search in a hyperparameter space to select the new machine learning model architecture.

The hyperparameter space may include hyperparameters defining a number of layers and/or a number of nodes of an ANN that forms the new machine learning model architecture.

The decision logic generator may select a machine learning model architecture that is identical to a machine learning model architecture that has previously been trained, and the method may comprise performing system simulations and evaluating a performance based on scenarios that have meanwhile been determined to cause other machine learning model architectures to underperform.

The performance may be computed in accordance with a performance metric or several performance metrics.

The method may further comprises receiving, via an interface, an input specifying the performance metric or the several performance metrics.

The method may comprise automatically modifying the performance metric or several performance metrics.

Computing the performance may comprise combining computed values of at least one performance metric determined for a decision logic candidate for a batch of scenarios including several scenarios.

Combining the computed values may comprise weighting the computed values based on a frequency of occurrence of the scenarios in the set during field operation of the IACS.

The performance metric(s) may be identical to a control objective of the decision logic.

The performance metric(s) may include at least one metric that is distinct from, optionally independent from, a control objective of the decision logic.

The method may comprise dynamically changing the performance metric(s) during the method of generating the decision logic.

The performance metric(s) may be any one or any combination of: operation cost, energy not served, electricity price, system stability, available power transfer capacity, selectivity and dependability, controller stability, without being limited thereto.

The input may define one or several key performance indicators, KPIs

The one or several KPIs include one or several of: minimizing cost of electricity, increasing grid power transfer limits, ensuring grid stability, maximizing protection objectives of security and dependability, keeping voltages and currents within limits, maximizing economic benefit.

The performance metric may be based on computed deviations between actions taken by the decision logic in the system simulations and actions known to be correct.

The deviations can be computed in accordance with a norm.

The actions known to be correct may be defined by an expert input (e.g., in supervised learning) or may be derived from historical data.

the system simulations may comprise simulating a behavior of primary and/or secondary devices of a power system.

The power system may be a power generation system, a power transmission system, or a power distribution system.

The system simulations may comprise one or several of: power flow simulations, short-circuit calculations, electromagnetic transient calculations, optimal power flow computation, unit commitment analysis.

The system simulations may be or may comprise any one or any combination of: optimal power flow (OPF) analysis, simulating disturbance(s), executing a short-circuit analysis, executing an electricity market clearing simulation, without being limited thereto.

Disturbance(s) can be simulated in the time and/or frequency domain.

The disturbance(s) may be simulated to assess a stability of the decision logic and/or of the system including the decision logic.

The short circuit analysis may comprise computing signals used by protection relays.

Executing an electricity market clearing simulation may comprise providing nodal electricity prices.

The method may further comprise deploying the generated decision logic to a controller of an IACS, in particular of an electric power system.

The controller may be a controller for electric power system operation.

The controller may be a controller for electric power system control.

The controller may be a protection relay.

The method may comprise executing the selected decision logic by the controller.

The decision logic may be a protection logic.

The decision logic may be a distance protection logic.

The method may further comprise automatically modifying the decision logic in response to a monitored field behavior of the selected decision logic executed by the controller.

A computing system for generating a decision logic for a controller of an Industrial Automation Control System (IACS) according to another embodiment comprises one or several integrated circuits operative to: execute a Generative Adversarial Network, GAN, that generates (i) decision logic candidates and (ii) scenarios for the decision logic candidates; and select and output at least one of the decision logic candidates based on a performance of the decision logic candidates in system simulations for the generated scenarios.

The computing system may be operative to perform the method according to any embodiment.

According to another embodiment, there is provided machine-readable instruction code which, when executed by at least one integrated circuit, causes a computing system to perform the method according to an embodiment.

According to another embodiment, a controller operative to execute the generated decision logic is provided.

According to another embodiment, a power system comprising the controller operative to execute the generated decision logic is provided.

A computer-implemented method of generating a decision logic for a controller of an Industrial Automation Control System (IACS) according to an embodiment comprises: performing an iterative process in which at least one decision logic candidate is iteratively modified in response to results of system simulations, wherein the iterative process comprises identifying challenging scenarios that cause at least some of the decision logic candidates to underperform; and selecting and outputting one of the decision logic candidates as the decision logic for the controller.

Identifying challenging scenarios may comprise determining a performance of the at least one decision logic candidate The controller may be a controller of a power operation system or of a power protection system.

The performance may be determined for the decision logic candidates in system simulations that simulate system behavior of the system in a batch of active scenarios.

A part of the scenarios in the batch may be automatically created by a scenario-creating logic.

Another part of the scenarios may be retrieved from a scenario data repository. The scenario data repository may include scenarios specified by an expert and/or historical scenarios.

Challenging scenarios may be stored in a challenging scenarios repository.

A scenario-providing module may automatically output the batch of active scenarios for which simulations are performed.

The scenario-providing module may automatically determine which scenarios are to be included in the batch of active scenarios and may provide the batch of active scenarios to a simulation engine.

The scenario-providing module may dynamically adjust the batch of active scenarios.

The scenario-providing module may dynamically adjust the batch of active scenarios in response to the computed performance for previously tested decision logic candidates.

The scenario-providing module may continually adjust the batch of active scenarios as the decision logic candidate are iteratively modified.

The scenario-providing module may continually adjust the batch of active scenarios in the process of generating the decision logic.

The scenario-providing module may include scenarios from a scenario data repository into the set of active scenarios.

The scenarios in the scenario data repository may include user-defined scenarios and/or historical scenarios.

The scenario-providing module may adjust the batch of active scenarios in such a manner that, in the batch of active scenarios, a fraction of scenarios taken from a scenario data repository decreases, optionally monotonously, in the iterative process of generating the decision logic.

The fraction of scenarios taken from the scenario data repository may decrease as a function of a number of iterations of the iterative process performed to generate the decision logic.

The scenario-providing module may adjust the batch of active scenarios in such a manner that, in the batch of active scenarios, a fraction of scenarios generated by the scenario-creating logic increases, optionally monotonously, in the iterative process of generating the decision logic.

The fraction of scenarios generated by the scenario-creating logic may increase as a function of a number of iterations of the iterative process performed to generate the decision logic.

The scenario-providing module may adjust the batch of active scenarios in such a manner that at least some of the identified challenging scenarios are recurrently re-introduced into the batch of active scenarios.

Re-introducing challenging scenarios into the batch of active scenarios may be triggered by a change in machine learning model architecture of the decision logic candidates.

The scenario-creating logic may output a scenario parameter set defining a scenario.

The scenario parameter set may be an ordered parameter set, e.g., an M-tuple, with M an integer greater than one.

The scenario-creating logic may map an input containing at least a description of a decision logic candidate to the scenario parameter set.

The scenario-creating logic may learn based on scenarios previously used in the system simulations and the decision logic performance computed therefor.

Learning of the scenario-creating logic may be done so as to attain convergence towards a scenario-creating logic that successfully challenges the decision logic candidate it receives as an input.

The scenario-creating logic may map an input that is independent of the decision logic candidates to the scenario parameter set. The input may be static or variable, e.g., stochastic.

The scenario-creating logic may be continually modified in the process of generating the decision logic.

A learning rate of the scenario-creating logic may be changed.

The learning rate of the scenario-creating logic may be changed automatically in response to the performance of the at least one candidate decision logic in the system simulations and/or a change in the performance of the at least one candidate decision logic in the system simulations.

The at least one decision logic candidate may be modified by changing parameters and/or an architecture.

Modifying the at least one decision logic candidate may be performed automatically by the decision logic generator, which may have any one of the functionalities disclosed herein.

The performance may be computed in accordance with a performance metric or several performance metrics.

The method may further comprises receiving, via an interface, an input specifying the performance metric or the several performance metrics.

The method may comprise automatically modifying the performance metric or several performance metrics.

Computing the performance may comprise combining computed values of at least one performance metric determined for a decision logic candidate for a batch of scenarios including several scenarios.

Combining the computed values may comprise weighting the computed values based on a frequency of occurrence of the scenarios in the set during field operation of the IACS.

The performance metric(s) may be identical to a control objective of the decision logic.

The performance metric(s) may include at least one metric that is distinct from, optionally independent from, a control objective of the decision logic.

The method may comprise dynamically changing the performance metric(s) during the method of generating the decision logic.

The performance metric(s) may be any one or any combination of: operation cost, energy not served, electricity price, system stability, available power transfer capacity, selectivity and dependability, controller stability, without being limited thereto.

The input may define one or several key performance indicators, KPIs

The one or several KPIs include one or several of: minimizing cost of electricity, increasing grid power transfer limits, ensuring grid stability, maximizing protection objectives of security and dependability, keeping voltages and currents within limits, maximizing economic benefit.

The performance metric may be based on computed deviations between actions taken by the decision logic in the system simulations and actions known to be correct.

The deviations can be computed in accordance with a norm.

The actions known to be correct may be defined by an expert input (e.g., in supervised learning) or may be derived from historical data.

Performing the system simulations may comprise simulating a behavior of primary and/or secondary devices of a power system.

The power system may be a power generation system, a power transmission system, or a power distribution system.

Performing the system simulations may comprise one or several of: power flow simulations, short-circuit calculations, electromagnetic transient calculations, optimal power flow computation, unit commitment analysis.

The system simulations may be or may comprise any one or any combination of: optimal power flow (OPF) analysis, simulating disturbance(s), executing a short-circuit analysis, executing an electricity market clearing simulation, without being limited thereto.

Disturbance(s) can be simulated in the time and/or frequency domain.

The disturbance(s) may be simulated to assess a stability of the decision logic and/or of the system including the decision logic.

The short circuit analysis may comprise computing signals used by protection relays.

Executing an electricity market clearing simulation may comprise providing nodal electricity prices.

The method may further comprise deploying the generated decision logic to a controller of an IACS, in particular of an electric power system.

The controller may be a controller for electric power system operation.

The controller may be a controller for electric power system control.

The controller may be a protection relay.

The method may comprise executing the selected decision logic by the controller.

The decision logic may be a protection logic.

The decision logic may be a distance protection logic.

The method may further comprise automatically modifying the decision logic in response to a monitored field behavior of the selected decision logic executed by the controller.

A computing system for generating a decision logic for a controller of an Industrial Automation Control System (IACS) according to another embodiment comprises one or several integrated circuits operative to: perform an iterative process in which at least one decision logic candidate is iteratively modified in response to results of system simulations, wherein the iterative process comprises identifying challenging scenarios that cause at least some of the decision logic candidates to underperform; and select and output at least one of the decision logic candidates as the decision logic for the controller.

The computing system may be operative to perform the method according to any embodiment.

According to another embodiment, there is provided machine-readable instruction code which, when executed by at least one integrated circuit, causes a computing system to perform the method according to an embodiment.

According to another embodiment, a controller operative to execute the generated decision logic is provided.

According to another embodiment, a power system comprising the controller operative to execute the generated decision logic is provided.

A computer-implemented method of generating a decision logic for a controller of an Industrial Automation Control System (IACS) according to an embodiment comprises: executing a decision logic generator to automatically generate several decision logic candidates for the decision logic; computing a performance of the several different decision logic candidates by performing system simulations for several scenarios; controlling the decision logic generator and/or a scenario-providing module that the several scenarios; and selecting and outputting at least one of the decision logic candidates based on the computed performances.

The method may further comprise generating, by a scenario-creating logic of the scenario-providing module, at least a part of the several scenarios.

The scenario-creating logic and the decision logic generator may be implemented by a GAN.

Controlling the decision logic generator and/or the scenario-providing module may comprise controlling adversarial machine learning models of the decision logic generator and the scenario-creating module.

Controlling the decision logic generator and/or the scenario-providing module may comprise controlling a learning rate of the decision logic generator and/or controlling a learning rate of the scenario-creating logic of the scenario-providing module.

A coordinator may be executed to control the decision logic generator and/or the scenario-providing module.

The coordinator may control when training of the decision logic generator and/or the scenario-creating logic terminates.

The coordinator may prevent termination of training of the decision logic generator and/or the scenario-creating module, depending on a number of the decision logic candidates for which the performance has been evaluated.

The coordinator may prevent termination of training of the decision logic generator and/or the scenario-creating logic depending on a threshold comparison of the number of the decision logic candidates for which the performance has been evaluated. Training may be continued if the number of decision logic candidates for which the performance has been evaluated is less than a threshold. Alternatively or additionally, training may be continued if the decision logic candidates for which the performance has been evaluated do not adequately cover at least a set of different regions in a parameter space or hyperparameter space.

Alternatively or additionally, the coordinator may prevent termination of training of the decision logic generator and/or the scenario-creating module, depending on the scenarios that have already been generated by the scenario-creating module.

The coordinator may prevent termination of training of the decision logic generator and/or the scenario-creating logic depending on a threshold comparison of the number of the scenarios for which system simulations have been performed. Training may be continued if the number of scenarios for which system simulations have been performed is less than a threshold. Alternatively or additionally, training may be continued if the scenarios for which system simulations have been performed does not adequately cover at least a set of different regions in a scenario space.

The coordinator may be operative to terminate the process of generating the decision logic.

The coordinator may be operative to terminate the process of generating the decision logic when an equilibrium is reached.

Alternatively or additionally, the coordinator may be operative to terminate the process of generating the decision logic when no equilibrium is reached based on, e.g., a time-out criterion and/or an iteration threshold criterion on a number of iterations performed in machine learning.

In order to ensure that the generation of the decision logic does not stall prematurely, the coordinator may be operative to perform any one or any combination of: controlling a learning rate of the decision logic generator; continually updating a merging strategy of a scenario-providing module; decelerating, accelerating and/or freezing the generation of new decision logic candidates or of new scenarios; selectively changing a performance metric; re-directing the training process of the decision logic generator or of the scenario-creating logic to prevent stalling.

In order to terminate the process of generating the decision logic, the coordinator may be operative to determine whether any one or any combination of the following conditions is met: the determined performance meets a performance threshold; the determined performance does no improve or a rate of improvement of the determined performance is below a rate threshold; a parameter and/or hyperparameter space defining possible decision logic candidates is sufficiently explored; a parameter space defining possible scenarios is sufficiently explored.

The coordinator may be operative to cause a learning rate of the decision logic generator to be reduced, optionally to freeze a decision logic candidate, if the decision logic candidate is determined to have a good performance (e.g., if the determined performance meets a performance threshold criterion). The coordinator may allow a scenario-providing module to continue outputting new active batches of scenarios for which simulations are performed, in order to continue testing the decision logic candidate that is determined to have a good performance. Alternatively or additionally, the coordinator may control the scenario-providing module to adjust, in particular to increase, a fraction of machine-generated scenarios created by a scenario-creating logic in the active batch of scenario.

Alternatively or additionally, the coordinator may be operative to cause a learning rate of the decision logic generator to increase if the performance determined for a batch of scenarios causes a decision logic candidate to underperform (e.g., if the determined performance does not meet a second performance threshold criterion).

Alternatively or additionally, the coordinator may be operative to cause a learning rate of a scenario-creating logic to be decreased, optionally to freeze the current scenario-creating logic, if the performance determined for a batch of scenarios causes a decision logic candidate to underperform (e.g., if the determined performance does not meet a second performance threshold criterion). The learning rate of the scenario-creating logic may be kept frozen and/or reduced until continued learning of the decision-generating logic results in a decision logic candidate that shows a good performance (e.g., that has a performance that meets a performance threshold criterion) against the scenarios created by the scenario-creating logic.

Alternatively or additionally, the coordinator may be operative to cause scenarios that have previously been identified to cause a decision logic candidate to underperform to be re-introduced, in particular recurrently, into the batch of active scenarios. The coordinator may be operative to trigger such a re-introduction of previously identified challenging scenarios depending on a similarity metric of decision logic candidates. Scenarios found to be challenging for a first decision logic candidate may be re-introduced into the batch of active scenarios for performing system simulations for a second decision logic candidate, provided that the similarity metric shows the first decision logic candidate and the second decision logic candidate to be sufficiently different (e.g., if the similarity metric has a value that exceeds a logic metric threshold).

Alternatively or additionally, the coordinator may be operative to balance exploration (e.g., of scenario a space and/or a parameter and/or hyperparameter space available for the decision logic candidates) and exploitation of available resources (e.g., computing time, hardware resources).

Alternatively or additionally, the coordinator may monitor a rate of improvement of the decision logic generator and of the scenario-creating logic. The coordinator may cause a learning rate of the decision logic generator or of the scenario-creating logic to be decreased, optionally by freezing the decision logic generator or scenario-creating logic, based on a comparison of a rate of improvement of the decision logic generator and of the scenario-creating logic. The coordinator may cause the learning rate for the decision logic generator to be decreased if the scenario-creating logic shows a lower rate of improvement. The coordinator may cause the learning rate for the scenario-creating logic to be decreased if the scenario-creating logic shows a lower rate of improvement.

The scenario-creating logic and/or the decision logic generator may be implemented as described in any of the other embodiments disclosed herein.

Computing the performance may comprise combining computed values of at least one performance metric determined for a decision logic candidate for a batch of scenarios including several scenarios.

Combining the computed values may comprise weighting the computed values based on a frequency of occurrence of the scenarios in the set during field operation of the IACS.

The performance metric(s) may be identical to a control objective of the decision logic.

The performance metric(s) may include at least one metric that is distinct from, optionally independent from, a control objective of the decision logic.

The method may comprise dynamically changing the performance metric(s) during the method of generating the decision logic.

The performance metric(s) may be any one or any combination of: operation cost, energy not served, electricity price, system stability, available power transfer capacity, selectivity and dependability, controller stability, without being limited thereto.

The input may define one or several key performance indicators, KPIs.

The one or several KPIs include one or several of: minimizing cost of electricity, increasing grid power transfer limits, ensuring grid stability, maximizing protection objectives of security and dependability, keeping voltages and currents within limits, maximizing economic benefit.

The performance metric may be based on computed deviations between actions taken by the decision logic in the system simulations and actions known to be correct.

The deviations can be computed in accordance with a norm.

The actions known to be correct may be defined by an expert input (e.g., in supervised learning) or may be derived from historical data.

Performing the system simulations may comprise simulating a behavior of primary and/or secondary devices of a power system.

The power system may be a power generation system, a power transmission system, or a power distribution system.

Performing the system simulations may comprise one or several of: power flow simulations, short-circuit calculations, electromagnetic transient calculations, optimal power flow computation, unit commitment analysis.

The system simulations may be or may comprise any one or any combination of: optimal power flow (OPF) analysis, simulating disturbance(s), executing a short-circuit analysis, executing an electricity market clearing simulation, without being limited thereto.

Disturbance(s) can be simulated in the time and/or frequency domain.

The disturbance(s) may be simulated to assess a stability of the decision logic and/or of the system including the decision logic.

The short circuit analysis may comprise computing signals used by protection relays.

Executing an electricity market clearing simulation may comprise providing nodal electricity prices.

The method may further comprise deploying the generated decision logic to a controller of an IACS, in particular of an electric power system.

The controller may be a controller for electric power system operation.

The controller may be a controller for electric power system control.

The controller may be a protection relay.

The method may comprise executing the selected decision logic by the controller.

The decision logic may be a protection logic.

The decision logic may be a distance protection logic.

The method may further comprise automatically modifying the decision logic in response to a monitored field behavior of the selected decision logic executed by the controller.

A computing system for generating a decision logic for a controller of an Industrial Automation Control System (IACS) according to another embodiment comprises one or several integrated circuit operative to: execute a decision logic generator to automatically generate several decision logic candidates for the decision logic; compute a performance of the several different decision logic candidates by performing system simulations for several scenarios; control the decision logic generator and/or a scenario-providing module that the several scenarios; and select and output at least one of the decision logic candidates based on the computed performances.

According to another embodiment, there is provided machine-readable instruction code which, when executed by at least one integrated circuit, causes a computing system to perform the method according to an embodiment.

According to another embodiment, a controller operative to execute the generated decision logic is provided.

According to another embodiment, a power system comprising the controller operative to execute the generated decision logic is provided.

A computer-implemented method of generating a decision logic for a controller of an Industrial Automation Control System (IACS) according to an embodiment comprises: training a decision logic candidate which is an ANN, comprising computing a performance of the decision logic candidate in system simulations for several scenarios; changing an architecture of the ANN to generate a further decision logic candidate; training the further decision logic candidate, comprising computing a performance of the further decision logic candidate in system simulations for several scenarios; and selecting and outputting at least one of the decision logic candidates based on the computed performances.

The steps of changing the architecture, training the further decision logic candidate, and computing a performance of the further decision logic candidate may be iteratively repeated until a termination criterion is fulfilled.

Changing the architecture may comprise changing a number of layers and/or a number of nodes of the ANN.

Changing the architecture may comprise increasing a number of layers and/or a number of nodes of the ANN.

Changing the architecture may comprise a progressive neural architecture search.

Training the decision logic candidate and training the further decision logic candidate may comprise changing weights of the ANN to improve the performance in the system simulations.

The method may comprise automatically generating at least a part of the several scenarios.

A decision-creating logic may be executed to automatically generate at least a part of the several scenarios.

A learning rate that may govern a rate of change of the weights may be automatically adjusted during the training.

The learning rate may govern a rate of change of the weights in response to a feedback signal.

The learning rate may govern a rate of change of the weights in response to a feedback signal that depends on the performance determined for the decision logic candidate previously generated by the decision logic generator.

The learning rate may govern a rate of change of the weights in response to a feedback signal that depends on an output of the candidate decision logic previously generated by the decision logic generator and a correct output known in supervised learning.

The weights may be changed using a gradient technique.

The gradient technique may be a gradient descent technique.

The gradient descent technique may be a stochastic gradient descent technique.

The weights may be changed based on trial-and-error search, model-based search, supervised learning, or reinforcement learning.

Performing the system simulations may comprise simulating a behavior of primary and/or secondary devices of a power system.

The power system may be a power generation system, a power transmission system, or a power distribution system.

Performing the system simulations may comprise one or several of: power flow simulations, short-circuit calculations, electromagnetic transient calculations, optimal power flow computation, unit commitment analysis.

The system simulations may be or may comprise any one or any combination of: optimal power flow (OPF) analysis, simulating disturbance(s), executing a short-circuit analysis, executing an electricity market clearing simulation, without being limited thereto.

Disturbance(s) can be simulated in the time and/or frequency domain.

The disturbance(s) may be simulated to assess a stability of the decision logic and/or of the system including the decision logic.

The short circuit analysis may comprise computing signals used by protection relays.

Executing an electricity market clearing simulation may comprise providing nodal electricity prices.

The method may further comprise deploying the generated decision logic to a controller of an IACS, in particular of an electric power system.

The controller may be a controller for electric power system operation.

The controller may be a controller for electric power system control.

The controller may be a protection relay.

The method may comprise executing the selected decision logic by the controller.

The decision logic may be a protection logic.

The decision logic may be a distance protection logic.

The method may further comprise automatically modifying the decision logic in response to a monitored field behavior of the selected decision logic executed by the controller.

A computing system for generating a decision logic for a controller of an Industrial Automation Control System (IACS) according to an embodiment comprises one or several integrated circuit operative to: train a decision logic candidate which is an ANN, comprising computing a performance of the decision logic candidate in system simulations for several scenarios; change an architecture of the ANN to generate a further decision logic candidate; train the further decision logic candidate, comprising computing a performance of the further decision logic candidate in system simulations for several scenarios; and select and output at least one of the decision logic candidates based on the computed performances.

According to another embodiment, there is provided machine-readable instruction code which, when executed by at least one integrated circuit, causes a computing system to perform the method according to an embodiment.

According to another embodiment, a controller operative to execute the generated decision logic is provided.

According to another embodiment, a power system comprising the controller operative to execute the generated decision logic is provided.

A computer-implemented method of generating a decision logic for a controller of an Industrial Automation Control System (IACS) according to an embodiment comprises: automatically generating several decision logic candidates for the decision logic, wherein an architecture of at least one of the decision logic candidates is determined using transfer learning; computing a performance of the several different decision logic candidates in response to scenarios, comprising performing system simulations; and selecting and outputting at least one of the decision logic candidates based on the computed performances.

The architecture of at least one of the decision logic candidates may be determined based on a decision logic architecture obtained in a machine learning procedure for another decision logic of another controller of the IACS.

The method may comprise retrieving information on the decision logic architecture obtained in a machine learning procedure for another decision logic of another controller of the IACS from a data repository.

The method may comprise identifying, based on a function to be performed by the decision logic and, optionally, based on a system topology, the other decision logic in the data repository.

The other decision logic may have a function that is identical or similar to that of the decision logic to be generated.

The other decision logic may be executed by another controller deployed in a system topology that is determined to be identical or similar, when employing a similarity metric, to the network topology in which the controller is deployed.

The method may comprise executing a decision logic generator that modifies the parameters of at least one of the decision logic candidates to generate other decision logic candidates.

The decision logic generator may optionally modify an architecture (e.g., a number of layers and/or of nodes of an ANN) as compared to the architecture determined by transfer learning.

The decision logic generator may optionally increase a complexity of the architecture (e.g., by increasing a number of layers and/or of nodes of an ANN) to improve performance of the candidate decision logic in an iterative process.

The method may comprise executing a scenario-creating logic to generate at least a part of the scenarios used in the system simulations.

The scenario-creating logic and the decision logic generator may be adversarial logics.

A GAN may be executed to implement the scenario-creating logic and the decision logic generator.

Performing the system simulations may comprise simulating a behavior of primary and/or secondary devices of a power system.

The power system may be a power generation system, a power transmission system, or a power distribution system.

Performing the system simulations may comprise one or several of: power flow simulations, short-circuit calculations, electromagnetic transient calculations, optimal power flow computation, unit commitment analysis.

The system simulations may be or may comprise any one or any combination of: optimal power flow (OPF) analysis, simulating disturbance(s), executing a short-circuit analysis, executing an electricity market clearing simulation, without being limited thereto.

Disturbance(s) can be simulated in the time and/or frequency domain.

The disturbance(s) may be simulated to assess a stability of the decision logic and/or of the system including the decision logic.

The short circuit analysis may comprise computing signals used by protection relays.

Executing an electricity market clearing simulation may comprise providing nodal electricity prices.

The method may further comprise deploying the generated decision logic to a controller of an IACS, in particular of an electric power system.

The controller may be a controller for electric power system operation.

The controller may be a controller for electric power system control.

The controller may be a protection relay.

The method may comprise executing the selected decision logic by the controller.

The decision logic may be a protection logic.

The decision logic may be a distance protection logic.

The method may further comprise automatically modifying the decision logic in response to a monitored field behavior of the selected decision logic executed by the controller.

A computing system for generating a decision logic for a controller of an Industrial Automation Control System (IACS) according to another embodiment comprises one or several integrated circuits operative to: automatically generate several decision logic candidates for the decision logic, wherein an architecture of at least one of the decision logic candidates is determined using transfer learning; compute a performance of the several different decision logic candidates in response to scenarios, comprising performing system simulations; and select and output at least one of the decision logic candidates based on the computed performances.

According to another embodiment, there is provided machine-readable instruction code which, when executed by at least one integrated circuit, causes a computing system to perform the method according to an embodiment.

According to another embodiment, a controller operative to execute the generated decision logic is provided.

According to another embodiment, a power system comprising the controller operative to execute the generated decision logic is provided.

A computer-implemented method of generating a closed-loop control logic for a controller of a power system according to an embodiment comprises: automatically generating several control logic candidates for the control logic; computing a performance of the several different control logic candidates in response to scenarios, comprising performing system simulations; and selecting and outputting at least one of the control logic candidates based on the computed performances.

The controller may be a controller for a power transmission system.

The controller may be a controller for preventive security.

The controller may be a controller for corrective security.

The scenarios may respectively define an operating point of the power system.

The operating point may include any one or any combination of: P and Q injections of power sources (generators and/or energy storage), P and Q consumption at nodes, P and Q injections of HVDC converter stations, FACTS devices, settings of shunt components (capacitors, reactors), phase shifters, LVRs and OLTCs, status of switches, resulting P and Q power flows in grid branches (such as lines, cables, transformers, converter stations, etc.).

A scenario used in the system simulations may include parameters that define an operating point.

Alternatively or additionally, the scenario used in the system simulations may include a contingency or event (e.g., a fault in a line).

Alternatively or additionally, the scenario used in the system simulations may include exogeneous variables. The exogeneous variables may include ambient conditions that effect power generation or power consumption. The exogeneous variables may include one or several of temperature, wind speed, solar irradiance, time, season.

Alternatively or additionally, the scenario used in the system simulations may include forecasts, such as load forecasts and/or renewable generation forecasts.

Computing a performance may comprise determining, in the system simulation, an operating point resulting from actions suggested by the control logic candidate and determining whether the operating point resulting from the suggested actions is acceptable.

Determining whether the operating point resulting from the suggested actions is acceptable may comprise determining whether the operating point results in instability. The instability may be quantified by an eigenvalue analysis. Determining whether the operating point resulting from the suggested actions is acceptable may comprise determining a distance from a closest acceptable operating point.

Computing a performance may comprise computing a cost, at least if the operating point resulting from the suggested actions is acceptable. The cost may be dependent on power transmission losses and/or total power produced by renewable energy sources. The cost may be financial cost. The cost may be cost of a control action. The cost may include a cost of an operating point prior to the simulated contingency. The cost of the operating point prior to the simulated contingency may be determined using a lookup table or using market clearing optimization.

The system simulations may comprise a power system simulation in time and/or frequency domain, which may be operative to simulate a dynamic behavior of the power system, including actions triggered by the control logic candidate.

The system simulations may comprise forecasting renewable energy generation and/or forecasting demand.

The system simulations may comprise an AC power flow analysis.

The system simulations may include a market clearing simulation.

A scenario-creating logic may be executed to create at least part of the scenarios.

The scenario-creating logic may be a machine learning model.

The scenario-creating logic may iteratively learn while parameters of at least one of the control logic candidates are updated and/or control logic candidates having different machine learning model architectures are challenged by scenarios in system simulations.

The scenario-creating logic may be an adversarial logic to a decision logic generator that automatically modifies a control logic candidate in response to a performance assessment of simulation results to generate another control logic candidate.

The scenario-creating logic and the decision logic generator may be a generative adversarial network (GAN).

The scenario-creating logic may be constrained to only generate scenarios that are within a system specification of the power system.

The method may further comprise storing one or several challenging scenarios that cause a control logic candidate having a first machine learning model architecture to underperform.

Challenging scenarios that cause a previously tested control logic candidate to underperform (e.g., to have a performance that is less than a performance threshold) may be recurrently re-introduced into a batch of active scenarios for which system simulations are performed.

Reintroducing one or several challenging scenarios into the batch of active scenarios may be triggered by a change in architecture (e.g., a change in a number of layers and/or a number of nodes of an ANN) of the control logic candidate.

The batch of active scenarios may be dynamically adjusted in such a manner that, in the batch of active scenarios, a fraction of scenarios generated by the scenario-creating logic increases, optionally monotonously, as performance of control logic candidates is computed.

A complexity (e.g., a number of nodes and/or layers) of the control logic candidates may be increased as new control logic candidates are being generated in the process of generating the control logic.

Modifying the control logic candidates can be performed using the decision logic generator according to any one of the embodiments disclosed herein.

The scenario-creating logic may be operative as described in association with any one of the embodiments disclosed herein.

A coordinator may be used to coordinate operation of the decision logic generator and of the scenario-creating logic, which may be operative as described in association with any one of the embodiments disclosed herein.

A learning rate of the decision logic generator and/or of the scenario-creating logic may be dynamically adjusted depending on an evolution of the computed performance.

A learning rate of the decision logic generator may be decreased, optionally by freezing the decision logic generator, if the control logic candidates consistently show a performance that meets a performance quality criterion in system simulations of scenarios generated by the scenario-creating module.

A learning rate of the scenario-creating logic may be decreased, optionally by freezing the scenario-creating logic, if the control logic candidates consistently show a performance that does not meet a performance quality criterion in system simulations of scenarios generated by the scenario-creating module.

The method may further comprise deploying the generated control logic to a controller of an electric power system.

The method may comprise executing the selected control logic by the controller.

The method may further comprise automatically modifying the control logic in response to a monitored field behavior of the selected control logic executed by the controller.

A computing system for generating a closed-loop control logic for a controller of a power system according to another embodiment comprises one or several integrated circuits operative to: automatically generate several control logic candidates for the control logic; compute a performance of the several different control logic candidates in response to scenarios, comprising performing system simulations; and select and output at least one of the control logic candidates based on the computed performances.

According to another embodiment, there is provided machine-readable instruction code which, when executed by at least one integrated circuit, causes a computing system to perform the method according to an embodiment.

According to another embodiment, a controller operative to execute the generated decision logic is provided.

According to another embodiment, a power system comprising the controller operative to execute the generated decision logic is provided.

A computer-implemented method of generating a protection logic for a controller of a power system according to an embodiment comprises: automatically generating several protection logic candidates for the protection logic; computing a performance of the several different protection logic candidates in response to scenarios, comprising performing system simulations; and selecting and outputting at least one of the protection logic candidates based on the computed performances.

The controller may be a controller for a power transmission system.

The controller may be a controller for a power distribution system.

The controller may be a protection relay.

A scenario used in the system simulations may include any one or any combination of:

a type of faults (requiring an action) or switching event (not requiring an action); this may include, without limitation, single-phase-to-ground, phase-to-phase, three-phase faults along transmission/distribution lines; busbar faults; generator/load switching;

a fault inception angle (i.e. fault occurrence moment: whether the fault occurs at zero crossing or at maximum value of the current);

a loading level in the system a fault locations along transmission/distribution lines a generation pattern in the system when the load is supplied dominantly by conventional generation or when the load is supplied dominantly by converter-interfaced generation a topology that might be encountered during the normal operation of the system.

Different scenarios may be different from each other in one or more of the above.

All scenarios may be within the system specification of the power system.

Computing a performance may comprise computing speed, dependability and security of the protection logic candidate in the system simulations.

The performance may be computed as a weighted sum of speed, dependability, and security.

The system simulations may comprise an AC short circuit analysis.

The system simulations may comprise an AC power flow analysis.

The system simulations may comprise a power system simulation in time and/or frequency domain, which may be operative to simulate a dynamic behavior of the power system, including actions triggered by the control logic candidate.

A scenario-creating logic may be executed to create at least part of the scenarios.

The scenario-creating logic may be a machine learning model.

The scenario-creating logic may iteratively learn while parameters of at least one of the protection logic candidates are updated and/or protection logic candidates having different machine learning model architectures are challenged by scenarios in system simulations.

The scenario-creating logic may be an adversarial logic to a decision logic generator that automatically modifies a protection logic candidate in response to a performance assessment of simulation results to generate another protection logic candidate.

The scenario-creating logic and the decision logic generator may be a generative adversarial network (GAN).

The scenario-creating logic may be constrained to only generate scenarios that are within a system specification of the power system.

The method may further comprise storing one or several challenging scenarios that cause a protection logic candidate having a first machine learning model architecture to underperform.

Challenging scenarios that cause a previously tested protection logic candidate to underperform (e.g., to have a performance that is less than a performance threshold) may be recurrently re-introduced into a batch of active scenarios for which system simulations are performed.

Reintroducing one or several challenging scenarios into the batch of active scenarios may be triggered by a change in architecture (e.g., a change in a number of layers and/or a number of nodes of an ANN) of the protection logic candidate.

The batch of active scenarios may be dynamically adjusted in such a manner that, in the batch of active scenarios, a fraction of scenarios generated by the scenario-creating logic increases, optionally monotonously, as performance of protection logic candidates is computed.

A complexity (e.g., a number of nodes and/or layers) of the protection logic candidates may be increased as new protection logic candidates are being generated in the process of generating the protection logic.

Modifying the protection logic candidates can be performed using the decision logic generator according to any one of the embodiments disclosed herein.

The scenario-creating logic may be operative as described in association with any one of the embodiments disclosed herein.

A coordinator may be used to coordinate operation of the decision logic generator and of the scenario-creating logic, which may be operative as described in association with any one of the embodiments disclosed herein.

A learning rate of the decision logic generator and/or of the scenario-creating logic may be dynamically adjusted depending on an evolution of the computed performance.

A learning rate of the decision logic generator may be decreased, optionally by freezing the decision logic generator, if the protection logic candidates consistently show a performance that meets a performance quality criterion in system simulations of scenarios generated by the scenario-creating module.

A learning rate of the scenario-creating logic may be decreased, optionally by freezing the scenario-creating logic, if the protection logic candidates consistently show a performance that does not meet a performance quality criterion in system simulations of scenarios generated by the scenario-creating module.

The method may further comprise deploying the generated protection logic to a controller of an electric power system.

The method may comprise executing the selected protection logic by the controller.

The method may further comprise automatically modifying the protection logic in response to a monitored field behavior of the selected protection logic executed by the controller.

A computing system for generating a protection logic for a controller of a power system according to an embodiment comprises one or several integrated circuits operative to: automatically generate several protection logic candidates for the protection logic; compute a performance of the several different protection logic candidates in response to scenarios, comprising performing system simulations; and select and output at least one of the protection logic candidates based on the computed performances.

According to another embodiment, there is provided machine-readable instruction code which, when executed by at least one integrated circuit, causes a computing system to perform the method according to an embodiment.

According to another embodiment, a controller operative to execute the generated decision logic is provided.

According to another embodiment, a power system comprising the controller operative to execute the generated decision logic is provided.

Various effects are attained by the methods, computing systems, controllers, and systems according to embodiments.

For illustration, the methods and systems according to embodiments facilitate automating the process of designing decision logic. A human expert engineer can influence the process, e.g., by selecting the labeled training data that is used in the learning or by specifying a performance metric.

The methods and systems according to embodiments also facilitate the generation of a decision logic that provides robustness in field operation. A wide variety of scenarios, including scenarios that occur infrequently during field operation of the decision logic and that may therefore not be included in historical data or expert-defined data, may be generated to assess performance of the decision logic during the computer-implemented process that results in the decision logic.

Methods, computing systems, controllers, and systems according to embodiments may be used for controllers of power generation, transmission, or distribution systems, without being limited thereto.

BRIEF DESCRIPTION OF THE DRAWINGS

The subject-matter of embodiments will be explained in more detail with reference to preferred exemplary embodiments which are illustrated in the attached drawings, in which.

DETAILED DESCRIPTION OF EMBODIMENTS

Example embodiments will be described with reference to the drawings in which identical or similar reference signs designate identical or similar elements. While some embodiments will be described in the context of a power generation system or power distribution system, the methods and devices described in detail below may be used in a wide variety of system.

The features of embodiments may be combined with each other, unless specifically noted otherwise.

According to embodiments, machine learning (such as supervised machine learning or reinforcement learning) is used to generate a decision logic of a controller of an Industrial Automation Control System (IACS), such as an electric power system. Protection functions in electric power systems (such as power generation or power transmission systems) are examples for such a decision logic. For illustration, the techniques disclosed herein may be used to generate the decision logic of a digital protection relay, using machine learning techniques, without being limited thereto.

Figure 1:
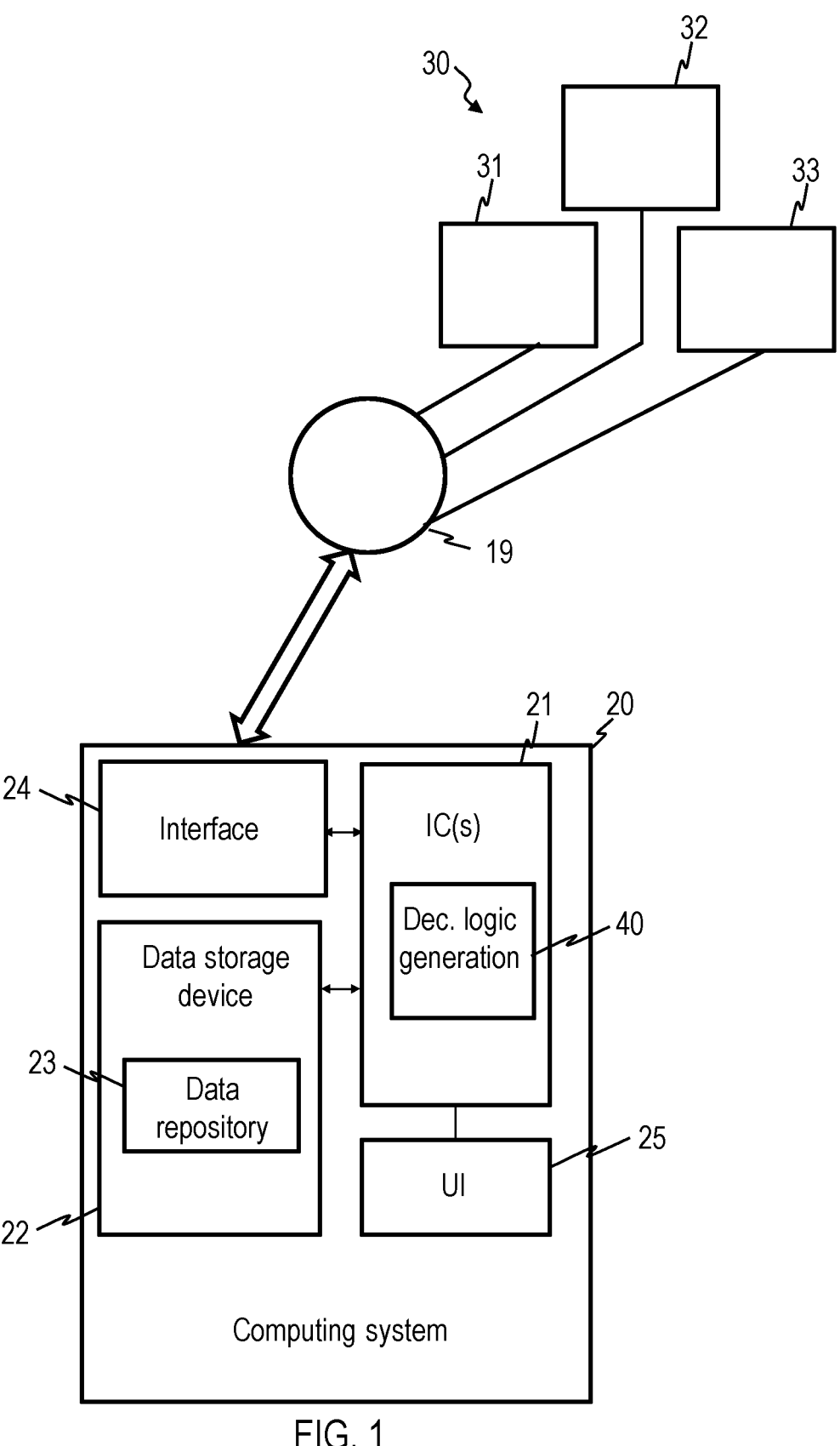
FIG. 1 is a schematic representation of a system comprising a computing system for generating a decision logic.

FIG. 1 is a schematic representation of a system according to an embodiment.

The system comprises one or several controllers 31, 32, 33, collectively referred to as controllers 30. The controllers 31, 32, 33 may respectively be operative to perform functions, such as protection functions, in response to signals from sensors, merging units, intelligent electronic devices (IEDs) or other devices that provide data relating to operation of an IACS, power generation system, power transmission system, or power distribution system. For illustration, one or several of the controllers 31, 32, 33 may be a digital protection relay that determines whether a circuit breaker (CB) is to trip, and whether a trip is an immediate or delayed trip.

A computing system 20 is operative to automatically generate the decision logic executed by a controller 31 or the several decision logics executed by several controllers 31-33. The trained ML model may be deployed to the respective controller 31, 32, 33 for execution during live operation of the IACS, e.g., operation of an electric power system.

The decision logic is specifically designed for the controller in which it is deployed and the function(s) performed by such a controller. If a controller performs plural different functions, plural different decision logics may be deployed in that controller.

Generally, a first controller 31 may have a first decision logic deployed therein.

A second controller 32 may have a second decision logic deployed therein, the second decision logic may operate differently from the first decision logic. For illustration, the decision logic inputs and/or decision logic outputs of the second decision logic may be different from the decision logic inputs and/or decision logic outputs of the first decision logic. Alternatively or additionally, decision boundaries of the second decision logic may be different from decision boundaries of the first decision logic, even when the first and second decision logics receive the same decision logic inputs and/or generate the same type of decision logic output signals. Alternatively or additionally, an architecture of the second decision logic (e.g., the number of layers, nodes, and/or weights of links of an artificial neural network (ANN) used to operate as the second decision logic) may be different from an architecture of the first decision logic.

A third controller 33 may have a third decision logic deployed therein, the third decision logic may operate differently from the first and second decision logics. For illustration, the decision logic inputs and/or decision logic outputs of the third decision logic may be different from the decision logic inputs and/or decision logic outputs of the first and second decision logic. Alternatively or additionally, decision boundaries of the third decision logic may be different from decision boundaries of the first and second decision logics, even when the first, second, and third decision logics receive the same decision logic inputs and/or generate the same type of decision logic output signals. Alternatively or additionally, an architecture of the third decision logic (e.g., the number of layers, nodes, and/or weights of links of an artificial neural network (ANN) used to operate as the third decision logic) may be different from an architecture of the first and second decision logics.

As used herein, the term "decision logic" in particular can refer to the logic that, when executed by a controller 31, 32, 33 of the electric power system (or of another IACS), causes the controller to determine which control action is to be taken in response to signals provided by one or several data sources (sensors, merging units, etc.). The decision logic may be a classifier, which outputs one of a discrete set of control actions, without being limited thereto.

The controllers 31, 32, 33 may include one or several local controllers in which the decision logic 35 is deployed. A local controller monitored by a supervisory system according to embodiments may be selected from a group consisting of: The local controller may be selected from a group consisting of: a protection relay, a control systems of a generator (e.g. a governor and exciter/automatic voltage regulator), a control system of high-voltage, direct current (HVDC) device(s), a control system of flexible alternating current transmission system (FACTS) device(s), a decision logic of switched capacitors and/or reactors, an under-frequency shedding relay, and under-voltage load shedding relay, without being limited thereto.

The controllers 31, 32, 33 may include one or several central controllers in which a decision logic generated by the computing system 20 is deployed. A central controller monitored by a supervisory system may be selected from a group consisting of: an energy management system (EMS)/distribution management system (DMS), e.g., decision logic for secondary frequency control, decision logic for generation re-dispatch, decision logic for utilization of demand flexibility, decision logic for reclosing operations, decision logic for secondary voltage control by means of reactive power redispatch, decision logic coordinating actions across the grid such as in the case of system protection schemes or remedial action schemes which typically need to be activated following a disturbance, without being limited thereto.

Controllable quantities may be selected from the group consisting of: active (P) and reactive (Q) power injections of all generators and energy storage systems; P/Q injections of DC links or back-to-back DC; Q injections of FACTS devices such as a static VAR compensator (SVC) or Static Synchronous Compensator (STATCOM); power flow control devices; tap positions of capacitors banks, reactors and OLTCs; demand; P/Q injections by e-fleets; status of switches/reclosers, etc., without being limited thereto.

Components such as energy storage devices, electric vehicles and various distributed energy resources (DER) can be controlled in a local and/or a centralized manner (e.g. aggregated use of DER or control of a fleet of electric vehicles, offering various grid controllability services). The techniques described herein are applicable to monitoring controllers of DERs and/or energy storage devices, without being limited thereto.

The decision logic may be any one of the following, without being limited thereto: (i) a logic in a control system of a FACTS or HVDC device or a generator, (ii) a protection logic in a relay, (iii) a decision logic for switching of capacitors/reactors or for shedding load, (iv) a decision logic at SCADA/EMS/DMS level, e.g. for frequency/voltage control, reclosing operations, generation re-dispatch or utilization of demand flexibility, (v) a decision logic at the EMS/BMS of a site (building, factory, microgrid etc.), (vi) a control logic of converters interfacing resources such as PVs or energy storage, etc.

The decision logic deployed in the controller takes decisions in response to inputs. The inputs are obtained by relying on system observables. Depending on the case, the observability can be local (e.g. voltage and current at the bus where a flexible alternating current transmission system (FACTS) device(s) is connected), regional, or system-wide (e.g. synchrophasor measurements from a set of network buses.) In addition to electric measurements, the observables received as input by the decision logic can include a status of devices (such as status of switches, or various control setpoints), or more generally a dynamical network topology. The observables received as input by the decision logic can include input(s) that are exogeneous from the power system, such as observed or forecasted weather, electricity prices, date, time, traffic conditions, etc. The controllers 31, 32, 33 may be equipped with more than one setting groups so that the controller automatically switches between these settings with respect to a change in the conditions of the observed environment.

Frequently, local controllers make decisions based on locally available measurements and central controllers make decisions based on system-wide observability and controls actuators that are throughout the power system. There can be cases, however, where a local controller acts based on input signal coming from remote location(s) in the system or a system-wide control action is initiated based on a local measurement. An example of the first case is the actuation of a FACTS controller for electromechanical oscillation damping (located where it has the most efficient impact) based on remote measurements (located where they provide the best observability.) An example of the second case is congestion alleviation of a line/transformer by means of generation re-dispatch. The techniques of monitoring operation of a decision logic disclosed herein are applicable in all of these cases.

The decision logic of a controllers 31, 32, 33 is developed when a new controller is to be commissioned. During a design phase, simulations of various conditions in the power grid, such as faults, switching events, changing loading etc., are performed to evaluate and refine the performance of the decision logic. This process is performed in a computer-implemented manner by the computing system 20.

The computing system 20 may be implemented by computer(s), server(s) or distributed computing systems. The computing system 20 includes at least one integrated circuit 21. The at least one integrated circuit 21 may comprise a processor, a microprocessor, a microcontroller, and application specific integrated circuit (ASIC) or any combination thereof.

The at least one integrated circuit 21 may be operative to execute a decision logic generation system 40. The decision logic generation system 40 may be operative to execute supervised machine learning or reinforcement learning to determine parameters of a decision logic and, optionally, to determine both an architecture and parameters of the decision logic.

As used herein, "training" a decision logic or a decision logic candidate refers to a process of determining parameter values for parameters of the decision logic or decision logic candidate. For illustration, training a decision logic candidate may include determining weights of an ANN.

The decision logic generation system 40 may be operative to not only determine parameters of the decision logic, but to determine an architecture of the decision logic (e.g., a number of layers and/or nodes of the ANN to be deployed as decision logic).

Data used by the decision logic generation system 40 may be stored in a data repository, which may be local in a storage device 22 or remote from the IC(s) 21. The data repository 23 may include historical data (representing previous operational conditions and control actions) or data defined by a human engineer. Data in the data repository 23 may include labeled data for performing the supervised machine learning. It will be appreciated that significant amounts of suitable labeled data 25 are available from historical records.

The data repository 23 may also have stored therein a set of possible decision logic architectures that may be selected for being trained. The set of possible decision logic architectures may be stored locally in the data storage device 22 or remotely. The computing system 20 may automatically select one or several of the possible decision logic architectures for training Information on the topology of the power system, e.g., of a power generation, distribution, or transmission system, may be used for selecting possible decision logic architectures for training. The integrated circuit(s) 21 may be adapted to analyze a standardized configuration description, such as an SCD file, of the power system, to determine which one(s) of the plural possible decision logic architectures are to be trained.

The possible decision logic architectures may be distinguished from each other in, e.g., the arrangement and number of different artificial neural networks, layers, or nodes used therein, the feed-forward functions of the artificial neural networks, the number of layers, etc.

The computing system 20 has a user interface 25. The user interface 25 may include an optical output device. The computing system 20 may be operative to output, via the user interface 25, information that allows a human operator to check, verify, or otherwise assess how the decision logic determined by the decision logic generation system 40, which has desired performance characteristics, behaves. For illustration, the integrated circuit(s) 21 of the computing system 20 may be adapted to generate and output graphics via the user interface 25 to illustrate how the generated decision logic behaves.

The computing system 20 may have an interface 24 for outputting the generated decision logic. The interface 24 may be communicatively coupled, e.g. via a communication hub 19, to the controllers 31, 32, 33.

Different decision logics will be output to each one of the controllers 31, 32, 33, depending on the configuration and topology of the power generation, distribution or transmission system in which the respective controllers are used.

The computing system 20 may be adapted such that, in addition to performance of the generated decision logic, the complexity of the information that relates the intermediate signals of the ML model to the ML model inputs and/or ML model outputs may also be considered as a criterion for the sum the generated decision logic is suitable for being deployed to one of the controllers. In this manner, only generated decision logics that have high performance while complying with an interpretability criterion can be output.

During operation of a power generation, distribution, or transmission network, the controllers 31, 32, 33 may execute the decision logic deployed thereon. One or several of the controllers 31, 32, 33 may process signals (such as currents, voltages, or quantities derived therefrom in the time domain or frequency domain), using that decision logic, to determine which control or other action is to be performed. Circuit breaker (CB) trips or other control actions may be performed, depending on the desired use of the controller 31, 32, 33.

Optionally, the controllers 31, 32, 33 may provide operational data to the computing system 20. The operational data may be used for performing a performance assessment and/or for storing in the data storage device 22. When labeled, this data can be used in future decision logic generation processes.

Figure 2:
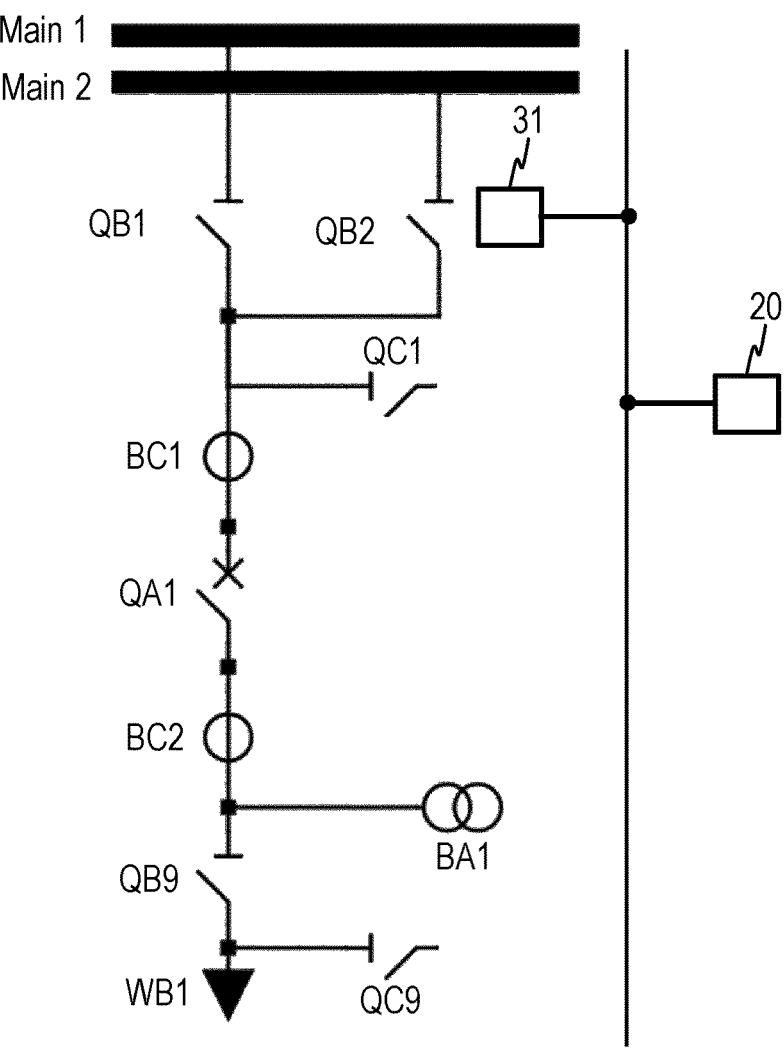
FIG. 2 is a schematic representation of a system.

FIG. 2 is a schematic diagram illustrating a computing system 20 and a controller 31 executing the decision logic automatically generated by the computing system 20, used in conjunction with components of a power system. For illustration, a bay of a power substation may include switches QB1, QB2, QC2, AQ1, QB9, and QC9, transformers BC1, BC2 for current sensing and transformers BA1 for voltage sensing. Sensor devices are deployed to generate raw signals that may be provided, optionally via a merging unit, gateway, or other unit, to the controller 31.

The computing system 20 is adapted to automatically generate and optionally automatically deploy the decision logic that is performed by the controller 31, as described in more detail herein.

In field operation, the decision logic executed by the controller 31 may receive currents and voltages as raw signals in the time of frequency domain. Optionally, preprocessing may be performed. For illustration, in addition to, or instead of, raw voltage and current measurement, the decision logic generation system 40 can rely on different types of input signals, depending on the type of protection which is sought (e.g. distance relaying, (under/over) frequency relaying etc.). The source of input signals does not need to be limited to local instrumentation but can be wide-area instrumentation as well as a central SCADA. This applies both to supervised machine learning and field operation of the decision logic in the respective controller 31, 32, 33.

Figures 4, 5:
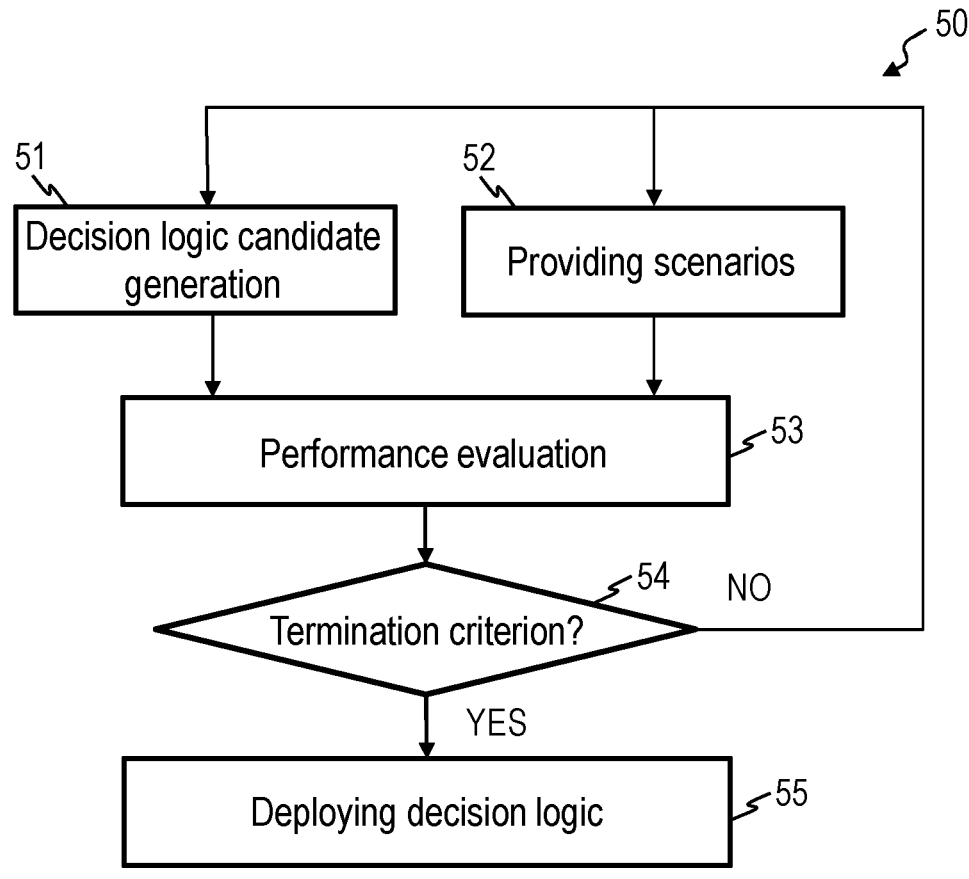
FIG. 4 is a flow chart.
FIG. 5 is a block diagram of a system for generating a decision logic.

FIG. 4 is a block diagram showing a possible implementation of the decision logic generation system 40.

The decision logic generation system 40 may comprise a decision logic generator 41. The decision logic generator 41 is operative to generate several different decision logic candidates. The several different decision logic candidates may be distinguished from each other in parameters (e.g., coefficients of a PID closed-loop controller or weights of an ANN). The several different decision logic candidates may be distinguished from each other in decision logic architecture (e.g., ANN, support vector machines (SVMs), other machine learning models, PID controllers etc.). The decision logic generator may output a decision logic candidate of the several different decision logic candidates to a simulation engine 43.

The decision logic generation system 40 may comprise a scenario-providing module 42. The that scenario-providing module 42 may be operative to output a batch of active scenarios for which system simulations are performed. The batch of active scenarios may comprise a scenario-creating logic that generates new scenarios, as will be explained in more detail below.

The decision logic generation system 40 may comprise a simulation engine 43 coupled to the decision logic generator 41 and the scenario-providing module 42. The simulation engine 43 may be operative to perform the system simulation for scenarios included in the batch of active scenarios.

The system simulations performed by the simulation engine 43 are not limited to determining the response of the candidate decision logic to a certain scenario, but rather include simulating how the system (e.g., the power generation, distribution, or transmission system) responds to the action taken by the candidate decision logic in the system simulation. The system simulations may comprise computing currents, voltages, phasors, synchrophasors etc. in the power system, which result from decision taken by the by the candidate decision logic in the system simulation.

The simulation engine 43 may be operative to perform the system simulations for each one of several candidate decision logics, respectively for a batch of active scenarios. The batch of active scenarios may be iteratively modified, as explained in more detail elsewhere herein.

The decision logic generation system 40 may comprise a performance assessor 44. The performance assessor may be operative to compute a performance of each decision logic candidate for scenarios included in the batch of active scenarios.

The performance assessor 44 may compute one or several KPIs, which may be user-specified. The one or several KPIs may be combined into a performance value, which may be a scalar value. The one or several KPIs may be computed for each of the scenarios in the active batch of scenarios. Weighting may be performed (e.g., by a weighted summation of KPIs or performance values) to take into account that some scenarios occur more frequently in field operation than other.

The decision logic generation system 40 may comprise a coordinator. The coordinator may be operative to coordinate operation of the decision logic generator 41 and of the scenario-providing module 42 responsive to an output of the performance assessor.

The decision logic generation system 40 allows the process of generating a decision logic for one or several controllers to be automated. This assists the human expert in the complex task of power system operational planning, control, and protection. The decision logic generation system 40 may be autonomous, implementing a self-design of the decision logic.

The decision logic generation system 40 may be used to generate decision logics performed by the controllers 31, 32, 33 individually or to generate a coordinated control logic which accounts for the interactions between the various decision-making blocks in the different controllers 31, 32, 33.

The decision logic generation system 40 may be used for a variety of different purposes, such as (without limitation) to:

identify grid operation limits, in various look-ahead time horizons, and generate a decision logic which allows to relax those limits (the decision logic can include pre- and post-disturbance control actions)

generate protection system, as well as SIPS (system integrity protection schemes), identify the need of and generate new protection functions, generate a logic for local FACTS/HVDC controller, generate a coordinated control of many devices throughout the grid (such as FACTS, HVDC, generators active demand, storage), generate a control of DER (directly, or via aggregator or distribution system operators), generate a distributed control in grids, generate a logic for scheduling asset maintenance/replacement, generate a logic for power system restoration, generate a logic to propose power systems upgrades and expansion.

The control logic can also act at a secondary level, providing setpoints to a primary controller of devices.

The decision logic generation system 40 may also be operative to identifying the required observability (i.e. input signals available to the control logic), or the available observability can be part of the specifications received by the decision logic generation system 40 as input.

The decision logic generation system 40 may be executed offline, prior to field operation of the decision logic. The decision logic generation system 40 may receive feedback on a performance of the decision logic deployed in a controller during field operation. The feedback may trigger a re-generation of the decision logic for deployment to the controller and/or may be used to improve the process of generating other decision logics.

The decision logic generation system 40 may perform two tasks in parallel. The decision logic generation system 40 may be operative to identify the desired decision logic (i.e. its parameters and, optionally, architecture), and ensure the robustness of the decision logic by identifying representative as well as challenging scenarios, i.e. scenarios for which the control logic fails or underperforms.

The decision logic generation system 40 may be operative to generate the decision logic in an iterative process.

FIG. 4 is a flow chart of a method 50 that may be performed by the decision logic generation system 40.

At step 51, the decision logic generation system 40 may assign values to all the parameters which define a specific decision logic candidate within the system specification. For illustration, if the selected controller is a P controller, then a value should be assigned to gain; if the controller is a neural network, then a specific architecture should be chosen, and all transfer functions and weights should be set to specific values. Note that the decision logic generation system 40 may select the architecture from among a set of candidate architectures or combinations thereof. Depending on the specifications, the decision logic generation system 40 may also select input signals and controlled actuators.

At step 52, the decision logic generation system 40 may select or create a scenario or a batch of scenarios to simulate (and, hence, test) the behavior of the selected decision logic candidate. In the general case, it will be up to the decision logic generation system 40 to identify which scenarios should be considered to eventually design a decision logic which optimizes a performance metric. Some or all of the scenarios may be provided in advance by a human expert. The drawback of this approach is that it is often a very difficult task to determine in advance which scenarios to evaluate. To mitigate this problem, the decision logic generation system 40 may comprise a scenario-creating logic that can create new scenarios for which system simulations are performed.

At step 53, the decision logic generation system 40 may quantify the performance of the tested decision logic according to a performance metric. The performance metric may be defined by a user input.

Computing a performance may comprise testing the decision logic candidate for the scenario(s), for example by means of simulations, use of machine learning models etc.

The performance metric may include the control objective of the decision logic, or may be different therefrom.

Based on the information from step 53 (and, in general, performance information from previous iterations), the decision logic generation system 40 may return to steps 51 and 52 if it is determined at step 54 that a termination criterion is not fulfilled. When returning to steps 51, 52, a new decision logic candidate to be tested and, respectively, new scenario(s) to simulate are selected.

A "new decision logic candidate" can refer to a decision logic candidate that differs from the previous decision logic candidates in parameters (e.g., value of a gain and/or weights of an ANN) or in architecture.

The process terminates according to a termination criterion at step 54. Examples for termination criteria include any one or any combination of performance not improving within a tolerance, maximum number of iterations reached, etc.

The techniques use two subsystems interacting with each other. One subsystem is responsible for identifying the desired decision logic candidate (i.e. its parameters and, optionally, architecture) and the other subsystem is responsible for ensuring the robustness of the decision logic by identifying challenging scenarios. Both subsystems can be driven by a performance metric which can be specified by a user input. The decision logic generation system 40 coordinates these two subsystems.

In an implementation, the two subsystems competing against each other may be implemented by a generative adversarial network (GAN).

As illustrated in FIG. 5, the decision logic generation system 40 may interact with a human engineer in various ways.

The decision logic generation system 40 may receive input defining the specifications of the decision logic to be designed, potential boundary conditions, as well as a way to measure the performance of the decision logic (e.g., a set of key performance indicators, KPIs). The performance metric or set of performance metrics guides the autonomous process of generating the decision logic. Specifications and boundary conditions can include: the controllable devices, controllability limits, the input signals used by the decision logic, available observability and communication limits, available computational resources, etc. Part of the specifications received may specify the architecture of the decision logic (e.g. a PID controller, an optimization-based decision-making, a neural network etc.)

The human engineer may provide the decision logic generation system 40 with a simulation engine. This may include (i) models of various components and phenomena to be accounted for, (ii) software tools to simulate scenarios, and (iii) historical data and scenarios for which an optimal performance of the control logic performs is required.

The term "simulation" shall be interpreted in a broader meaning. It shall include any methodology can be used to quantify a performance of the decision logic (e.g., numeric simulations, solution of differential equations or optimization problems, use of statistical and/or data-driven models, comparison with benchmarks etc.)

The decision logic generation system 40 autonomously generates the decision logic which has a performance (i.e. the KPIs) in accordance with a performance quality criterion (e.g., performance greater than a performance threshold), subject to the specifications by utilizing the simulation engine. This generally entails generation of information (such as new scenarios) or other new data, which may be used to assess the robustness of the generated decision logic.

The decision logic generation system 40 may output information on the generated decision logic via a user interface. The human engineer may check the result. The decision logic generation system 40 may receive user input (i) indicating that the generated decision logic is accepted or (ii) that modifies or adds specifications, KPIs, or models and request a re-design by the decision logic generation system 40.

Figure 6:
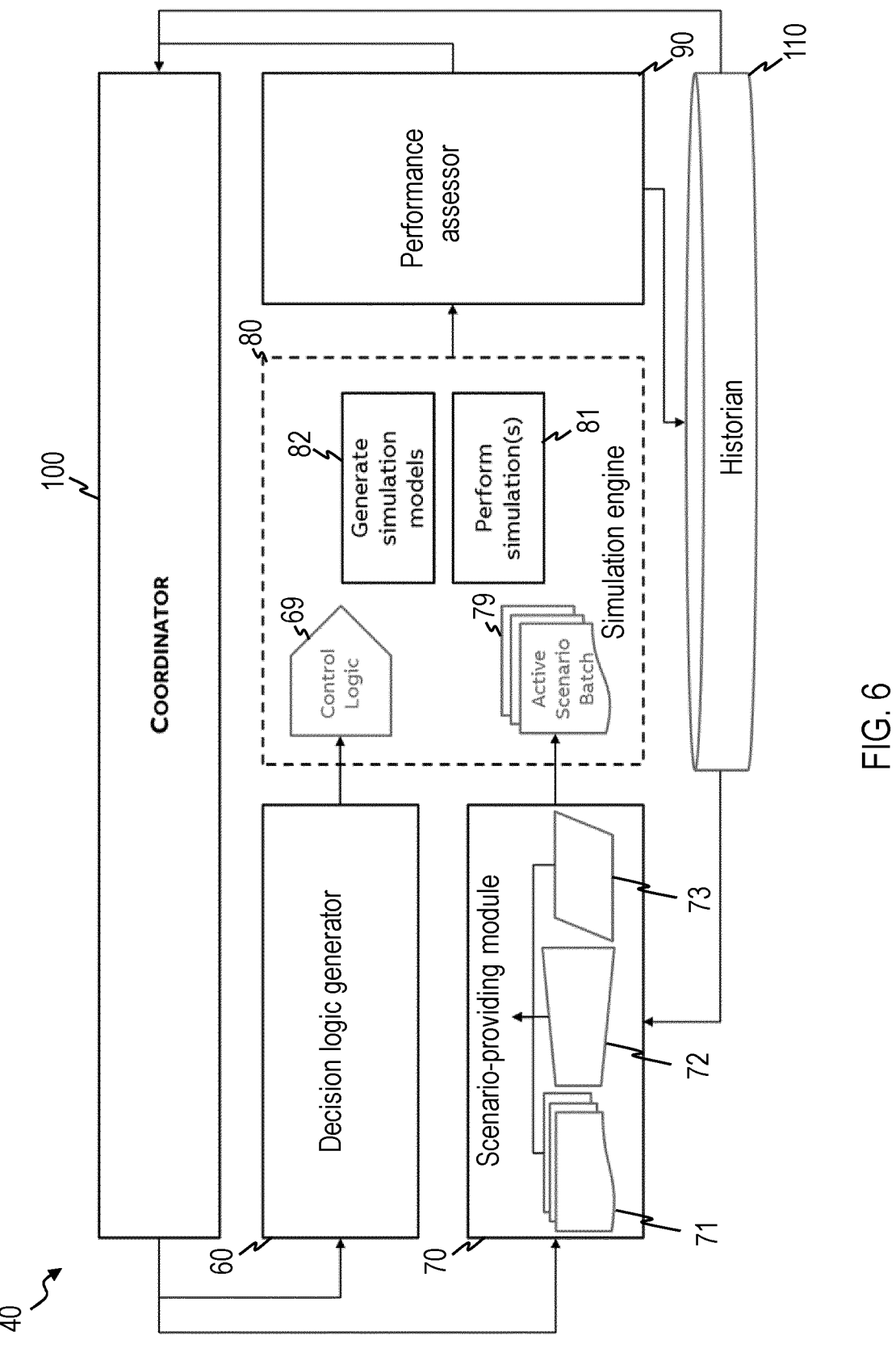
FIG. 6 is a block diagram of a system for generating a decision logic.

FIG. 6 illustrates the overall architecture of an implementation of the decision logic generation system 40.

Figure 3:
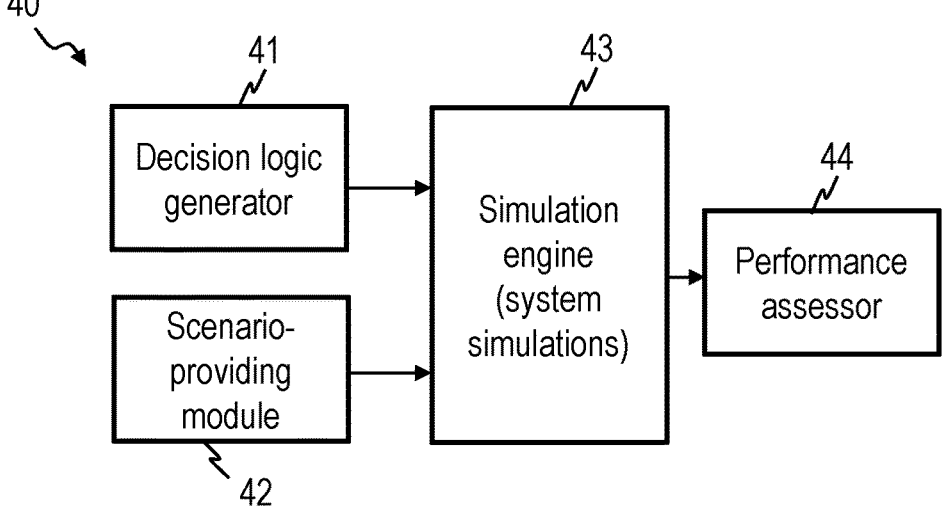
FIG. 3 is a block diagram of a system for generating a decision logic.

The decision logic generation system 40 may comprise a decision logic generator 60, a scenario-providing module 70, a performance assessor 90, and a coordinator 100. The decision logic generation system 40 may further comprise or interact with a simulation engine 80. The decision logic generator 60, scenario-providing module 70, performance assessor 90, and simulation engine 80 may be operative as explained with reference to FIG. 3.

The coordinator 100 may coordinate operation of the decision logic generator 60 and of the scenario-providing module 70. The coordinator 100 may be operative to adjust a learning rate of machine learning models implemented in the decision logic generator 60 and of the scenario-providing module 70. Alternatively or additionally, the coordinator 100 may control termination of training processes for decision logic candidates having a given architecture, thereby effecting a change in architecture, may control termination of the decision logic generation process, and/or may cause scenarios that have been determined to be challenging for a first decision logic candidate to be re-introduced in the performance computation for a second decision logic candidate that may have a different architecture.

The decision logic generation system 40 may comprise a historian 110 which stores data generated in the process of generating the decision logic. The historian 110 may be implemented in a local storage medium, a remote storage system, or a distributed storage system.

Features of the various blocks of the decision logic generation system 40 will be described in detail below. The features may not only be used in combination, but also in isolation.

Performance Assessor and Simulation Engine

The performance assessor 90 is operative to quantify the performance of the decision logic candidate that is presently active. A performance is computed in accordance with one or several metrics, based on the results of a (batch of) simulation(s) for an active scenario or a batch of active scenarios 79. The decision logic generator 60 progressively designs the decision logic candidates such that the performance is improved, in an ideal case maximized, while the scenario-providing module 70 comes up with scenarios (test cases) to ensure robustness of the performance metric. Both subsystems are described in the sequel.

The performance metric (and optionally the means to compute it) may be defined by an input by the human engineer. The performance metric(s) can be a "function", i.e. consisting of a set of calculations performed on the output of the simulation engine 80.

A performance metric may be either one or a combination of the following (without being limited thereto): "operation cost", "energy not served", "electricity prices", "system stability", "available power transfer capacity", "selectivity and dependability", "controller stability" etc.

Different performance metrics may require different type of simulations. These are performed by the simulation engine 80. The simulation engine 80 uses mathematical models 82 of the grid and the relevant components. As an example, high-order dynamic models of generators are required in time-domain for frequency stability simulations, while a simplified constant power model of generator is sufficient for economic dispatch simulation. These models can be defined by a human engineer or can be generated by the decision logic generation system 40.

The simulation engine 80 may include simulation logic 81 that performs the system simulations, using the simulations models 82.

The simulation engine 80 is chosen such that it provides the required information to compute the performance metric. For example, the simulation engine 80 may be operative for:

clearing an electricity market and, hence, providing nodal electricity prices, running short-circuit analysis and, hence, computing all the signals used by the protection relays, simulating disturbances (in time or frequency domain) and, hence, allowing to estimate the stability of a controller or the entire system.

The term "simulation" is used herein its broader meaning. The simulation engine 80 may, but does not necessarily need to perform numerical simulations. The simulation engine 80 can consist of any process that receives as input a decision logic candidate 69 and a (set of) scenario(s) 79 and generates the necessary information for the performance assessor 90 to evaluate the decision logic candidate 69. For instance, the simulation engine 80 can comprise or can consist of a statistical model, or of a dataset of previously solved examples.

The simulation engine 80 may be operative for: numeric simulations in time/frequency domain (e.g. power flow, short-circuit calculations, electromagnetic transients), (ii) solution of an optimization problem (e.g. optimal power flow, unit commitment) or (iii) any other mathematical/algorithmic computation which allows to quantify the performance of the control logic (such as eigenvalue analysis.)

Simulation engines 80 that perform system simulations, including computing currents, voltages, phasors, synchrophasors under various scenarios using techniques such as balanced load flow, are available. Such simulation engines 80 are conventionally used for testing a decision logic set up by a human expert. According to embodiment, such simulation engines 80 may be used in association with the decision logic generator 60 and the scenario-providing module 70 to test a computer-generated candidate decision logic 69, and to do this iteratively for various candidate decision logic 69 and various batches of active scenarios 79.

The active scenarios in the batch of active scenarios 79 for which the system simulations are performed may correspond to different operating conditions and events to be faced by the decision logic, such as generation, demand and weather patterns, faults (i.e. short-circuits), planned outages, topology configurations, addition of new components, evolution of demand, storage and renewable generation.

Figure 7:
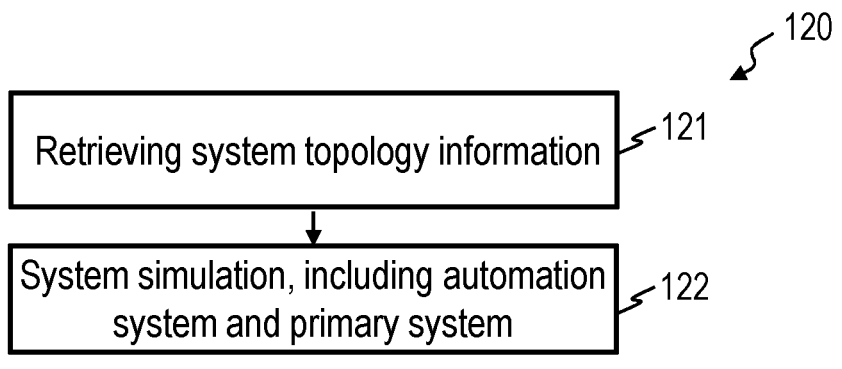
FIG. 7 is flow chart of a method.

FIG. 7 is a flow chart of a method 120 which may be performed by the simulation engine 80.

At step 121, information on system topology may be retrieved. The information relating to the power network, which may in particular include topological information, may be received via the user interface (UI) 25. Alternatively or additionally, the computing system 20 or a network topology analysis system may process a configuration description (such as a substation configuration description (SCD) file) to determine power system topology, identify power system components, and/or various primary and/or secondary devices in a part of the power system which is relevant to the supervised controller.

At step 122, system simulations are performed. The system simulations may include simulating a behavior in primary and secondary components of a power system. The system simulations may include simulating currents, voltages, phasors, synchrophasors, etc. in lines, cables, bus bars, of the power system. The system simulations may include simulating a response of reactors or transformers in the frequency and/or time domain. The system simulations may comprise simulating these quantities in response to a decision taken by the candidate decision logic 69 in response to the various scenarios included in the active batch of scenarios 79.

Figure 8:
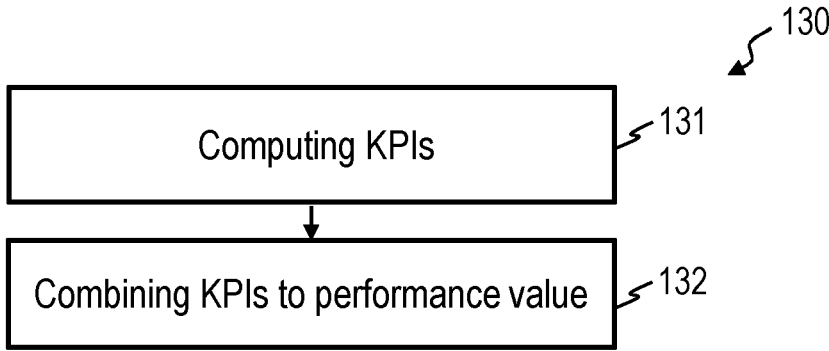
FIG. 8 is flow chart of a method.

FIG. 8 is a flow chart of a method 130. The method 130 may be performed by the performance assessor 90.

At step 131, the performance assessor 90 computes one or several KPIs. The one or several KPIs may be selected from a group comprising or consisting of operation cost", "energy not served", "electricity prices", "system stability", "available power transfer capacity", "selectivity and dependability", "controller stability", without being limited thereto.

The one or several KPIs may respectively be dependent on system response caused by the decision taken by the candidate decision logic 69, as simulated by the simulation engine 80. The one or several KPIs may respectively also be dependent on the simulated control actions taken, in the system simulation, by the controller in which the decision logic 69 would be deployed and by other controllers in the IACS.

At step 132, the several KPIs may be combined, e.g., by computing a weighted sum of the KPIs, to thereby compute a value of the performance in accordance with the performance metric(s).

For illustration, the performance of a candidate decision logic for a scenario may be computed as:

$$pv(dlp_1, \ldots, dlp_M) = \qquad\qquad (1)$$
$$\sum_{j=1}^{J} w_{KPI,j} \times KPI_j(srp_1, \ldots, srp_N; sp_1, \ldots, sp_K)$$

In Equation (1), dip with m=1, . . . M denotes parameters of the candidate decision logic. The parameters of the candidate decision logic may include a gain of a P controller or of a PID controller, weights of an ANN, decision boundaries of an SVM, or other parameter.

In Equation (1), $KPI_j$ with j=1, . . . J denotes different key performance indicators, and $w_{KPI,j}$ are weighting factors in a weighted summation. The weights may vary depending on the KPI. For illustration, KPIs that reflect a short response time, reliability, and/or robustness may be weighted with comparatively higher weights, while KPIs that reflect financial cost may be weighted with comparatively lower weights.

The KPIs are dependent on the system response, which may be defined by a set of system response parameters (such as voltages, currents, phasors, synchrophasors, impedances, reactances, etc.) $sp_n$. The KPIs may be dependent on the scenario, which may be defined by a set of scenario parameters (such as operating conditions in the power system at the time at which the simulated fault or event occurs, ambient conditions such as simulated consumption or generation or weather conditions, a location of the fault or event, etc.) $p_n$.

For brevity, the parameters sets will be written in vector notation in the following, it being understood that the parameters may be combined in any ordered tuple.

The performance may be computed based on the system simulations for a batch of scenarios. For illustration, the performance may be computed as:

$$pv(\overrightarrow{dlp}) = \sum_{i=1}^{I} w_{scen,i} \times pv\left(\overrightarrow{dlp}; \overrightarrow{sp_i}\right) \tag{2}$$

In Equation (2), pv(•) denotes the performance value, determined for a batch of active scenarios for a candidate decision logic defined by an M-tuple of parameters. pv($\overrightarrow{dlp}$; $\overrightarrow{sp_i}$) denotes the performance determined for an $i^{th}$ scenario in the batch, which may be defined by an K-tuple of scenario parameters. Different scenarios are labeled by i. The weighting factors $w_{scen,i}$ are weighting factors that are used weighting in dependence on the scenario.

The different scenarios may correspond to different operating conditions and events to be faced by the control logic, such as generation, demand and weather patterns, faults (i.e. short-circuits), planned outages, topology configurations, addition of new components, evolution of demand, storage and renewable generation.

The weighting factors $w_{scen,i}$ may be dependent on how like the generated decision logic is to face the respective scenario and/or on how severe the results of an incorrect decision would be for the respective scenario. For illustration, the weights $w_{scen,i}$ may be in a first numerical range for scenarios that are occasionally occurring during field operation. The weights $w_{scen,i}$ may be in a second numerical range, which consists of numerical values that exceed all values in the first numerical range, for scenarios that are frequently occurring during field operation.

The weights $w_{scen,i}$ may be in a third numerical range, which may be different from the first and second numerical ranges, for scenarios that are infrequently occurring during field operation, but which are challenging.

While equations (1) and (2) provide an example for computing the performance for a decision logic candidate defined by a parameterization, equations (1) and (2) remain similarly applicable in the case where not only the parameters, but also the architecture (e.g., hyperparameters) of the decision logic candidates can vary throughout the process of generating the decision logic. In the latter case, the performance is not only dependent on the parameters of the decision logic candidate, but also on its architecture.

While the performance metric may be a function (numeric, or consisting of algorithmic steps), the performance metric may be specified in other ways. For illustration, the decision logic generation system 40 may be operative to receive a set of examples of how the decision logic is expected to behave. The performance metric can then consist in estimating how similar the behavior of the decision logic candidate 69 in a given scenario is to the decision logic's behavior in the examples received by the decision logic generation system 40.

The performance metric does not need to correspond to an actual objective of the decision logic in field use. The performance metric may be used only for the purposes of generating the decision logic. The performance metric does not even need to be fixed during the process of generating the decision logic, but it can be dynamically changed. For illustration, and as described in more detail elsewhere herein, the performance metric may be adjusted by the coordinator 100 so as to drive the design process to an optimum solution, while preventing premature stalling in a local optimum that is only an inferior global solution. The actual control objective of the decision logic may also be used as the performance metric.

In addition to computing the performance, the performance assessor 90 may identify which scenarios in the batch 79 are most challenging (i.e. they cause a significant decrease of the performance computed in accordance with the performance metric) for an active decision logic candidate 69. The performance assessor 90 may tag such "decision logic candidate—challenging scenario" pairs before storing them in the historian 110. This information may be used by the coordinator and/or the scenario-providing module 70, as explained elsewhere herein.

Decision Logic Generator

This decision logic generator 60 may be operative to successively generate decision logic candidates 69 with an objective to enhance or eventually optimize the performance. To achieve this purpose, the decision logic generator 60 is operative to iteratively modify the active decision logic candidate 69 that is fed to the simulation engine 80. Ultimately, the decision logic candidate 69 is assessed by the performance assessor 90, which computes the performance (which may be a scalar value).

The decision logic generator 60 may have various configuration. The decision logic generator 60 may be operative to determine one or several parameters of a decision logic having a fixed, predetermined architecture (such as a gain of a P or PID controller, or weights of an ANN having a fixed number of layers and nodes). Alternatively or additionally, the decision logic generator 60 may be operative to determine an architecture of the decision logic (e.g., by selecting from a set of candidate architecture and/or by adjusting hyperparameters such as a number of layers and/or nodes of an ANN).

The decision logic generator 60 may include a generator network of a GAN, which may be operative to adjust parameters and, optionally, an architecture of the decision logic candidate 69 that is fed to the simulation engine 80 with the aim of improving the performance computed by the performance assessor based on the system simulations.

Different structures for the decision logic can be accommodated. The techniques are not limited designing one single decision logic for a single controller, but it can design decision logics for plural controllers in a coordinated fashion. For illustration:

No specific architecture is prescribed for the decision logic by a user input. The decision logic generator 60 determines parameters (e.g., a gain of a P or PID controller or determining weights of an ANN by training the ANN) and an architecture to perform the decision-making task.

A specific architecture is prescribed for the decision logic by a user input. The decision logic generator 60 determines the values of the parameters without varying the architecture.

Centralized control: The decision logic generator 60 designs a decision logic that is to be deployed in a single controller, with the decision logics of the other controllers in the IACS being known and being used in the generation process.

Distributed control: The decision logic generator 60 concurrently designs decision logics for several local controllers so that they operate in a coordinated fashion.

Example: Decision Logic Candidates are ANN(s)

The decision logic generator 60 can include in a training module 62 operative to train an ANN or any other data-driven machine learning model. The trained ANN is deployed for field use as the decision logic.

The architecture of the ANN can be chosen in advance by the human engineer or identified by the decision logic generator 60 as part of the generation process. In the latter case, it is up to the decision logic generator 60 and/or the coordinator 100 to determine whether to continue with updating the weights of the current "active" ANN architecture (i.e. training the ANN) architecture or to try another architecture.

The architecture of the ANN may be defined by any one or any combination of: a number of hidden layers, number of nodes in each layer, recurrent loops, gates or any other structural element. The number, interconnections and interface of these elements are expressed by a hierarchically higher level of "parameters", referred to as "hyper-parameters". One or several of the hyperparameters may be automatically adjusted by the decision logic generator 60.

Figure 9:
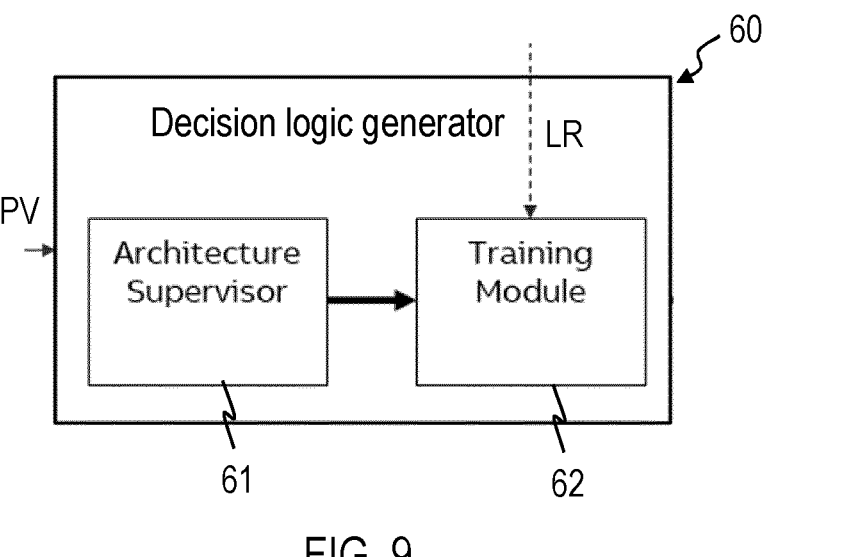
FIG. 9 is a block diagram of a decision logic generator.

FIG. 9 illustrates an implementation of the decision logic generator 60. The decision logic generator 60 may comprise two modules: an architecture supervisor 61 and aa training module 62. The architecture supervisor 61 is optional, as many successful ANN applications work with a fixed architecture.

The architecture supervisor 61 is responsible for selecting the ANN architecture. This task essentially consists in selecting the values of a set of hyperparameters (Box 5). Objective of the architecture supervisor 61 is to identify the most suitable hyperparameter values, i.e. to identify an architecture that, when properly trained (i.e. when its corresponding weights are optimized), allows the performance metric to be maximized. Typically, this "architecture suitability" metric should be combined with criteria such as "small architecture complexity", so that the ANN can generalize well to cases unseen during the training phase, and "computational efficiency", so that the ANN can be trained fast enough.

The architecture supervisor 61 may perform a parameter search to identify a suitable architecture, e.g., by identifying hyperparameters. Techniques that may be employed by the architecture supervisor 61 are described in more detail in the "Parameter Search" section below.

The architecture supervisor 61 may ensure that the hyperparameter values are kept constant for several iterations. The architecture supervisor 61 may observes the evolution of the performance of the "active" ANN architecture as it is being trained by changing parameters. The architecture supervisor 61 may use this information to select whether to continue training (and hence improve) the active architecture or try another architecture by modifying the hyperparameter values.

The decision logic generator 60 may execute one or two loops (the outer loop is optional):

an "inner loop" where the ANN architecture is kept constant and the ANN weights are iteratively updated, and an optional "outer loop", controlled by the architecture supervisor 61, which consists in modifying the ANN hyperparameters, i.e. changing the active ANN architecture.

A number of inner loop iterations that will eventually result in a trained ANN can be referred to as a "full training cycle" below.

Figure 10:
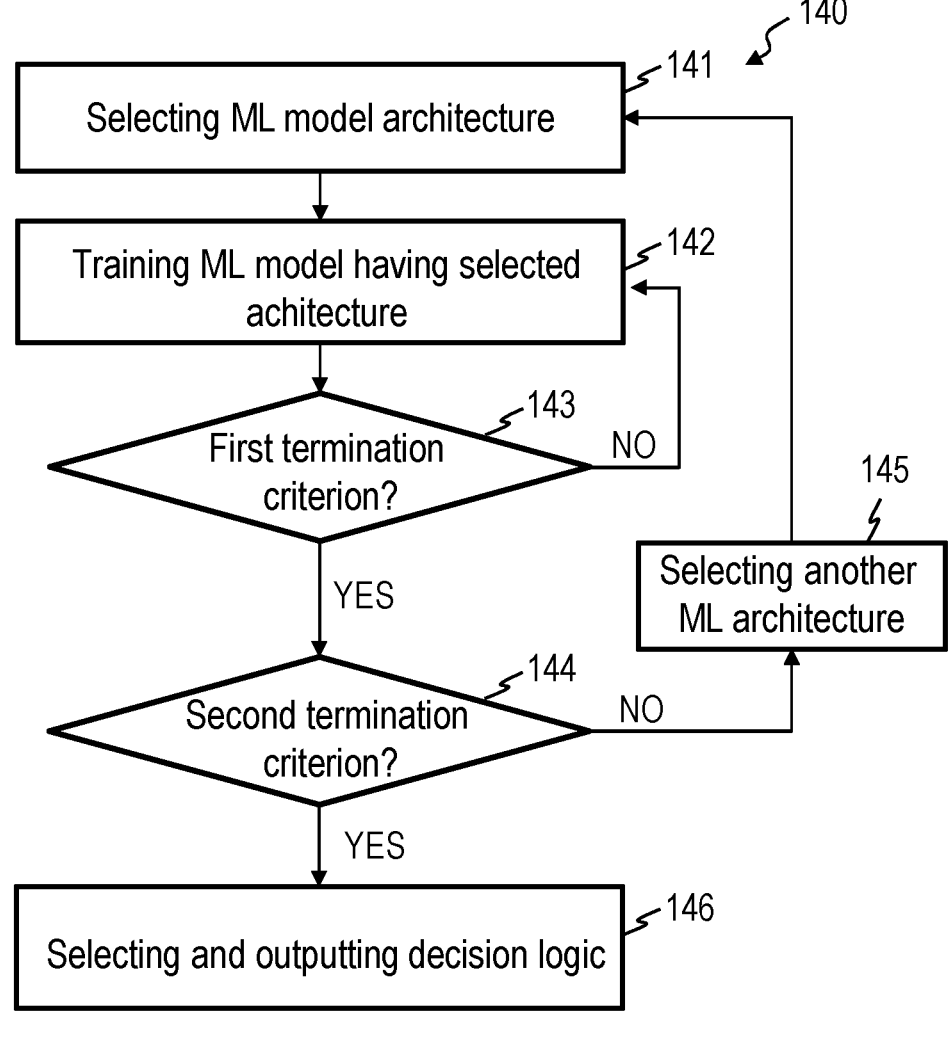
FIG. 10 is flow chart of a method.

FIG. 10 is a flow chart of a method 140. The method 140 may be performed by the decision logic generation system 40, in particular by the decision logic generator 60.

At step 141, a ML model architecture is selected. Selecting the ML model architecture may be based on an input that specifies the ML model architecture or the type of ML model architecture (such as ANN or SVM). Selecting the ML model architecture may comprise selecting one of several candidate architectures from a data storage. Selecting the ML model architecture may be based on transfer learning, using results obtained for the process of automatically generating another decision logic for another controller.

At steps 142 and 143, an inner loop is performed in which the ML model having the selected architecture is trained until a first termination criterion is fulfilled. This may comprise iteratively varying one or several parameters of the ML model, responsive to the performance determined for the previous parameterization(s) for the architecture. Training the ML model with the selected architecture may be continued until it is determined at step 143 that a first termination criterion is fulfilled.

At step 144, when a first termination criterion is fulfilled, the method may determine whether another ML model architecture is to be tested. This may comprise determining whether a second termination criterion is fulfilled. If the second termination criterion is not fulfilled, another ML model architecture is selected at step 145, and the method returns to steps 142 and 143 to train the ML model having the other ML model architecture.

If the second termination criterion is fulfilled, one of the candidate decision logics is selected and output at step 146. This may comprise selecting the one of the trained ML models which has shown best performance in the system simulations.

Outputting the decision logic at step 146 may comprise providing information on the decision logic via the UI 25 and/or deploying the decision logic to the controller via the interface 24, optionally responsive to a user confirmation received at the UI 25.

The first termination criterion at step 143 may depend on a change in performance computed when training decision logic candidates having a fixed machine learning model architecture.

The first termination criterion may depend on a threshold comparison of a change, between iterations of the training, in the performance computed when training decision logic candidates having a fixed machine learning model architecture.

Alternatively or additionally, the first termination criterion at step 143 may depend on whether the performance computed when training decision logic candidates meets a performance quality criterion, e.g., a performance threshold criterion.

Alternatively or additionally, the first termination criterion at step 143 may depend on whether generated several decision logic candidates having parameters (such as weights) have been generated which adequately cover the parameter space afforded by the architecture (e.g., if the density of tested decision logic parameters in the parameter space exceeds a threshold and/or if decision logic parameters are included in each one of a set of pre-defined regions in the parameter space).

Alternatively or additionally, the first termination criterion at step 143 may depend on whether the scenarios fulfill a second coverage criterion. The second coverage criterion may involve a second threshold comparison and may indicate that, e.g., the scenarios used in the simulations cover an area that is at least a second threshold percentage of the scenario parameter space that is within the system specifications. The second coverage criterion may be set responsive to a user input, may be fixed, or may be dynamically adjusted based on the computed performance.

The second termination criterion at step 144 may depend on whether further decision logic architectures are available which have not yet been trained. The second termination criterion at step 144 may depend on a threshold comparison of a change in performance obtained when previously changing the ML model architecture.

Alternatively or additionally, the second termination criterion at step 144 may depend on whether the performance computed when training decision logic candidates meets a performance quality criterion, e.g., a performance threshold criterion.

Alternatively or additionally, the second termination criterion at step 144 may depend on whether generated several decision logic candidates having hyperparameters (such as number of layers and/or nodes) have been generated which adequately cover the hyperparameter space (e.g., if the density of tested decision logic hyperparameters in the hyperparameter space exceeds a threshold and/or if decision logic hyperparameters are included in each one of a set of pre-defined regions in the hyperparameters space).

As explained in more detail elsewhere herein, when another ML model architecture is selected at step 145, this may cause challenging scenarios that have previously been determined to cause trained ML models to underperform to be re-introduced into the batch of active scenarios 79.

As mentioned above, the outer loop with steps 144, 145 is optional in the method of FIG. 10.

The decision logic generator 60 may receive a performance value PV determined for a previous parameterization (inner loop) and/or architecture (outer loop) as input. The decision logic generator 60 may generate a new parameterization responsive to the received performance or an evolution of the performance over several previous iterations.

Generally, the decision logic generator 60 may determine a new set of parameters $(dlp_{1,s+1}, \ldots, dlp_{M,s+1})$ for the $(s+1)^{th}$ iteration of the training for a given architecture based on the performance(s) obtained for the previous set(s) of parameters at least for the $s^{th}$ iteration, and optionally for several iterations preceding the $(s+1)^{th}$ iteration. In the following, vector notation will be used for brevity (with $\overrightarrow{dlp_s}$ designating the M-tuple of parameters for iteration s etc.), it being understood that any other ordered M-tuple may be used.

The decision logic generator 60 may determine a new set of parameters for the new decision logic candidate according to $$\overrightarrow{dlp_{s+1}} = \overrightarrow{dlp_s} + \vec{u}(PV(\overrightarrow{dlp_s})) \qquad (3)$$

The update $\vec{u}$ of the set of parameters defining the decision logic candidate may be dependent on the previously determined performance, or optionally, on the previously determined performance for several preceding sets of parameters for the decision logic candidate:

$$\overrightarrow{dlp_{s+1}} = \overrightarrow{dlp_s} + \vec{u}(PV(\overrightarrow{dlp_s}), PV(\overrightarrow{dlp_{s-1}}), \ldots) \qquad (4)$$

The update $\vec{u}$ of the set of parameters may be determined based on a gradient technique, such as a (stochastic) gradient descent, without being limited thereto.

The functional dependence of $\vec{u}$ on its argument(s) may be varied in the process of generating the decision logic. For illustration, $\vec{u}$ may be intermittently set to zero and/or a scaling factor may be introduced that determines how rapidly the parameters of the decision logic candidates change:

$$\overrightarrow{dlp_{s+1}} = \overrightarrow{dlp_s} + sf(LR) \times \vec{u}(PV(\overrightarrow{dlp_s}), PV(\overrightarrow{dlp_{s-1}}), \ldots) \qquad (5)$$

The scaling factor sf(LR) and/or the update function $\vec{u}$ of the set of parameters may depend on how quickly the parameters of the decision logic candidates evolve in the training, i.e., in the inner loop. The scaling factor may be selectively varied in a non-monotonous manner to adjust the learning rate. Adjusting the learning rate may be particularly useful if the decision logic generator 60 and the scenario-providing module 70 use adversarial logics (such as a generator and discriminator of a GAN). The scaling factor may be adjusted responsive to a learning rate parameter LR that controls the learning rate. The learning rate parameter LR may be generated by the coordinator 100, as described elsewhere herein.

The scaling factor sf(LR) and/or the update function $\vec{u}$ for the decision logic generator 60 may be adjusted while the decision logic generator 60 learns with the aim to generate decision logic candidates that perform better in the system simulations. The scaling factor sf(LR) and/or the update function $\vec{u}$ for the decision logic generator 60 may be adjusted dynamically based on the computed performance or a rate in change of the computed performance.

The scaling factor sf(LR) and/or the update function $\vec{u}$ for the decision logic generator 60 may be adjusted dynamically in a non-monotonous manner. The scaling factor sf(LR) and/or the update function $\vec{u}$ govern a rate of change of parameters adjusted by the decision logic generator 60 in dependence on the computed performance, such as a rate of change of weights of an artificial neural network (ANN) in response to a feedback signal.

The scaling factor sf(LR) and/or the update function $\vec{u}$ for the decision logic generator 60 may be intermittently decreased and/or set to zero, to allow the scenario-providing module 70 to provide more challenging scenarios. The scaling factor sf(LR) and/or the update function $\vec{u}$ for the decision logic generator 60 may be intermittently decreased and/or set to zero if the training results in decision logic candidates having a good performance (e.g., a performance that meets a performance threshold criterion) and/or if the performance does no longer significantly improve.

Figure 11:
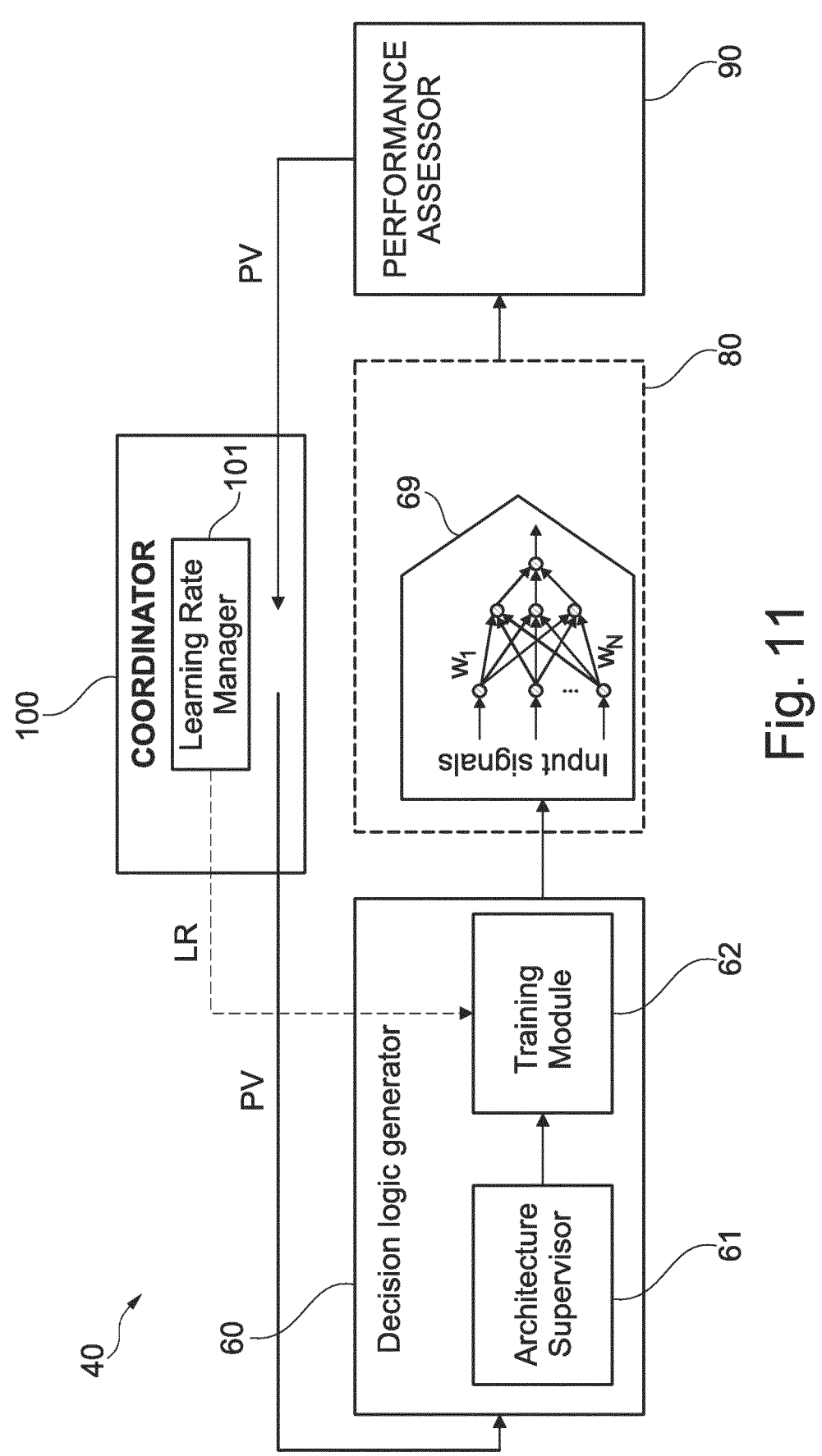
FIG. 11 is a block diagram of a system for generating a decision logic.

The learning rate may be controlled by a learning rate manager. The learning rate manager 101 may be included in the controller 100, as shown in FIG. 11. The learning rate manager may monitor an evolution of the performance and may determine whether a learning rate of the decision logic generator 60 (and/or optionally, a learning rate of a scenario-creating logic) is to be adjusted responsive to the evolution of the performance over several iterations of the method in FIG. 10.

Training an ANN

Per each inner loop iteration, the ANN weights may be updated. The training module 62 may utilize a gradient technique, in particular gradient descent, for the updating.

Gradients of some output criterion of the ANN with respect to the ANN weights may be utilized. The gradients may be used in a (stochastic) gradient descent, applied to batches of the training data.

Figures 12, 13:
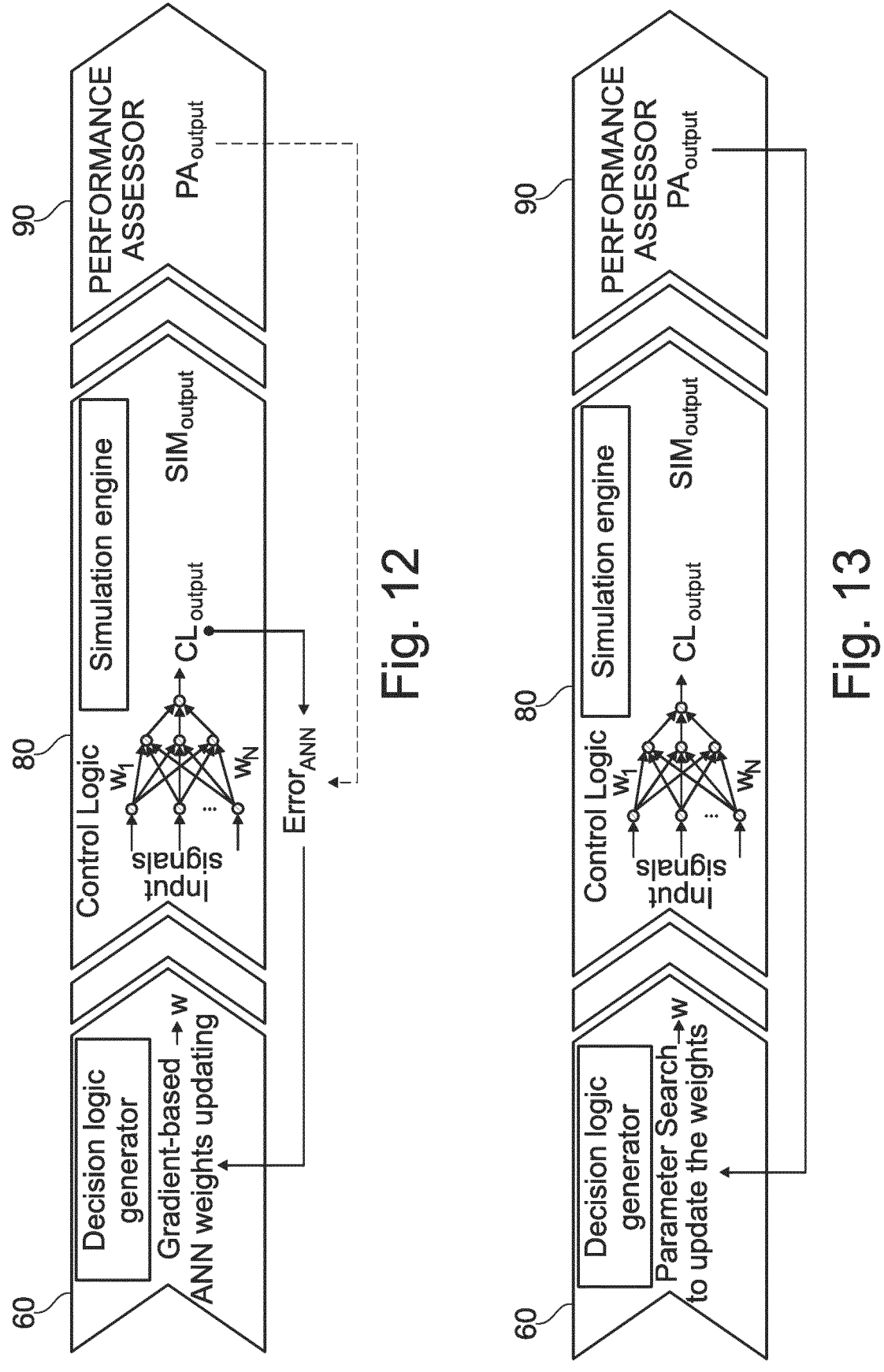
FIGS. 12 to 16 are diagrams for explaining operation of a system for generating a decision logic.

FIG. 12 shows operation of the decision logic generator 60 when a gradient-based technique is used for updating ML model parameters. The ML model parameters may be ANN weights.

In a supervised learning setup, the output criterion may be an output error ErrorANN in FIG. 12. The output error ErrorANN may be a difference between what the ANN with its current parameterization provided as output in the simulation $CL_{output}$ and what that output should have ideally been, hereafter referred to as "right ANN output" (for instance a "ground truth"). This "right ANN output" serves as a supervised learning signal and may be provided by the performance assessor 90.

An example of such a case is a generation of a protection system, where following a simulation an appropriate decisions (trip/no trip; or immediate trip/delayed trip/no trip) to be taken by each protection relay can be determined.

Supervised learning may not always be possible. A parameter search may be performed by the decision logic generator 60 to update the ML model parameters, as illustrated in FIG. 13.

The performance assessor 90 may quantify the performance of the decision logic candidate by evaluating the impact it had on the system (e.g. whether the power system was stable following a disturbance), without necessarily explicitly assessing its output. In the absence of an ML model output error, methods to guide the ML model training (i.e. updating the values of its weights) based on the value of the performance metric (FIG. 13) as described in the section Parameter Search below may be used to update the ML model parameters, such as the ANN weights.

In the case of ANN training, the parameters that may be identified may include or may consist of the ANN weights.

An input to the ANN training process may be the learning rate, which corresponds to the impact that the last training sample has on the update of the ANN weights. The higher the learning rate is, the more the ANN weights are modified according to the gradients computed by the latest (set of) sample(s).

The learning rate may be dynamically modified during process of generating the decision logic, so that the ML model parameterization moves faster away from solutions which do not perform well by using a large learning rate, or the ML model parameterization training spends more iterations to further improve seemingly well-performing solutions by using a small learning rate.

Alternatively or additionally, fixing the ML model parameterization at (or around) a solution, which is assessed to be effective so far in the training process, allows the scenario-providing module 70 to identify scenarios which can challenge the currently effective decision logic. This new information can be used to eventually increase the robustness of the current ML model parameterization (by fine-tuning the weights accordingly) or prove it to be ineffective and hence trigger a new set of iterations where the decision logic generator 60 uses large learning rates to identify a better performing ML model parameterization.

As shown in FIG. 11, the coordinator 100 may be operative to dynamically modify the learning rate during the process of generating the decision logic, such that the optimal decision logic is obtained with as little computational effort as possible (e.g., time spent for simulations and/or computational resources required). Features of the coordinator 100 are described in more detail elsewhere herein.

Identifying the ANN Architecture

The architecture supervisor 61 may monitor the evolution of the active ANN performance, within a full training cycle, and may decide when to stop the training cycle, i.e. stop further improving the ANN solution. A training cycle can be stopped when the ANN performance is not considerably improving anymore, or if the active ANN architecture seems unable to reach a desirable performance level (for example, if the observed performance is clearly inferior to the performance already obtained by another architecture and the training does not seem to converge close to that performance.)

At the end of a training cycle (e.g., at the end of the iterative process including steps 142, 143 of the method of FIG. 10), (i) the trained ANN may optionally be stored in the historian 110, and (ii) the architecture supervisor 61 may select a new architecture by using a new set of hyperparameter values, by transfer learning, or by selecting another candidate decision logic from a data repository. In addition, as the decision logic generation process is progressing, the architecture supervisor 61 can re-select an already trained architecture and further fine-tune it.

The process may terminate according to a second termination criterion (e.g. convergence to a sufficiently good performance metric, maximum number of training cycles reached etc.) and the best architecture for the decision logic in combination with its parameterization is chosen from the historian 110.

The architecture supervisor 61 may be operative to select a new architecture. This may be done in various ways, in order to efficiently search a hyperparameter space and/or a set of possible candidate architectures.

In order to reduce the computation load as compared to uniform sampling, the architecture supervisory 61 may perform any one or any combination of the following:

Reducing the size of the problem: The architecture selection may be done by considering a simpler, smaller target-problem, so that cycles can run faster. Then, the ANN with the selected architecture may be trained using the original larger problem. The identification of an appropriate "smaller" (but representative) problem may be application dependent. For example, if power system numeric simulations are required to train the decision logic, a problem reduction might consist in making component modelling and/or topology simplifications.

Utilizing one of the parameter search methods presented under Parameter Search below.

Progressively expanding a complexity of the ML model (e.g., ANN architecture): The first training cycles may use small ANN architectures, so that the decision logic candidates can be trained with relatively low computational effort. The most promising (with respect to the performance metric) among these small architectures may be selected for further architectural expansion (i.e. nodes, layers and operations are appended to a small architecture). Progressive neural architecture search, as proposed in C. Liu et al., "Progressive Neural Architecture Search", European Conference on Computer Vision (ECCV), Munich, Germany, October 2018, may be used.

The architecture supervisor 61 can i) select among different ANN architectures for the task at hand or ii) rely on transfer learning from past solutions of similar tasks in order to identify the appropriate hyperparameters for the task at hand. More on this is provided later in this document.

Figures 14, 15:
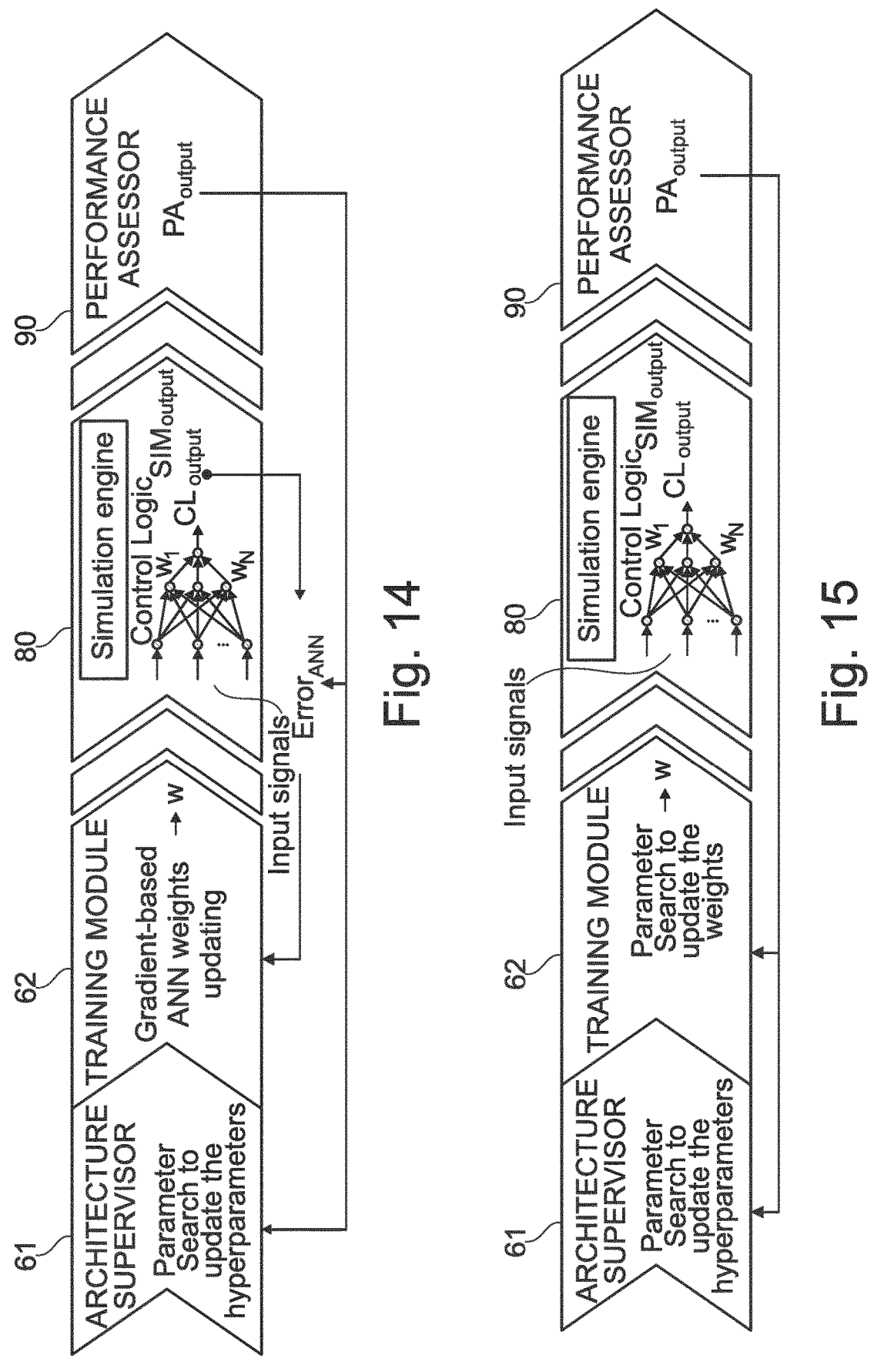

FIGS. 14 and 15 illustrate operation of a decision logic generator 60 that is operative to determine both an architecture and parameters of a decision logic. The architecture supervisor 61 may perform a parameter search to determine the architecture, such as the hyperparameters of an ANN. Trial-and-error search, model-based search, supervised learning, or reinforcement learning may be used.

The training module 62 may use supervised learning (FIG. 14) or may perform a parameter search (FIG. 15) to update the parameters of the decision logic candidates (such as the weights of an ANN).

Fully and Partly Data-Driven Scenario Creation and/or Decision Logic Generation

The scenario-creating logic and/or the decision logic generator may be fully data-driven. However, other implementations may be provided.

For illustration, the scenario-providing module (e.g., the scenario-creating logic) and/or the decision logic generator may be only partly data-driven. The scenario-providing module (e.g., the scenario-creating logic) and/or the decision logic generator may be model-based, and parameters of the respective models may be determined, as explained above.

For illustration, the scenario-providing module (e.g., the scenario-creating logic of the scenario-providing module) may be operative to generate scenarios by a (system) simulation. The system simulation may be parameterized with system simulation parameters. Values of the system simulation parameters may be determined such that they cause the decision logic candidate(s) to underperform. The values of the system simulation parameters may be chosen from ranges, which may be pre-defined. Training of the scenario-creating logic may be performed with the objective of making the decision logic candidates (e.g., decision agents) underperform.

Alternatively or additionally, decision logic candidates, such as decision agents, may be model-based having a parameterization with decision logic parameters, wherein values of the decision logic parameters may be determined to improve performance of the decision logic candidate(s). The decision logic candidates may be incrementally adjusted by an optimization. The model-based decision logic candidates may be model predictive control (MPC) controllers. The models underlying the decision logic candidates may be parameterized, and training of the decision logic candidates may be performed by optimizing the underlying model parameters towards a better performance.

A multi-scenario optimization may be used in the process of improving decision logic candidates. For illustration, multiple underlying models may be used. A robust or stochastic optimization may be executed to iteratively improve the decision logic candidates towards the decision logic that may be output.

The underlying models may cover all relevant aspects of the system to be controller. For illustration, the underlying models may cover system dynamics, stochastic external disturbances, and/or non-stochastic external disturbances, without being limited thereto.

Example: Decision Logic Generation for Fixed Architecture

The decision logic generator 60 may be operative to determine the parameters of the decision logic, with the architecture being fixed.

For various types of controllers, the industry has converged to traditional structures for the decision logic that depends of the specific application. Examples of such structures are: (i) running an optimal power flow (OPF) control for real-time decision-making in transmission grid operation, (ii) tuning protection functions such as overcurrent, distance, under-frequency etc. (iii) transfer-function-based controllers of power system components, such as Automatic Voltage Regulator (AVR), governor, control of FACTS devices and HVDC etc.

In this case, objective of the decision logic generator 60 is to identify values for a set of parameters associated with the decision logic structure.

The various parameters of the decision logic candidates having a given architecture may be updated based on the performance metric, computed by the performance assessor 90 following a (batch of) system simulation(s). Since calculating the gradient of the performance metric with respect to the decision logic parameters can be challenging, parameter search methods can be utilized, as proposed in section Parameter Search below.

For illustration, an OPF control is an optimization problem where an operational cost is minimized subject to constraints associated with the grid and its components, i.e. an OPF relies on first-principles modelling of the grid. It is practically impossible to embed a fully representative analytical power system model (e.g. incorporating the electromagnetic and electromechanical models representing steady- and dynamic-state behavior) into an OPF, as such a model is highly nonlinear and extremely large. As a result, traditional OPF typically considers only steady-state behavior. Even more, OPF is typically further simplified based on the linearization of the grid model around an operating point, i.e. DC-OPF, thus allowing for faster computation for large systems. In this case, the OPF not only does not consider dynamic behavior, but it is even inappropriate for voltage regulation since reactive power is completely ignored in the formulation.

To overcome the OPF modelling deficiencies, while preserving its computational efficiency, R. Z. Minano et al., "Securing Transient Stability Using Time-Domain Simulations Within an Optimal Power Flow", IEEE Trans. on Power Systems, vol. 25, no. 1, February 2010, and F. Capitanescu et al., "Coupling Optimization and Dynamic Simulation for Preventive-Corrective Control of Voltage Instability", IEEE Trans. on Power Systems, vol. 24, no. 2, May 2009 propose to augment the original OPF formulation with a set of constraints, selected such that they enforce the OPF solution to be robust against an associated set of dynamic phenomena. These techniques may be used for a case in which the decision logic includes or consists in solving an OPF.

Figure 16:
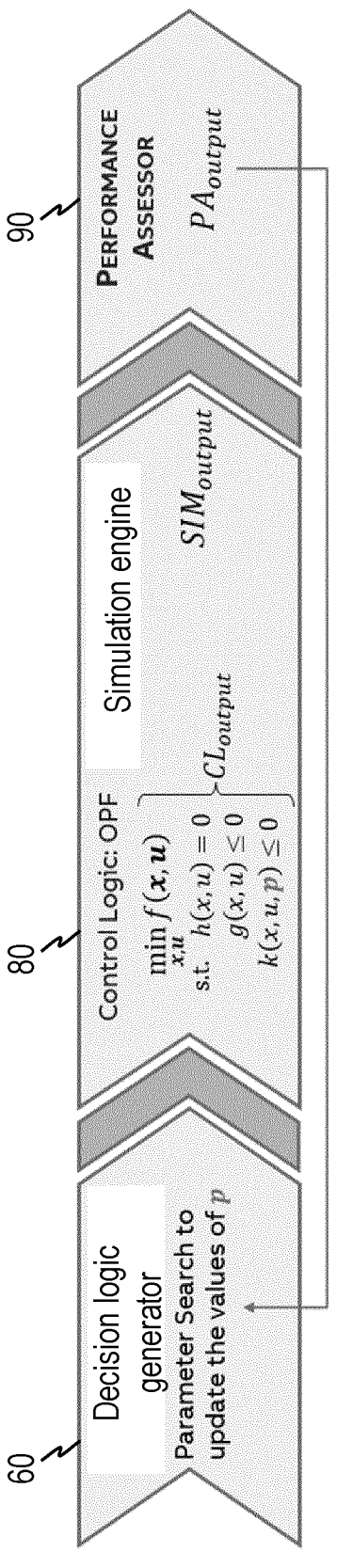

FIG. 16 illustrates a case in which a decision logic performs an OPF. Solving the OPF may be a constrained optimization problem, which may be formulated according to the references cited above. The parameter search may utilize a surrogate model, as will be explained with reference to FIG. 21.

The constraints may be such that they capture what is not explicitly part of the model used in the OPF. The techniques disclosed herein may be used to automatically identify the right constraints. A set of constraints may be parameterized, and then the appropriate values of those parameters may be identified as part of the autonomous process of generating the decision logic. An example of such a parametrized constraint can be $w_1P_1 + w_2P_2 + w_3P_3 \leq P$, where $P_i$ is the active power flow on the $i^{th}$ line and $w_1$, $w_2$, $w_3$, P are the constraint parameters, where lines 1, 2 and 3 make up a flowgate between two interconnected areas. Thus, the task of the decision logic generator 60 may be operative to identify these parameters.

Example: Decision Logic Generation for a Distributed Control System

The decision logic generation system 40 may generate a distributed decision logic, i.e. a decision logics of a set of devices/equipment throughout the grid, where each device has its own decision logic.

A benefit of using a centralized procedure for concurrently generating multiple decision logics is that the cross-controller interoperability is accounted for in a coordinated manner. The decision logic generation system 40 may also account for cross-controller interoperability when generating the decision logic for only one of the controllers if the behavior of other controllers in its environment is modelled and accounted for in the generation process, in particular by the simulation engine 80.

The coordinated generation of a distributed decision logic can be performed in a similar way as the design of one single decision logic. Based on the value of the performance metric, computed per (batch of) simulation(s), the parameters of the various decision logics deployed in various different controllers are iteratively updated, as described elsewhere herein. Similar to the generation of a single decision logic, each controller can have a decision logic architecture that can be an ANN or can have a structure specified by a human engineer (e.g. a PID-type of controller) or established by transfer learning.

Different controllers may have decision logics with different architecture, but can still be concurrently generated by the decision logic generation system 40. For illustration, plural instances of the decision logic generator 60 may be deployed, each being associated with a different one of the decision logics of the decentralized control system.

The decision logic generation system 40 may perform weighting of the decision logics of a distributed control system depending on which controllers have a larger influence (i.e. controllability) on the performance metric. The decision logic generation system 40 can receive information on a specification of a more balanced contribution of the various control devices. This can be implemented by reflecting such a requirement on the performance metric.

Examples of coordinated distributed decision logics that can be generated by the decision logic generation system 40 include (without limitation):

generating a protection system (decision logics running in each of several protection relays based on observed voltage and current measurements), generating coordinated control of FACTS or HVDC devices (decision logic running in each FACTS controller based on local or system-wide measurements), generating decision logic of devices, which are either embedded in distributed energy resources or operated by site management systems in MV/LV grids. This coordinated design process can take into account today's operational practices as well as a different paradigm where the operation of the MV/LV grids are fully autonomous, enabling retail-level energy trading.

Scenario-Providing Module

The scenario-providing module 70 is operative for feeding the simulation engine 80 with scenarios, for which the performance of the decision logic candidate is assessed. Simulating the system response for appropriate scenarios is crucial for designing a decision logic which will perform well under various conditions when deployed.

In general, two classes of scenarios need to be considered:

Scenarios covering what the decision logic is expected to be regularly facing (e.g. scenarios corresponding to normal power system operation).

Seldomly occurring, but challenging, scenarios against which the decision logic should be robust.

Scenarios corresponding to normal operating conditions can be reflected as a cost component in the performance metric. The most likely scenarios may have a higher weight in the computation of the performance metric. This may be attained using the weighting explained with reference to Equation (2), without being limited thereto.

Seldomly occurring, but challenging scenarios may be evaluated by the performance assessor 90 in a binary manner. For illustration, the performance assessor 90 may assess seldomly occurring but challenging scenarios depending on whether the decision logic candidate can still take the correct decision. For illustration, it may not be acceptable that the decision logic fails the test under such a scenario (e.g. unstable behavior of the decision logic vis-à-vis a disturbance.)

One technique to create a batch of scenarios is that the scenarios are selected by a human engineer prior to the autonomous decision logic generation process, and the decision logic generation system 40 builds the decision logic such that the control objectives are optimal for those scenarios. The batch of active scenarios 69 may remain constant throughout autonomous process of generating the decision logic, and the only active subsystem may the decision logic generator 60.

As it is challenging for the human engineer to determine in advance which scenarios to simulate and/or to ensure a more thorough evaluation of robustness or effectiveness of the decision logic, additional scenarios not defined or selected by a human engineer may be utilized.

There is a trade-off between the computational inefficiencies resulting from choosing a large scenario set to cover theoretically all possibilities, and the difficulty to achieve robustness resulting from using a smaller set of pre-selected scenarios. An active learning approach, allowing the decision logic generation system 40 to generate and alter scenarios according to the performance assessment, may be used.

The scenario-providing module 70 may be operative to maintain and dynamically adjust a batch of active scenarios 79 used for performing simulations in the simulation engine 80. The scenario-providing module 70 may use scenarios from two or more different sources 71-73 for inclusions into the batch of active scenarios 79. The sources 71-73 may include a repository of historical and/or user-defined scenarios. The sources 71-73 may include a logic that generated computer-generated scenarios, which are neither included in the historical data nor defined by a human expert.

The scenario-providing module may adjust the batch of active scenarios 79 in such a manner that, in the batch of active scenarios 79, a fraction of historical and/or user-defined scenarios decreases, optionally monotonously, in the iterative process of generating the decision logic.

The scenario-providing module may adjust the batch of active scenarios in such a manner that, in the batch of active scenarios 79, a fraction of scenarios generated by the scenario-creating logic increases, optionally monotonously, in the iterative process of generating the decision logic.

Figure 17:
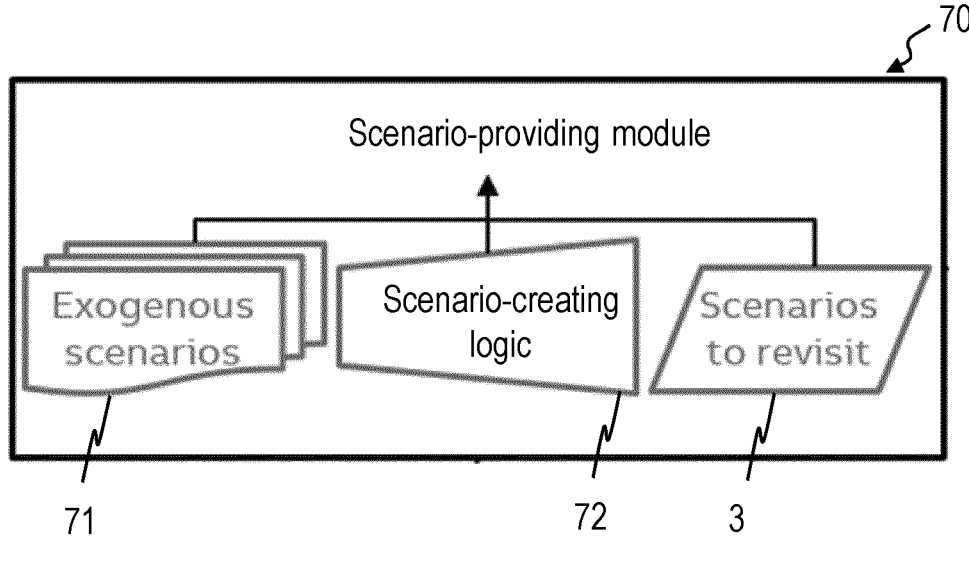
FIG. 17 is a block diagram of a scenario-providing module.

FIG. 17 shows an implementation of a scenario-providing module 70. The scenario-providing module 70 may combine scenarios from three sources:

Exogenous scenarios 71: A set of scenarios, deemed to be critical and/or most probable, are provided by a human engineer prior to executing the autonomous decision logic generation process and/or are selected from historical data.

Scenario-creating logic 72: New scenarios can be continually generated as part of an active learning approach.

Scenarios to revisit 73: Challenging or critical scenarios which are already used to test the decision logic can be used recurrently as new decision logic is being tested.

These challenging scenarios may be retrieved from the historian 110. The scenario-providing module 70 may select scenarios from the three sources 71-73 and may feed the resulting batch to the simulation engine 80. This selection can be performed in a variety of ways. For example:

At the beginning of the process of generating the decision logic, the scenario-providing module 70 may feed the simulation engine 80 with scenario batches selected among the exogenous scenarios 71.

During the process of generating the decision logic, the scenario-providing module 70 may receive a signal from the coordinator 100, indicating whether a so-far well-performing decision logic has been attained by the decision logic generator 60. In response thereto, the scenario-providing module 70 may select more scenarios created by the scenario-creating logic 72 in order to challenge the active decision logic 69.

The scenario-providing module 70 may keep track of challenging scenarios which triggered an update of the decision logic candidate, in particular of an architecture. Those scenarios can be labeled as scenarios to revisit. The scenario-providing module 70 may recurrently select scenarios from that list of scenarios to revisit to ensure that as the decision logic candidates are evolving, they are still able to tackle previously identified challenging scenarios.

The scenario-providing module 70 can select scenarios from the set of challenging scenarios to revisit in a randomized manner or using specific selection criteria. For illustration, the scenario-providing module 70 may be progressively trained to learn which scenarios in the list of challenging scenarios are most likely to influence the decision logic and will select such scenarios more frequently for inclusion in the batch of active scenarios 79.

Scenario-Creating Logic

The scenario-creating logic 72 is operative to challenge the active decision logic 69, i.e. identify legitimate scenarios which cause the decision logic candidate to underperform.

As used herein, a decision logic candidate may be regarded to underperform if a performance determined by the performance assessor 90 does not meet a performance-based quality criterion, e.g., if it fails a performance threshold test.

The output of the scenario-creating logic 72 may consist of values assigned to all the parameters which define a scenario, such as demand and generation levels/patterns, contingencies, faults, topology etc. These parameters can be considered a scenario vector or any other tuple of scenario parameters.

Figure 18:
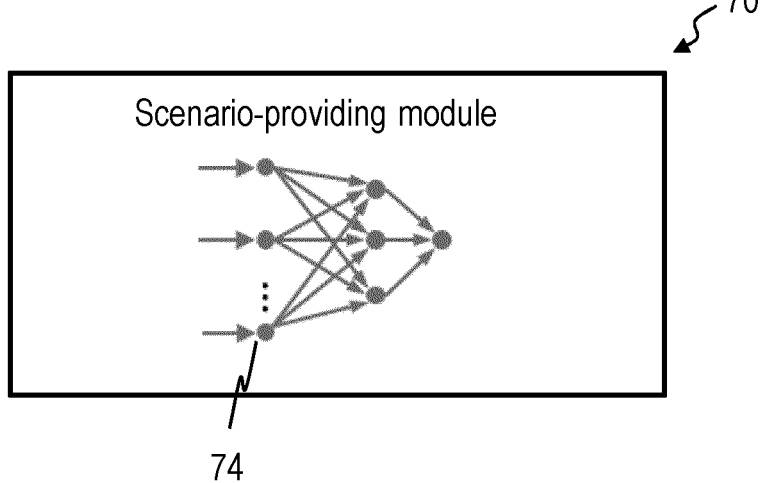
FIG. 18 is a block diagram of a scenario-providing module.

As illustrated in FIG. 18, the scenario-creating logic 72 may include or may be implemented by a ML model 74, such as an ANN, as schematically (or, in general, any other ML model).

The ML model 74 may be operative to generate sets of parameter values (such as parameter vectors). An output of the scenario-creating logic 72 may continually change throughout the process of generating a decision logic. The ML model 74 may be operative to generate usefully challenging scenarios. The ML model 74 is set up in such a way that its outputs correspond to legitimate scenarios, i.e., scenarios within the system specifications of the power system.

Figure 19:
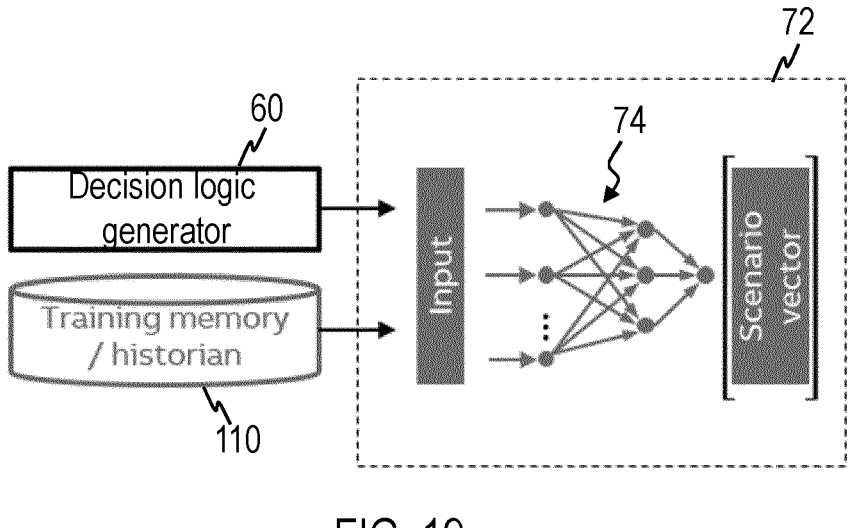
FIGS. 19 and 20 are diagrams for explaining operation of a scenario-creating logic.
Figure 20:
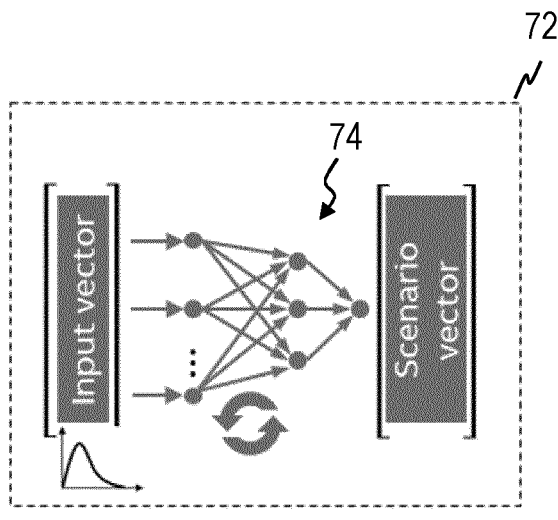

The ML model 74 of the scenario-creating logic 72 may be implemented in various ways, as illustrated in FIGS. 19 and 20.

The ML model 74 may be a discriminator of a GAN, with the generator of the GAN being provided in the decision logic generator 60.

FIG. 19 illustrates an implementation of the scenario-creating logic 72 in which the ML model 74 works as a (possibly stochastic) function mapping from an input to a set of scenario parameters.

The input may contain a description of the current decision logic (and, possibly, a description of previous iterations, obtained from the historian 110).

The ML model 74 of the scenario-creating logic 72 may be learned during the decision logic generation process such that the generated scenario will be a challenging one where the decision logic candidate predictably shows low performance. The scenario-creating logic 72, which is internally described by its architecture and its parameter values (e.g., ANN weights), can trained by making use of previously simulated scenarios and the corresponding controller performance (which may be received from historian 110), as part of the autonomous decision logic generation process.

An objective of the learning process is to cause convergence of the ML model 74 of the scenario-creating logic 72 to a trained model which can create challenging scenarios for a given decision logic candidate 69. The parameter values defining the scenario-creating logic 72 change faster at the beginning of the autonomous decision logic generation process, until converging to a well performing scenario-creating logic 72. As the autonomous decision logic generation process progresses, parameters of the ML model 74 of the scenario-creating logic 72 may change only minimally if at all.

FIG. 20 illustrates an implementation of the scenario-creating logic 72 in which the ML model 74 is continually updating itself (e.g. the ANN weights are continually changing) during the decision logic generation process. Contrary to option 1 above, this approach does not aim at converging to a set of parameters. The parameters will be continually changing such that, at every instance of the design process, the scenario-creating logic 72 is creating "usefully challenging" scenarios.

In this case, the input to the scenario-creating logic 72 does not come from the decision logic generation process. A pre-selected input vector may be used, which may be rather small. This input vector can be static (i.e. constant) or randomly varying (within a statistical distribution). For illustration, if the scenario-creating logic 72 is an ANN, the way this input vector is transformed through the ANN internal operations and hidden layers into a scenario vector at the ANN output layer can vary as the ANN weights are being updated.

The architecture of the scenario-creating logic 72 (as well as the input vector required in the case of the architecture in FIG. 20) may be provided by the human engineer prior to the decision logic generation process or automatically identified during the generation process by resorting to an architecture supervisor as described with reference to the decision logic generator 60.

Parameter Search Methodology

The decision logic generator 60 and/or the scenario-creating logic 72 may be operative to identify good or optimal values for a set of parameters (including possibly hyperparameters). Such parameters/hyperparameters can include but are not limited to:

the weights of an ANN, the hyperparameters of a decision logic architecture (e.g., number of hidden layers, number of nodes in each layer, recurrent loops, gates or any other structural element), or parameters of a decision logic candidate with a predefined structure (for illustration, identification of constraints for an OPF control, as explained above).

Any one of the following techniques may be used, for example by decision logic generator 60 and/or the scenario-creating logic 72, as part of the autonomous process of generating a decision logic. The search for optimal parameter values is essentially an optimization problem.

There may be discrete or continuous decision variables (or a mix of both kinds) subject to optimization. The kind of the decision variables and the number of them (i.e. the dimensionality of the search space) have an impact on the difficulty of the optimization problem, the best optimization method, and the quality of the optimization result to expect. While for low dimensional or convex continuous high dimensional problems, a global optimum is achievable, in other cases, often only local optimization is possible.

Trial-and-error search can always be applied as it does not require any analytical information (such as gradients) to guide the search of the parameter space. It only requires that the performance of a parameter set can be evaluated, which is always the case in the techniques disclosed herein, as it is the role of the performance assessor 90 to perform the evaluation, by using the results of the simulation engine 80 (e.g. by simulation of a batch of active scenarios 69). The evaluation of a set of parameters may be referred to as a "reward signal". Established trial-and-error search methods include evolutionary and genetic algorithms, hill-climbing, simulated annealing, and other heuristics. A shortcoming of trial-and-error search methods is their low time efficiency. To address or mitigate this shortcoming, other methods can be used, depending on the case, as explained in the sequel.

Model-based search relies on the availability of a model (analytical or machine learning-based) which estimates the expected performance of a choice of parameters, thus bypassing the need to simulate (batch of) scenario(s) in order to compute the performance metric. If this model is identified previously from several simulations of batches of scenarios, the model is called a surrogate model. If the surrogate model is analytical, then a formal optimization method can be adopted to identify the optimal parameters. If the parameter space in question is of low dimension, surrogate model-based optimization may be the preferred approach.

An example of how a (machine learning-based) surrogate model can be identified and utilized during the autonomous decision logic generation process is provided below with reference to FIG. 69.

For optimizing parameters of an ANN, supervised learning and reinforcement learning (RL) as described below may be used.

Supervised learning may be used to optimize the parameters of an ANN, by means of (stochastic) gradient descent. It requires a supervised learning signal, i.e. the "right ANN output", to be available. If a decision logic is trained via supervised learning, this is referred to as imitation learning, since the decision-maker learns to imitate another decision-maker. Utilizing supervised learning is only applicable when the performance assessor 90 or the simulation engine 80 is able to determine the "right ANN output", so that this serves as the benchmark decision. In order to make imitation learning successful, challenging scenarios are to be included in the training data. This is performed by the scenario-providing module 70 and, specifically, its scenario-creating logic 72.

Reinforcement learning (RL) can be applied if no supervised learning signal is available, but a reward signal is available. That is, contrary to the case in supervised/imitation learning, the performance assessor 90 cannot determine what the control action should have been in a given scenario, but it can evaluate the outcome of the control action (i.e. compute a performance metric.) A reward signal can be defined based on the performance metric; hence it can always be available. Utilizing RL may be more time efficient than trial-and-error search.

A large variety of RL algorithms is available, especially for learning ANN-based decision logic. Modern RL approaches, which have state of the art performance and are hence preferred for the various embodiments, have the following characteristics:

The decision logic may be complemented with an estimator of a value function, which is a (discounted) cumulative expected future reward given the current state and action. Thus, the gradient is moving the decision logic parameters in a direction which improves the long-term performance of the decision logic, rather than a myopic gradient based on the actual reward.

The update of the parameters is performed on historical trajectories of data comprising observations (input to the decision logic) and decisions. For such a trajectory, only a few training epochs are executed, which reduces the computational effort and at the same time is necessary for training stability.

Figure 21:
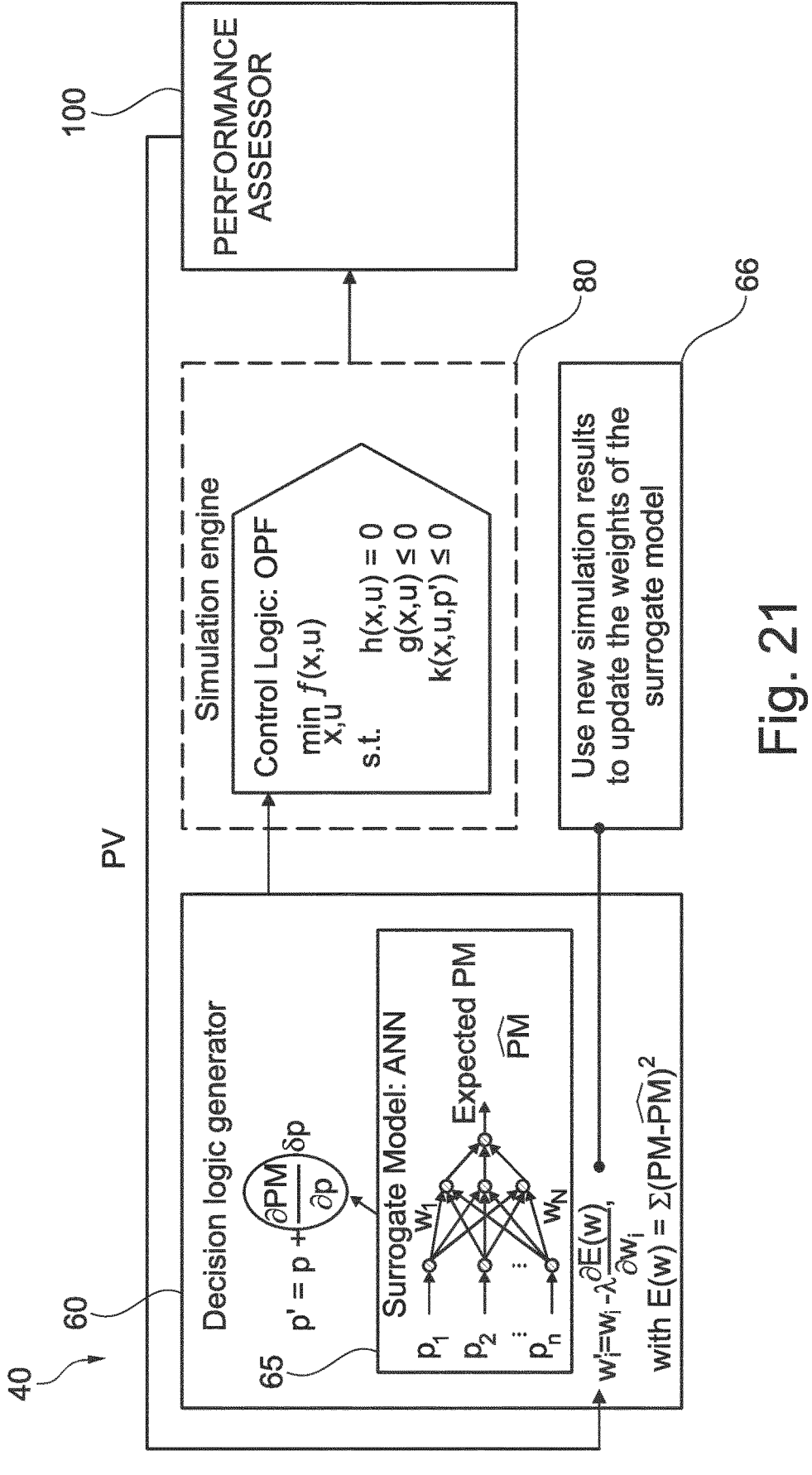
FIG. 21 is a block diagram of a system for generating a decision logic.

FIG. 21 shows an illustrative example of how a (machine learning-based) surrogate model 65 can co-exist with and update the parameters of an OPF-based decision logic.

For this implementation, it is important to make a distinction between how the decision logic parameters ($\vec{p}$) (which are the inputs to the surrogate model) are updated and how the surrogate model itself is trained (i.e. how the internal weights, $\vec{w}$, of the ANN are updated) during the autonomous design process. In order for the decision logic generator 60 to identify a new set of parameters, $\vec{p}'$, the gradients of the performance metric with respect to each parameter, $\frac{\partial PM}{\partial \vec{p}}$ (it being understood that the derivative is a short-hand for the gradient, i.e., the partial derivates of PM with respect to the vector components of the vector $\vec{p}$) are computed by using the surrogate model.

The decision logic generator 60 may use these gradients (for example performing stochastic gradient descent) to compute new values of $\vec{p}'$ which are then utilized in the constraints $\vec{k}(\vec{x}, \vec{u}, \vec{p}') \leq \vec{0}$, thus altering the decision logic candidate.

The new decision logic candidate may be simulated versus batches of scenarios and its performance may be assessed as already explained. This assessment may not only be used to update the values of the parameters $\vec{p}$, but also to update the surrogate model itself (i.e. the weights of the neural network). The updated surrogate model may be used to compute the next set of $\vec{p}$ values to be tried by the decision logic generator 60. Both the target decision logic itself and the surrogate model are trained in parallel to each other (more specifically, in alternating rounds) during the autonomous process of generating a decision logic.

The dynamics of the above-described learning process inherently stabilize towards convergence to a sufficiently accurate surrogate model 65 and a decision logic with high performance.

If the surrogate model is good enough, then the resulting $\vec{p}'$ will be in the right direction, improving the control logic performance. On the other hand, if the surrogate model is not good enough, then the resulting $\vec{p}'$ will not necessarily be improving the control logic. However, such a step will still be beneficial for the algorithm, as it will generate new data samples which will be used to upgrade the surrogate model, eventually reaching a sufficiently good accuracy level.

Similarly, a surrogate model 65 can be trained during the design process and utilized to update the weights and/or the hyperparameters of an ANN, as explained, e.g., with reference to FIGS. 9 to 16 and 18 to 20.

For example, for ANN hyperparameter update, instead of evaluating the performance of the active ANN architecture via running a training epoch, a surrogate model 65 may be trained to estimate an expected performance of a set of hyperparameters. The surrogate model 65 may be another ANN which may be trained to receive the hyperparameter vector as an input and predicts the performance of the corresponding architecture. It is used by the architecture supervisor 61 to identify the most promising architectures, so that only these architectures are tested via a time-consuming full training epoch.

The surrogate model 65 can be built progressively during the decision logic generation process, using the performance metric assessments of various architectures which are already trained. The process can start with no such surrogate model 65 available or, alternatively, it can start with a surrogate model 65 which was trained in a previously solved decision logic generation process.

The decision logic generator 60 may comprise a supervisory module operative to ensure that an active learning approach is followed in order to guide the training of the surrogate model 65 (for example, by means of RL).

Coordinator

When the decision logic generation system 40 includes a decision logic generator 60 and a scenario-providing module 70 having adversarial objectives, coordination should be provided to ensure convergence to a desired solution in a time-efficient manner.

As shown in FIGS. 6 and 11, a coordinator 100 may be operative to control the decision logic generator 60 and the scenario-providing module 70 (in particular the scenario-creating logic 72). The coordinator 100 may be responsive to simulation results. The coordinator 100 may generate and output control signals to the decision logic generator 60 and the scenario-providing module 70 (in particular the scenario-creating logic 72). The coordinator 100 may generate and output control signals to the decision logic generator 60 and the scenario-providing module 70 (in particular the scenario-creating logic 72) to coordinate and regulate the process of generating decision logic candidates and scenarios for challenging the decision logic candidates.

The coordinator 100 may control a learning rate of the decision logic generator 60 and/or the scenario-creating logic 72, which determines a rate at which parameters are changed in response to a feedback signal.

The autonomous process of generating a decision logic performed by the decision logic generation system 40 is a dynamic process. Such a process can either converge to an equilibrium, i.e. a situation where the scenarios generated by the scenario-creating logic 72 are not challenging the active decision logic candidate 69 and, at the same time, the decision logic updates generated by the decision logic generator 60 do not significantly improve the performance metric, or not timely converge to an equilibrium but, instead, the decision logic generator and the scenario-providing module continually produce decision logic updates and new scenarios.

Role of the

In the first case, it is possible, but not guaranteed, that the decision logic corresponding to this equilibrium is the desired one. However, if the convergence is too fast, without properly exploring the feasible options for control logic and scenarios, the process can stall at an undesirable equilibrium (such as in the "mode collapse" and "diminished gradient" problems in the art).

For example, the decision logic candidates 69 might become good so quickly that the generation process is driven to an equilibrium where the scenario-creating logic 72 cannot generate any scenario that visibly challenges the decision logic, i.e. that results in reasonably different performance metric. The impact of such a situation is that the gradient information in a training loop of the scenario-creating logic 72 does not provide sufficient guidance towards creating more challenging scenarios, i.e. the scenario-creating logic 72 cannot learn how to generate new challenging scenarios even though such scenarios might still exist and need to be identified in order for the decision logic generation process to eventually terminate at a desired decision logic.

The coordinator 100 may be operative to ensure that the autonomous decision logic generation process does not stall at a premature equilibrium without properly exploring the feasible options for decision logic candidates and scenarios, and terminate the autonomous decision logic generation process (at an equilibrium or without reaching an equilibrium).

The coordinator 100 may actively control operation of the decision logic generator 60 and the scenario-creating logic 72 to ensure that the autonomous decision logic generation process does not stall at a premature equilibrium without properly exploring the feasible options for decision logic candidates and/or scenarios.

For illustration, the coordinator 100 may be operative to perform any one or any combination of the following:

driving a learning rate of the decision logic generator 60, updating (e.g., continually updating) a scenario-selection strategy of the scenario-providing module 70 (which may include triggering the scenario-providing module 70 to increase a number of computer-generated scenarios created by the scenario-creating logic in the batch of active scenarios 79), decelerating (e.g., even by freezing) and/or accelerating learning rate(s) of the decision logic generator 60 and/or the scenario-creating logic 72, and/or decelerating (e.g., even by freezing) and/or accelerating a process of adding new scenarios created by the scenario-creating logic to the batch of active scenarios 79, such that the other process can evolve, determining whether the performance metric used by the performance assessor 90 has to be modified, and if yes, modify the performance metric, and identifying whether the overall decision logic generation process is stalled at a suboptimal solution, and, if the process is stalled, re-positioning and/or re-directing the learning process such that the stalled situation is avoided.

The coordinator 100 can cause termination of the decision logic generation process, according to any one or any combination of the following criteria:

A performance threshold, defined by an input that may be received from the human engineer at the UI 25, is met (e.g. grid operation cost below a desired value, pre- and post-contingency operational constraints satisfied, protection KPIs met etc.)

The performance is not anymore improving, or it is marginally improving (e.g. grid operating cost not decreasing anymore by decision logic updates.)

space of decision logic architecture and/or parameterizations is sufficiently explored. The level of exploration can be measured by assessing the statistical coverage of the decision logic instances which have been tested and mapping it to the space of design options.

The space of potential scenarios is sufficiently covered. The level of exploration can be measured by assessing the statistical coverage of the scenario instances which have been tested and mapping it to the space of design options.

Figure 22:
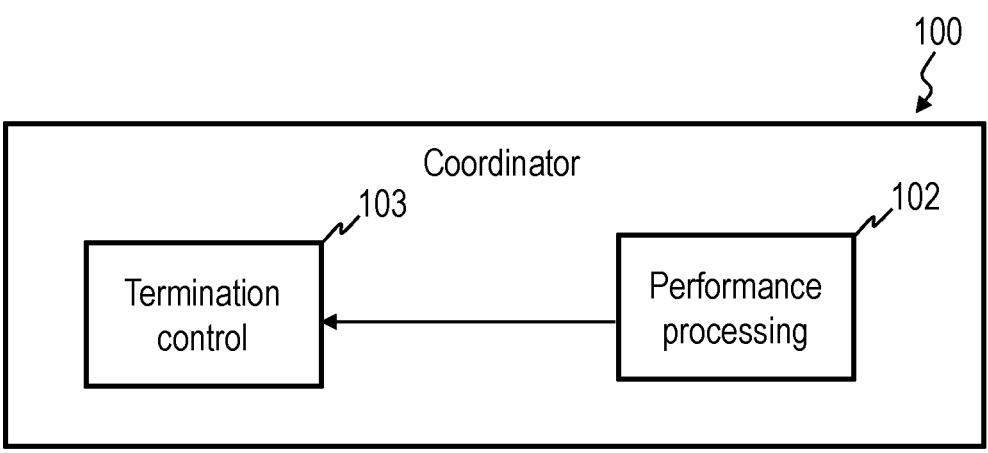
FIG. 22 is a block diagram of a coordinator.

FIG. 22 is a block diagram of a coordinator 100 according to an embodiment. The coordinator 100 may include a performance processing module 102. The performance processing module 102 may be operative to monitor an evolution of the performance determined by the performance assessor. The performance processing module 102 may be operative to determine a rate of change of the performance.

The coordinator 100 may include a termination control module 103. The termination control module 103 may be responsive to an output of the performance processing module 102, e.g., responsive to a computed rate of change of the performance in the iterative generation process.

The termination control module 103 may be operative to control when training of decision logic candidates with a selected architecture is to be terminated and another architecture is to be selected. The termination control module 103 may trigger the decision logic generator 60 to select another decision logic architecture, e.g., by changing hyperparameters.

Alternatively or additionally, the termination control module 103 may be operative to control when the overall process of testing different decision logic architectures and training these architectures is to be terminated.

The termination control module 103 may prevent termination of training of the decision logic generator and/or the scenario-creating module, depending on a number of the decision logic candidates for which the performance has been evaluated.

The termination control module 103 may prevent termination of training of the decision logic generator and/or the scenario-creating logic depending on a threshold comparison of the number of the decision logic candidates for which the performance has been evaluated. Training may be continued if the number of decision logic candidates for which the performance has been evaluated is less than a threshold. Alternatively or additionally, training may be continued if the decision logic candidates for which the performance has been evaluated do not adequately cover at least a set of different regions in a parameter space or hyperparameter space.

Alternatively or additionally, the termination control module 103 may prevent termination of training of the decision logic generator and/or the scenario-creating module, depending on the scenarios that have already been generated by the scenario-creating module.

The termination control module 103 may prevent termination of training of the decision logic generator and/or the scenario-creating logic depending on a threshold comparison of the number of the scenarios for which system simulations have been performed. Training may be continued if the number of scenarios for which system simulations have been performed is less than a threshold. Alternatively or additionally, training may be continued if the scenarios for which system simulations have been performed does not adequately cover at least a set of different regions in a scenario space.

Figure 23:
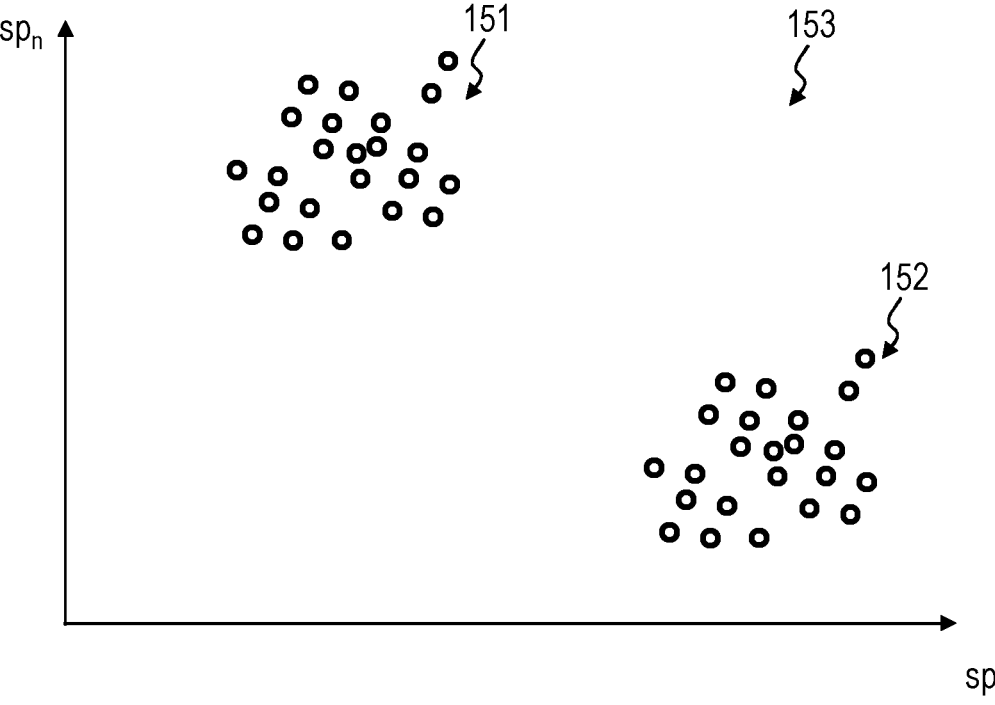
FIG. 23 is a schematic representation of a cross-section through a space spanned by scenario parameters.

FIG. 23 illustrates a plane in a scenario parameter space. Scenarios 151, 152 represent scenarios which have been included in a batch of active scenarios 69 for at least one of the decision logic candidates 69. A level of exploration of the space can be measured by assessing the statistical coverage of the scenario instances which have been tested and mapping it to the space of possible scenarios. Alternatively or additionally, the scenario parameter space may include regions 153 which need to be covered. Termination of the decision logic generation process may be prevented until at least some scenarios in such region(s) 153 have been tested. The coordinator 100 may active direct the scenario-creating logic 72 to create scenarios within that region 153.

Figure 24:
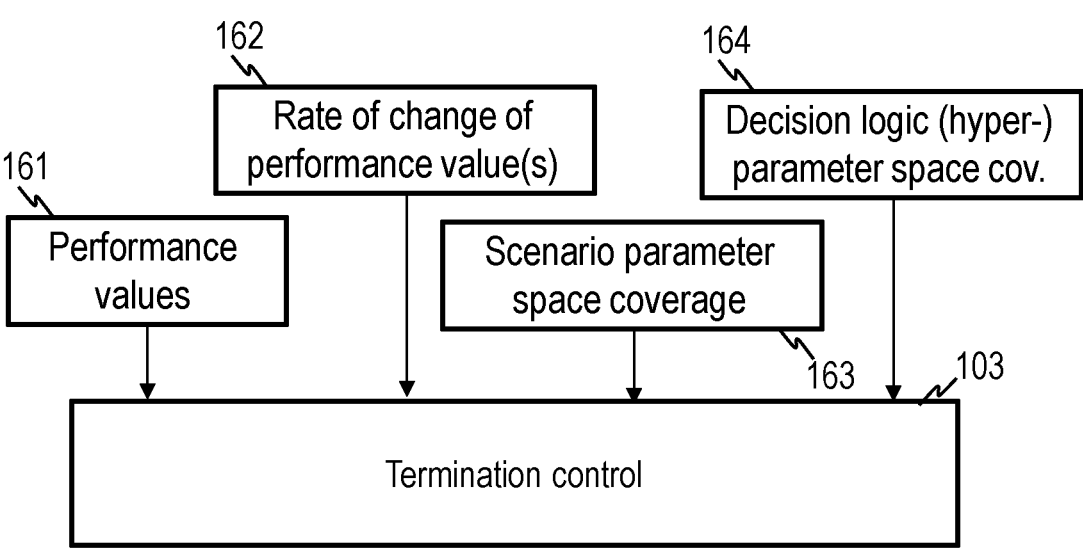
FIG. 24 is a schematic representation for explaining operation of a coordinator.

FIG. 24 illustrates inputs that may be processed by the termination control 103. The termination control may trigger and/or prevent termination of the training of a decision logic candidate architecture or the change from one architecture or another in dependence on performance(s) 161 that have been attained, a rate of change of performance(s) 162, a scenario space coverage 163, and/or a decision logic coverage 164, which may quantify a coverage in decision logic parameter space or decision logic hyperparameter space.

The coordinator 100 may be operative guide the convergence process, using any one or any combination of the following ways:

1. If the decision logic candidate generator 60 has identified a decision logic candidate 69 with good performance, the coordinator 100 may reduce a learning rate of the decision logic candidate generator 60 (or may even completely freeze the decision logic candidate generator 60). This may allow the scenario-providing module 70 and, in particular, the scenario-creating logic 72 to sufficiently challenge this decision logic candidate 69 by selecting or generating the appropriate scenarios. In addition, or alternatively, the coordinator 100 may send a regulation signal to the scenario-providing module 60 to change the mix of active scenarios in the batch 79, for example by increasing a fraction of scenarios created by the scenario-creating logic 72.

2. If the scenario-providing module 70 and, in particular, the scenario-creating logic 72 has identified a set of challenging scenarios which cause the decision logic candidate 69 to underperform, the coordinator 100 may increase a learning rate of the decision logic candidate generator 60 to allow it to modify the decision logic candidate 69 more efficiently.

3. When the scenario-creating logic 72 has created a set of scenarios which successfully challenge the decision logic candidate 69, the coordinator 100 may freeze the process of generating new scenarios so that the decision logic generator 60 can try to build a new decision logic candidate 69 which can tackle the scenarios in the active batch.

For illustration, when the decision logic generator 60 has generated a decision logic candidate 69 that is performing well under a given set of scenarios 79, the process may be frozen, deeming the decision logic candidate as "active", and the scenario-creating module 72 may continue to operate with the objective of identifying a batch of scenarios which will challenge the active control logic 69. This may include further training of the scenario-generating ANN 74.

During another iteration, when the scenario-creating module 72 has created a set of scenarios which successfully challenge the active decision logic candidate 69, the process of generating new scenarios may be frozen, deeming such scenarios as "active scenario batch" 79. The decision logic generator 60 operates with the objective to build a new decision logic candidate 69 which can tackle the scenarios in the active batch 79.

4. The coordinator 100 may cause previously identified challenging scenarios that have caused a previously tested decision logic candidate to underperform are recurrently reintroduced to the active scenario batch by the scenario-providing module 70. The coordinator 100 may evaluate a rule or execute a to decide, during the autonomous decision logic generation process, which of the previously challenging scenarios shall be revisited. A way to make such decision is to reintroduce a challenging scenario whenever the active decision logic candidate 69 has significantly changed compared to the decision logic candidate 69 in a corresponding decision logic candidate—challenging scenario pair previously identified by the performance assessor and stored in the historian 110.

Previously tested scenarios can be clustered, based on a similarity metric. This information can be utilized by the coordinator 100 to ensure that scenarios from different clusters are revisited.

5. In order to reach the desired decision logic in a timely manner, the autonomous generation process may include a trade-off between exploration (of scenarios and decision logic candidate 69 options) and exploitation (or resources such as available time, computing infrastructure, software licenses etc.).

The decision logic generator 60 and the scenario-providing module 70 aim at i. exploring the space of decision logic candidate 69 designs and scenarios 79, respectively, to ensure that all options are sufficiently covered, while ii. focusing the available resources on the most promising decision logic candidate 69 designs and on testing using the most useful scenarios (i.e. challenging and representative).

The decision logic generator 60 and the scenario-providing module 70 may have inherent mechanisms to balance the exploration vs. exploitation trade-off. Alternatively or additionally, the trade-off can be achieved is that the coordinator 100 can send a signal to the performance assessor 90 to decrease the weights of some constraints which are part of the performance metric.

6. To prevent the autonomous decision logic generation process from getting stalled, the coordinator 100 may monitor a rate of improvement of the decision logic generator 60 and the scenario-creating logic 72. Based on a comparison of a rate of improvement of the decision logic generator 60 and the scenario-creating logic 72, learning rate(s) of the decision logic generator 60 and the scenario-creating logic 72 may be adjusted. For illustration, if one of the decision logic generator 60 and the scenario-creating logic 72 improves much faster than the other, the coordinator 100 may decrease its learning rate to allow for the other subsystem to improve itself as well.

Figure 25:
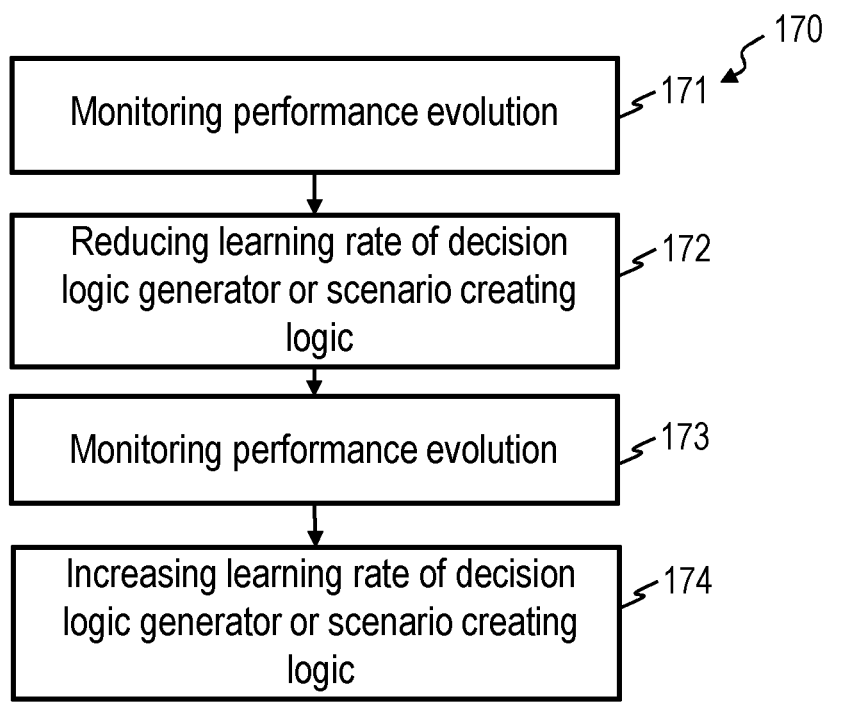
FIGS. 25 to 28 are flow charts of method.

FIG. 25 is a flow chart of a method 170. The method 170 may be performed by the coordinator 100.

At step 171, a performance evolution may be monitored. This may comprise monitoring an evolution of the performance determined by the performance assessor 90 in an iterative process in which a decision logic candidate is trained (i.e., its parameters are changed) and/or architectures of the decision logic candidates are changed.

At step 172, a learning rate of the decision logic generator 60 or of the scenario-creating logic 72 may be selectively decreased based on the evolution of the performance. For illustration, if one of the decision logic generator 60 and the scenario-creating logic 72 improves much faster than the other, the coordinator 100 may decrease its learning rate to allow for the other subsystem to improve itself as well. Improvement of the decision logic generator 60 as compared to the scenario-creating logic 72 may be reflected by an improvement of the performance of the active decision logic candidate 69 under the scenarios 79, as determined by the performance assessor. Improvement of the scenario-creating logic 72 as compared to the decision logic generator 60 may be reflected by an improvement of the performance of the active decision logic candidate 69 under the scenarios 79, as determined by the performance assessor.

At step 173, the performance evolution may be continued to be monitored.

At step 174, the learning rate that has previously been decreased may be increased again. This may be done as a function of the performance evolution monitored at step 173. For illustration, if the decision logic generator 60 operates with decreased learning rate, the scenario-creating logic 72 improves much faster than the decision logic generator 60 and the performance determined by the performance assessor 90 will decrease. The coordinator 100 may increase the learning rate for the decision logic generator 60 again when the performance determined by the performance assessor 90 has decreased (e.g., to or below a threshold).

Decreasing the learning rate may include freezing the decision logic generator 60 or the scenario-creating logic 72.

For illustration, when the decision logic generator 60 has generated a decision logic candidate 69 that is performing well under a given set of scenarios 79, the process of modifying the decision logic candidate 69 may be frozen, deeming the decision logic candidate 69 as "active". The scenario-creating logic 72 operates to identify a set of scenarios 79 for challenging the active decision logic candidate 69. This may include further training of the scenario-generating ANN 74.

When the scenario-creating logic 72 has created a set of scenarios 79 which successfully challenge the decision logic candidate 69, the process of creating new scenarios and/or of improving the scenario-creating logic 72 by learning may be frozen. The current active scenarios may be used as "active scenario batch" 70. The decision logic generator 60 operates to generate a new decision logic candidate 69 which can tackle the scenarios in the active batch 79.

Figure 26:
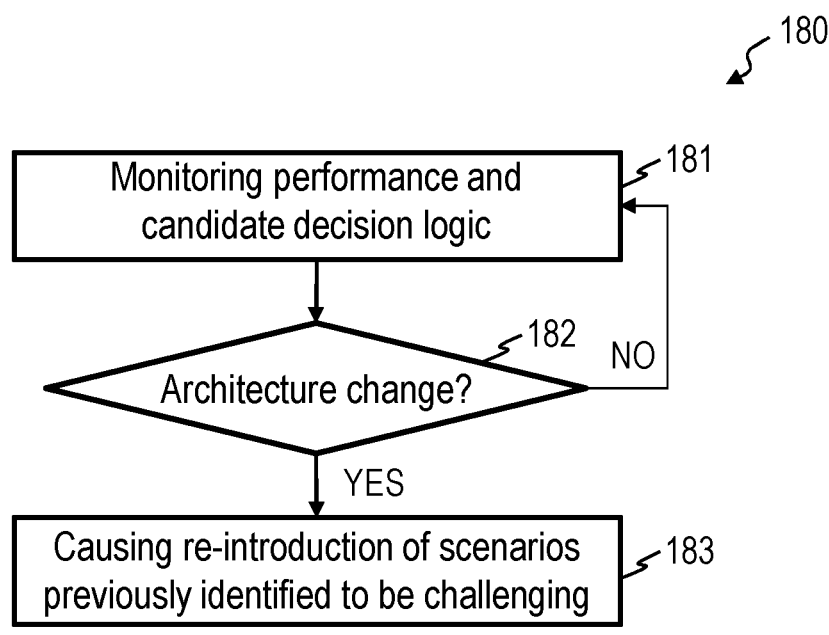

FIG. 26 is a flow chart of a method 180. The method 180 may be performed automatically by the controller 100.

At step 181, the controller 100 may monitor at least an architecture of the candidate decision logic that is being used and, optionally, performance determined by the performance assessor 100.

At step 182, it is determined whether an architecture of the decision logic candidates trained by the decision logic generator 60 has changed. Such a change in architecture may be triggered by controller 100 itself and/or by the performance assessor 90.

At step 183, in response to a change of the decision logic candidates trained by the decision logic generator 60 changes, the coordinator 100 may trigger the scenario-providing module 60 to recurrently reintroduce challenging scenarios into the batch of active scenarios. These challenging scenarios may be retrieved from the historian 110. These challenging scenarios may be scenarios that have been determined to cause another decision logic architecture to underperform, even after training Historian The historian 110 may be a storage device or storage system. The historian 110 may be provided locally or remotely, e.g., as a distributed storage system.

The historian 110 may be operative to store data generated during the decision logic generation process. Some of the data may be retrieved for identifying the best-performing decision logic candidate(s) and/or for use in training other decision logic candidates.

The entries in the historian 110 may include information on the decision logic candidate, the (batch of) scenario(s) for which the decision logic candidate has been tested, and the resulting performance metric value.

For illustration, each entry in the historian 110 may include:

a scenario vector (or a batch of scenario vectors)
one specific decision logic candidate (i.e. all the specific values defining the decision logic architecture and its associated parameters)
the corresponding value of the performance metric.

Tags may optionally be included in the historian 110. For illustration, some of the entries may be labelled to indicate that they include one or several challenging scenarios that have caused the respective decision logic candidate to underperform.

Transfer Learning

A similar or identical decision logic generation task (e.g. generation of protection logic or of FACTS/HVC decision logic) can be encountered for different cases (such as different transmission or distribution grids, different projects etc.).

Each new decision logic generation process may build upon knowledge from previously designed decision logics to expedite the decision logic generation process and, possibly, lead to an even better-performing new decision logic. This improvement may relate both to the generated decision logic, and to the decision logic generator 60 and/or the scenario-creating logic 72.

The utilization of data generated in previous decision logic generation process may involve 4 transfer learning techniques. For illustration, for a given system topology, controller specification, and decision logic purpose, the architectures of the decision logic, the decision logic generator 60 and/or the scenario-creating logic 72 can be defined in advance, by means of transfer learning. The autonomous decision logic generation process can focus only on defining the associated parameters.

Example: Self-Design of Power System
Closed-Loop Control

The decision logic generation system 40 can be used for a transmission system. For illustration, the decision logic generation system 40 allows controllers to be configured or commissioned which are used by a transmission system operator (TSO). The decision logic generation system 40 can be used to generate a control scheme which allows a bottleneck effect of grid constraints to be reduced or minimized. This in turn allows the power grid to be operated closer to its limits. Less costly and greener electricity generation can be scheduled/dispatched at various time-ahead horizons (e.g. day-ahead, hour-ahead etc.).

In field operation, the designed decision logic(s) may monitor the power grid and generate and issue appropriate control actions. The control scheme can be a centralized one, where various grid components are controlled by one decision-making entity (typically at a control center), or a distributed one, where local controllers act independently towards the common objective. Another option is that the control scheme is a virtual one, acting as an artificial intelligence (AI)-assistant to the TSO. Actions may be suggested to the TSO in real-time during field operation, but do not need to be automatically actuated. The control scheme proposes and/or issues modifications of the active operating point of a power grid.

The control actions are not limited to corrective ones (e.g. to alleviate a monitored thermal overload or bring voltages within desired limits), but they can also be preventive, i.e. ensure an operating point which will be able to withstand any one out of a set of candidate contingencies.

For illustration, in power transmission systems, available power transfer capacity is constrained by the N−1 criterion, i.e. the requirement of the power system to be able to withstand any contingency (i.e. be N−1 secure.) This results to the additional control objective of N−1 security. The latter can be either "preventive" or "corrective". As used herein, an operating point is "preventively secure" if any considered disturbance results in a feasible and stable dynamic trajectory to a new feasible operating point without any action from the decision-making logic under design (the devices' primary controllers might be acting though.) As used herein, an operating point is "correctively secure" if the decision-making logic under design is capable of undertaking control actions, following any considered disturbance, such that a feasible and stable dynamic trajectory to a new feasible operating point is ensured (the devices' primary controllers might be also acting, in parallel to the decision-making logic under design.)

An "operating point" may (typically, but not exhaustively) be defined by the P and Q injections of generators and energy storage, P and Q consumption at various nodes, P and Q injections of HVDC converter stations, FACTS devices, settings of shunt components (capacitors, reactors), phase shifters, LVRs and OLTCs, status of switches, as well as the resulting P and Q power flows in the grid branches (lines, cables, transformers, converter stations, etc.) The control scheme may be operative to compute modifications for all, or a subset (e.g. only generation re-dispatch, or only FACTS control), of the above. In order to decide on an action, the control scheme may be based on a level of grid observability. In addition to the status of the aforementioned controllable components, typically the observability also includes receiving V and I measurements (time-synchronized or not) from the nodes.

Such a control scheme has various benefits. In real-time field operation, it increases grid reliability, reducing the likelihood of loss-of-load; and/or reduces grid operational cost, as it proposes the best actions. In look-ahead use, it can be relied upon when scheduling power transactions in look-ahead (e.g. day-ahead), i.e. making a higher grid transfer capability available to the electricity markets.

The decision logic generation system 40 can be used to generate such a control scheme. The decision logic generated by the decision logic generation system 40 is the control scheme.

Scenarios

A scenario can be defined by all or part of the following parameters, without being limited thereto:

all the variables which define an operating point (as defined above),
 one (or more or none) contingency/event (e.g. fault in a line),
 exogenous variables, such as temperature, wind speed, solar irradiance, time, season etc.,
 forecasts, such as load or renewable generation forecasts.

Performance Metric

The objective is to develop a control scheme which always ensures a feasible and stable/secure operating point, and such an operating point is achieved at the lowest possible cost.

The operating point resulting from actions suggested by the control scheme in a given scenario is computed in the simulation engine as explained below.

The performance assessor 100 may combine the "acceptability" and "cost" into one performance metric which is used by the decision logic generator 60, the scenario-providing module 70 and the coordinator 100.

The decision logic generation system 40 may be operative to find an extremum (for the following example: a minimum) of this performance metric:

1) If the operating point is not acceptable (e.g. unstable, or voltages or currents not within limits), then the "unacceptability" may be quantitatively determined by, e.g., measuring how close the operating point is to being acceptable.

For illustration, if the control scheme fails to maintain stability following a simulated disturbance, then the shorter time it took for the instability to appear in the simulation the higher the degree of "unacceptability". The unacceptability may quantify a time to reach instability after a disturbance. The definition of "appearance" of instability may be case-dependent. For instance, it can be the time instant when oscillation grows above a threshold, or the time instant when the solution of network equations takes above a certain amount of time (indicating closeness to infeasibility/singularity.)

Instability may be measured in an analytic manner, e.g. by means of eigenvalue analysis.

If at an operating point resulting from the simulated decision of the decision logic candidate, one (or more) nodal voltage or branch current is outside acceptable thresholds, then the "unacceptability" can be measured as the distance (e.g. Euclidean) from the closest acceptable value.

The value of "unacceptability" (typically multiplied by a sufficiently large scaling factor) may be one summand in the performance metric.

2) If the operating point is acceptable, then a corresponding "cost" may be added as another summand to the performance metric. The cost can be measured by means of some operational feature (e.g. the power transmission losses, or the total power produced by renewables) or it can be actual monetary cost. The cost can correspond to any one or any combination of the following, without being limited thereto:

The control action may be associated with some cost, such as generation redispatch or load reduction. The cost of such control actions can, for example, be estimated by resorting to previous clearings of the intra-day and ancillary services markets.

The success of the control scheme allows for a more economic operating point to be achieved. For illustration, the control scheme can successfully undertake corrective actions (as described above), issued following a disturbance/event, to ensure feasibility and/or stability of the post-contingency power system. The cost of the post-contingency actions is covered by item a above. However, the performance metric shall reflect the fact that, by relying to corrective actions, more economic operating points can be scheduled, as explained hereafter.

Thus, when a contingency is simulated and successfully tackled by the control scheme, the performance metric may include the cost of the pre-contingency operating point. This may be the total cost of the market clearing which results to the simulated operating point (i.e. the simulated generation injections and load withdrawals). The total cost of market clearing may be determined using, e.g., one or a combination of the following:

Based on historical data, a look-up table may be created prior to the autonomous decision logic generation process and provided to the performance assessor 90. The look-up table may map an operating point to its corresponding cost.

The definition of a scenario may be modified such that it includes the inputs provided to a market clearing optimization. For illustration, a scenario may include the bids of market participants (generators, energy storage participants, large consumers, load aggregators). The market clearing may be performed in the simulation engine 80 in accordance with the pre-contingency operating point(s) corresponding to the active scenario(s) 79.

Simulation Engine

The simulation engine 80 may include all the tools, software and algorithms operative to compute the above-described performance metric. For illustration, the simulation engine 80 may include any one or any combination of:

a market clearing simulator (optional, as discussed above)

Wind/solar/demand forecasting techniques, allowing to simulate their evolution in various scenarios.

dataset of past operating points/market clearings, and algorithms which can map the latter to the former and/or compute the likelihood of a given operating point (in order for this likelihood to be reflected in the performance metric)

AC power flow analysis, including continuation power flow. The AC power flow analysis allows steady-state behavior of the power system (pre- or post-contingency) to be simulated, including the actions issued by the control scheme.

power system numeric simulation (in time or frequency domain) modules. The power system numeric simulation module may allow dynamic behavior of the power system (pre- and post-contingency) to be simulated, including the actions issued by the control scheme, and/or a stability analysis to be performed.

Example: Power System Protection

The decision logic generation system 40 can be used by utilities, transmission system operators (TSOs), consultants and service providers to design the protection system for a given transmission or distribution grid. This may include determining and creating the grid and component models for the relevant simulations, identifying and creating the topological as well as generation and demand scenarios for a given grid, performing the numeric simulations, selection of protection functions and type of protection algorithms, coordination of relays, identification of relay settings, and testing the selected protection functions and algorithms.

In real-time operation, the transmission and distribution system equipment, including the transformers, overhead lines, underground cables, series/shunt elements etc. are protected by means of a measurement system (voltages, currents), digital relay(s) and circuit breaker(s). The control logic which is deployed in a digital relay may process the measured signals, identify whether there is a severe fault which should be cleared to avoid damage to system equipment and finally may output a signal to the circuit breaker to open. Fast identification and clearance of faults are essential for the reliability and the security of the overall system.

The control logic for each relay as well as the coordination scheme between multiple relays may be designed and tested under anticipated grid scenarios. Due to proliferation of converter-interfaced generation which introduces more stochasticity to the electricity supply temporally and spatially replacing the conventional generators, and e-mobility which introduces more stochasticity to demand, generating protection systems has become an increasingly complex task. In addition, due to the lack and different nature of short circuit current capacities provided by the converter-interfaced generators, protection systems may be expected to adjust to changing environments requiring them to be adaptive.

The capability of the designed protection logic to be adaptive in online mode, based on the observed power system conditions, can be part of the control logic design specifications.

The decision logic generation system 40 can be used to design such a protection system.

Scenarios

A scenario can be defined by all or part of the following parameters, without being limited thereto:

type of faults (requiring an action) or switching events (not requiring an action); including but not limited to single-phase-to-ground, phase-to-phase, three-phase faults along transmission/distribution lines; busbar faults; generator/load switching different fault inception angles (i.e. fault occurrence moment: whether the fault occurs at zero crossing or at maximum value of the current)

different loading levels in the system different fault locations along transmission/distribution lines different generation patterns in the system when the load is supplied dominantly by conventional generation or when the load is supplied dominantly by converter-interfaced generation different topologies that might be encountered during the normal operation of the system Each entry of a scenario vector may contain information of the expected action of relay(s) as tripping or not tripping.

Performance Metric

The objective is to develop a protection logic which is fast (i.e. identifies the fault and initiates action within one cycle), dependable (i.e. acts when it should act), secure (i.e. does not act when it shall not act).

The performance metric may reflect these three requirements. For example, the performance metric can consist of a weighted sum of speed, dependability and security. In order for the performance assessor 90 to evaluate dependability and security, a batch of scenarios is simulated.

Simulation Engine

The simulation engine 80 may include all tools, software and algorithms which allow to compute the above-described performance metric. These may include:

AC short circuit analysis: This module may be operative to calculate post-fault short circuit currents.

AC power flow analysis: This module may be operative to simulate steady-state behavior of the power system (pre- or post-fault), including the actions issued by the protection scheme. This software can be part of the short circuit analysis software.

Power system numeric simulation (in time or frequency domain): This module may be operative to simulate dynamic behavior of the power system (pre- and post-fault), including the actions issued by the protection scheme. It also can be operative to perform stability analysis. The power system numeric simulation tool can accurately simulate the behavior of converter-interfaced generation during short circuits. Unlike AC short circuit analysis which provides only the magnitude of the short circuit current, the power system numeric simulation tool can be operative to provide an exact evolution of the short circuit current in time so that the protection design takes into account the changes in the patterns of short circuit current in presence of converter-interfaced generation.

Deployment for Field Use and/or Modification after Field Use

The decision logic generated by the decision logic generation system 40 is deployed to a controller for field use. Operation of the deployed decision logic during field use may be monitored. Responsive to the behavior of the decision logic in field use and/or responsive to changes in the topology in which the decision logic is used, a process of automatically generating a revised decision logic may be triggered.

Figure 27:
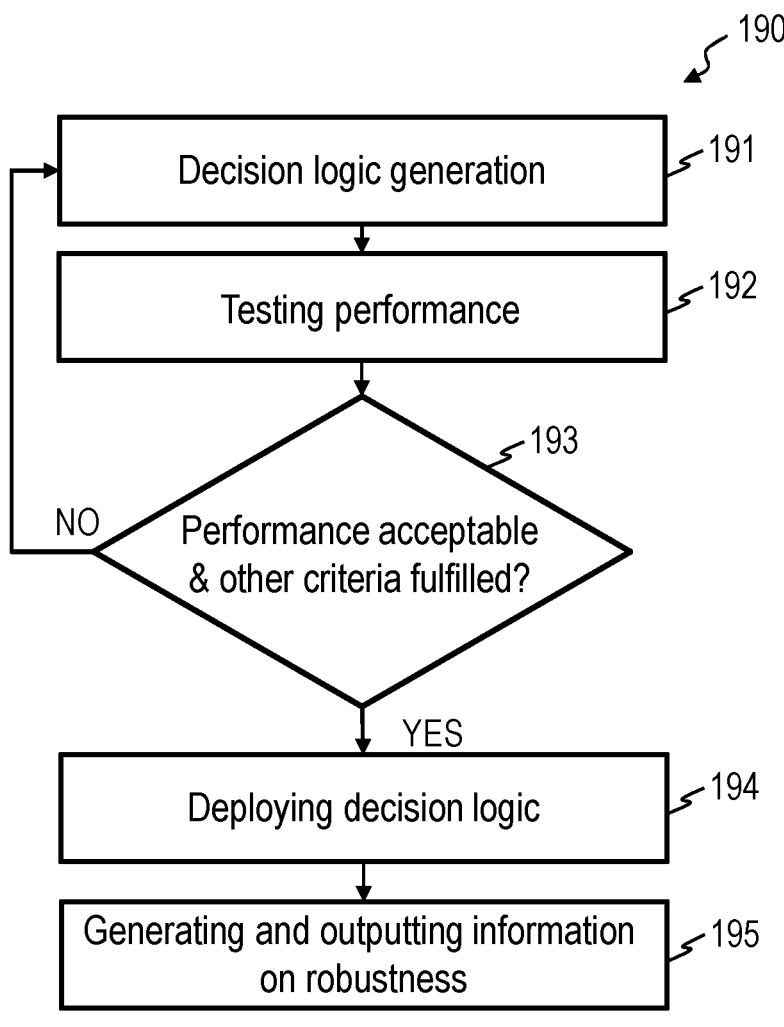

FIG. 27 is a flow chart of a method 190. The method 190 may be performed by the decision logic generation system 40.

At step 191, the decision logic is generated.

At step 192, optional further testing of the decision logic may be performed. Testing the decision logic may use some of the data stored in the historian 110. The generated decision logic may be tested under additional scenarios, using the simulation engine 80 and/or the scenario-providing module 60, while not further modifying the decision logic. Thereby, additional information on the robustness may be obtained.

At step 193, it is determined whether the performance of the generated decision logic is acceptable. This determination may be based, at least in part, on the data stored in the historian 110. Optional additional criteria may be taken into consideration. For illustration, information on the generated decision logic may be output to a human engineer via UI 25. Responsive to a reject/accept decision, the method may return to step 191 (if the generated decision logic is rejected) or proceed to step 194 (if the generated decision logic is accepted). When the method returns to step 191, the process of generating the decision logic may be re-run, using different performance metrics and/or different architecture(s) of the decision logic.

At step 194, the decision logic may be deployed. The decision logic may be deployed as machine-readable instructions which are executed by one or several IC(s) of the controller for which the decision logic has been generated.

At step 195, information on the robustness of the generated decision logic may be generated and output.

Figure 28:
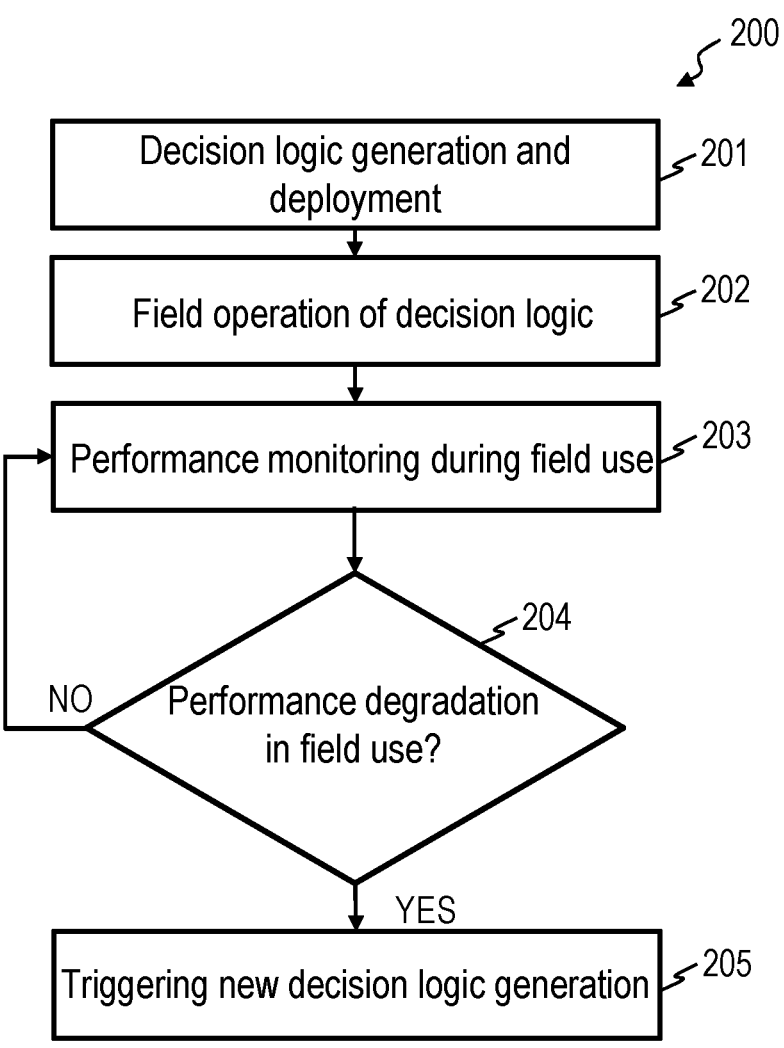

FIG. 28 is a flow chart of a method 200. The method 200 may be performed by the decision logic generation system 40 in association with monitoring device(s) deployed in the field.

At step 201, the decision logic is generated and deployed.

At step 202, a controller of a power system executes the generated decision logic. Executing the generated decision logic may comprise receiving, by the controller, input signals from sensor(s), merging unit(s), or gateways, processing the input signals in accordance with the decision logic, and generating and outputting an output based on the processing.

At step 203, performance of the decision logic in field use may be monitored. The monitoring may be performed by one or several field monitoring devices. Monitoring the decision logic in field use may comprise processing the outputs generated by the controller executing the decision logic and their effects on the power system. The monitoring device(s) may be communicatively coupled with the decision logic generation system 40.

At step 204, it is determined whether a trigger criterion for re-generating the decision logic is performed. performance of the generated decision logic is acceptable. The trigger criterion for re-generating the decision logic may involve a performance degradation of the decision logic during field use. Such a performance degradation may have various reasons, such as unexpected ambient conditions and/or topology changes. If the trigger criterion for re-generating the decision logic, the monitoring is continued at step 203.

At step 205, if the trigger criterion for re-generating the decision logic is fulfilled, the process of generating the decision logic may be started again. Data collected during field use of the decision logic may be used when re-generating the decision logic.

Various effects and advantages are attained by embodiments. For illustration, the computer-implemented process for generating a decision logic assists a human expert engineer in the complex task of configuring a power system or its substations. Robustness of a decision logic is enhanced. A wide variety of scenarios, including scenarios that occur infrequently during field operation of the decision logic and that may therefore not be included in historical data or expert-defined data, may be generated to assess performance of the decision logic during the computer-implemented process that results in the decision logic.

While embodiments have been described in the context of protection relays or other power system controllers, the methods and computer systems are not limited to generating the decision logic of a protection relay of a power generation, distribution, or transmission system. Rather, the disclosed methods and computer systems may be used to generate the decision logic of a controller or of several controllers of an IACS.

While embodiments have been described in detail in the drawings and foregoing description, such description is to be considered illustrative or exemplary and not restrictive. Variations to the disclosed embodiments can be understood and effected by those skilled in the art and practicing the claimed embodiments, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A computer-implemented method of providing a decision logic for a controller of a protection device in an Industrial Automation Control System (IACS) of a power system, the method comprising:
   an iterative process including plural iterations that respectively include
      automatically generating a decision logic candidate for the decision logic, and
      computing a performance of the decision logic candidate in response to scenarios,
   wherein computing the performance comprises performing system simulations;
   selecting at least one decision logic from the decision logic candidates based on a result of the computed performances; and
   deploying the selected at least one decision logic to the protection device, to initiate execution of the selected at least one decision logic, during live operation of the IACS, wherein the selected at least one decision logic, when executed, provides a protection function to the power system, and wherein the protection function comprises determining whether or not to trip a circuit breaker within the power system.

2. The method of claim 1, wherein a scenario-creating logic is executed to create at least part of the scenarios used in the iterative process.

3. The method of claim 2, wherein the scenario-creating logic is an adversarial logic to a decision logic generator that automatically generates the decision logic candidates in the iterative process, and/or wherein the scenario-creating logic is a machine learning model or comprises a machine learning model.

4. The method of claim 2,
   wherein the scenario-creating logic learns iteratively while parameters of at least one of the decision logic candidates are updated and/or decision logic candidates having different machine learning model architectures are challenged by the scenarios in the system simulations, and/or
   wherein the scenario-creating logic learns with an objective of causing at least one of the decision logic candidates to underperform in accordance with a performance-metric or several performance metrics.

5. The method of claim 2, wherein the scenario-creating logic is constrained to only generate scenarios that are within a system specification of the IACS.

6. The method of claim 1, further comprising:
   storing scenarios that cause a decision logic candidate having a first machine learning model architecture to underperform;
   retrieving at least some of the stored scenarios; and
   determining a performance of at least one further decision logic candidate having a second machine learning model architecture different from the first machine learning model architecture in response to the retrieved scenarios.

7. The method of claim 1, wherein computing the performance comprises combining computed values of at least one performance metric determined for a decision logic candidate for a batch of scenarios, optionally wherein combining the computed values comprises weighting the computed values based on a frequency of occurrence of the scenarios in the batch during field operation of the IACS.

8. The method of claim 1, wherein generating the decision logic candidates comprises training machine learning models, optionally wherein at least part of the scenarios used in the iterative process is created by a scenario-creating logic and the scenario-creating logic and the decision logic generator are a generative adversarial network (GAN).

9. The method of claim 8, wherein the decision logic candidates generated in the iterative process comprise machine learning models having two or more different machine learning model architectures, optionally wherein the two or more different machine learning model architectures comprise artificial neural network architectures differing from each other in a number of nodes and/or a number of layers.

10. The method of claim 8, wherein generating decision logic candidates in the iterative process comprises:

selecting a machine learning model architecture;

training a decision logic candidate having the machine learning model architecture until a first termination criterion is fulfilled;

storing the performance computed for the trained decision logic candidate having the machine learning model architecture;

if a second termination criterion is not fulfilled, repeating the training and storing steps for a different decision logic candidate having a different machine learning model architecture;

if a second termination criterion is fulfilled, selecting one of the decision logic candidates based on the stored performances.

11. The method of claim 1, wherein a complexity of machine learning models used as decision logic candidates is increased as new decision logic candidates are being generated in the process of generating the decision logic.

12. The method of claim 1, further comprising adjusting a learning rate for a decision logic generator that generates the decision logic candidate while the decision logic generator learns with the aim to generate decision logic candidates that perform better in the system simulations.

13. The method of claim 1, wherein the performance is computed in accordance with a performance metric or several performance metrics.

14. The method of claim 13, further comprising receiving, via an interface, an input specifying the performance metric or the several performance metrics, and/or dynamically changing the performance metric or several performance metrics during the method of generating the decision logic.

15. The method of claim 13, wherein the performance metric or several performance metrics include one or several of: minimizing cost of electricity, increasing grid power transfer limits, ensuring grid stability, maximizing protection objectives of security and dependability, keeping voltages and currents within limits, or maximizing economic benefit.

16. The method of claim 1, wherein performing the system simulations comprises simulating a behavior of primary and/or secondary devices of the power system, optionally wherein performing the system simulations comprises one or several of: power flow simulations, short-circuit calculations, electromagnetic transient calculations, optimal power flow computation, or unit commitment analysis.

17. The method of claim 1, wherein the system simulations comprise one or more of currents, voltages, phasors, synchrophasors in lines, cables, or bus bars of the power system.

18. The method of claim 1, wherein the method is performed by one or several integrated circuits that execute:

a decision logic generator that generates and outputs the decision logic candidate;

a scenario-providing module that outputs a batch of active scenarios, wherein the scenario-providing module comprises a scenario-creating logic;

a simulation engine coupled to the decision logic generator and the scenario-providing module and operative to perform the system simulation for scenarios included in the batch of active scenarios using the decision logic candidate;

a performance assessor that computes the performance of the decision logic candidate for the scenarios included in the batch of active scenarios; and a coordinator that coordinates operation of the decision logic generator and of the scenario-providing module responsive to an output of the performance assessor, optionally wherein the coordinator is operative to control adversarial machine learning models of the decision logic generator and the scenario-providing module, further optionally wherein the coordinator controls a learning rate of the adversarial machine learning models of the decision logic generator and the scenario-providing module.

19. The method of claim 1, further comprising:

executing, by the controller of the protection device in the IACS, the selected at least one decision logic;

optionally further comprising automatically modifying the selected decision logic in response to a monitored field behavior of the selected at least one decision logic executed by the controller.

20. A computing system for generating a decision logic for a controller of a protection device in an Industrial Automation Control System (IACS) of a power system, comprising one or several integrated circuits operative to:

perform an iterative process having iterations that respectively include automatically generating a decision logic candidate for the decision logic, and computing a performance of the decision logic candidate in response to scenarios, comprising performing system simulations;

select at least one decision logic from the decision logic candidates based on a result of the computed performance; and deploy the selected at least one decision logic to the protection device, to initiate execution of the selected at least one decision logic, during live operation of the IACS, wherein the selected at least one decision logic, when executed, provides a protection function to the power system, and wherein the protection function comprises determining whether or not to trip a circuit breaker within the power system.

* * * * *